(12) United States Patent
Kasahara

(10) Patent No.: US 8,176,481 B2
(45) Date of Patent: May 8, 2012

(54) METHODS AND APPARATUS FOR DISTRIBUTING SOFTWARE APPLICATIONS

(75) Inventor: Eiji Kasahara, Austin, TX (US)

(73) Assignee: Sony Computer Entertainment Inc. (JP)

( * ) Notice: Subject to any disclaimer, the term of this patent is extended or adjusted under 35 U.S.C. 154(b) by 0 days.

(21) Appl. No.: 11/231,131

(22) Filed: Sep. 20, 2005

(65) Prior Publication Data

US 2006/0075397 A1    Apr. 6, 2006

Related U.S. Application Data

(60) Provisional application No. 60/611,477, filed on Sep. 20, 2004.

(51) Int. Cl.
*G06F 9/44*    (2006.01)
(52) U.S. Cl. ......... 717/168; 712/200; 717/169; 717/170
(58) Field of Classification Search .................... 712/200
See application file for complete search history.

(56) References Cited

U.S. PATENT DOCUMENTS

| | | | |
|---|---|---|---|
| 4,688,169 A | | 8/1987 | Joshi |
| 5,046,090 A | | 9/1991 | Walker et al. |
| 5,499,357 A | * | 3/1996 | Sonty et al. ................... 710/104 |
| 5,537,529 A | * | 7/1996 | Borovoy et al. ............. 715/203 |
| 5,577,232 A | * | 11/1996 | Priem et al. ................... 717/170 |
| 5,757,908 A | | 5/1998 | Cooper et al. |
| 5,805,551 A | | 9/1998 | Oshima et al. |
| 5,835,911 A | * | 11/1998 | Nakagawa et al. ........... 707/203 |
| 5,862,325 A | | 1/1999 | Reed et al. |
| 5,930,358 A | * | 7/1999 | Rao ................................ 713/193 |
| 5,951,639 A | * | 9/1999 | MacInnis ........................ 725/70 |
| 5,982,892 A | | 11/1999 | Hicks et al. |
| 6,006,190 A | | 12/1999 | Baena-Arnaiz et al. |
| 6,075,862 A | | 6/2000 | Yoshida et al. |
| 6,115,471 A | | 9/2000 | Oki et al. |
| 6,189,146 B1 | | 2/2001 | Misra et al. |
| 6,205,579 B1 | * | 3/2001 | Southgate ..................... 717/173 |
| 6,226,618 B1 | | 5/2001 | Downs et al. |
| 6,347,846 B1 | | 2/2002 | Nakamura et al. |
| 6,427,132 B1 | | 7/2002 | Bowman-Amuah |
| 6,487,723 B1 | | 11/2002 | MacInnis |
| 6,567,915 B1 | | 5/2003 | Guthery |
| 6,607,136 B1 | | 8/2003 | Atsmon et al. |

(Continued)

FOREIGN PATENT DOCUMENTS

EP    0 679 980    11/1995

(Continued)

OTHER PUBLICATIONS

U.S. Appl. No. 11/230,748, filed Sep. 20, 2005.

(Continued)

*Primary Examiner* — Idriss N Alrobaye
(74) *Attorney, Agent, or Firm* — Lerner, David, Littenberg, Krumholz & Mentlik, LLP

(57) ABSTRACT

Methods and apparatus for enabling execution of software programs permit: obtaining identification information that is indicative of a version of a software program; determining whether processing capabilities of a processor on which the software program is to be executed are incompatible with proper execution of the version of the software program; and at least partially modifying the version of the software program to obtain a more suitable version of the software program that will execute properly on the processor.

26 Claims, 30 Drawing Sheets

U.S. PATENT DOCUMENTS

| | | | |
|---|---|---|---|
| 6,668,331 B1 * | 12/2003 | Gomes et al. | 713/401 |
| 6,732,106 B2 | 5/2004 | Okamoto et al. | |
| 6,834,348 B1 | 12/2004 | Tagawa et al. | |
| 6,839,837 B1 | 1/2005 | Morishita et al. | |
| 6,879,965 B2 | 4/2005 | Fung et al. | |
| 6,889,321 B1 | 5/2005 | Kung et al. | |
| 6,952,770 B1 | 10/2005 | Mittal et al. | |
| 6,971,022 B1 | 11/2005 | Katta et al. | |
| 6,983,371 B1 | 1/2006 | Hurtado et al. | |
| 6,993,664 B2 | 1/2006 | Padole et al. | |
| 7,080,039 B1 | 7/2006 | Marsh | |
| 7,082,555 B2 * | 7/2006 | Toyooka et al. | 714/48 |
| 7,100,195 B1 | 8/2006 | Underwood | |
| 7,124,938 B1 | 10/2006 | Marsh | |
| 7,171,662 B1 | 1/2007 | Misra et al. | |
| 7,191,154 B2 | 3/2007 | Oshima et al. | |
| 7,213,005 B2 | 5/2007 | Mourad et al. | |
| 2001/0010046 A1 * | 7/2001 | Muyres et al. | 705/52 |
| 2001/0018743 A1 | 8/2001 | Morishita | |
| 2001/0051928 A1 | 12/2001 | Brody | |
| 2002/0026424 A1 | 2/2002 | Akashi | |
| 2002/0032584 A1 * | 3/2002 | Doctor et al. | 705/3 |
| 2002/0032905 A1 | 3/2002 | Sherr et al. | |
| 2002/0046229 A1 * | 4/2002 | Yutaka et al. | 709/102 |
| 2002/0052728 A1 * | 5/2002 | Yutaka | 703/26 |
| 2002/0077988 A1 | 6/2002 | Sasaki et al. | |
| 2002/0100035 A1 * | 7/2002 | Kenyon et al. | 717/168 |
| 2002/0157090 A1 * | 10/2002 | Anton, Jr. | 717/178 |
| 2003/0072271 A1 | 4/2003 | Simmons et al. | |
| 2003/0123670 A1 | 7/2003 | Shimada et al. | |
| 2003/0126430 A1 * | 7/2003 | Shimada et al. | 713/155 |
| 2003/0140134 A1 | 7/2003 | Swanson et al. | |
| 2003/0177093 A1 | 9/2003 | Hirano et al. | |
| 2004/0243754 A1 * | 12/2004 | Sakamoto | 710/307 |
| 2004/0250245 A1 * | 12/2004 | Rao et al. | 717/168 |
| 2005/0034114 A1 * | 2/2005 | Weik et al. | 717/172 |
| 2005/0066324 A1 | 3/2005 | Delgado et al. | |
| 2006/0026590 A1 * | 2/2006 | Berenberg et al. | 717/175 |

FOREIGN PATENT DOCUMENTS

| | | |
|---|---|---|
| JP | 4-195634 | 7/1992 |
| JP | 11-275516 | 10/1999 |
| JP | 2000-242604 | 9/2000 |
| JP | 2004-287818 | 10/2004 |
| TW | 470885 | 3/2005 |
| WO | 00/56068 A1 | 9/2000 |
| WO | 01/78303 | 10/2001 |
| WO | WO-03/021432 | 3/2003 |

OTHER PUBLICATIONS

U.S. Appl. No. 10/316,309, filed Dec. 11, 2002.
U.S. Appl. No. 10/316,675, filed Dec. 11, 2002.
Notification of Reason(s) for Refusal for Japanese Application No. 2005-270993 dated Nov. 25, 2008.
Translation of Notification of Reason(s) for Refusal for Japanese Application No. 2005-270993 dated Nov. 25, 2008.

* cited by examiner

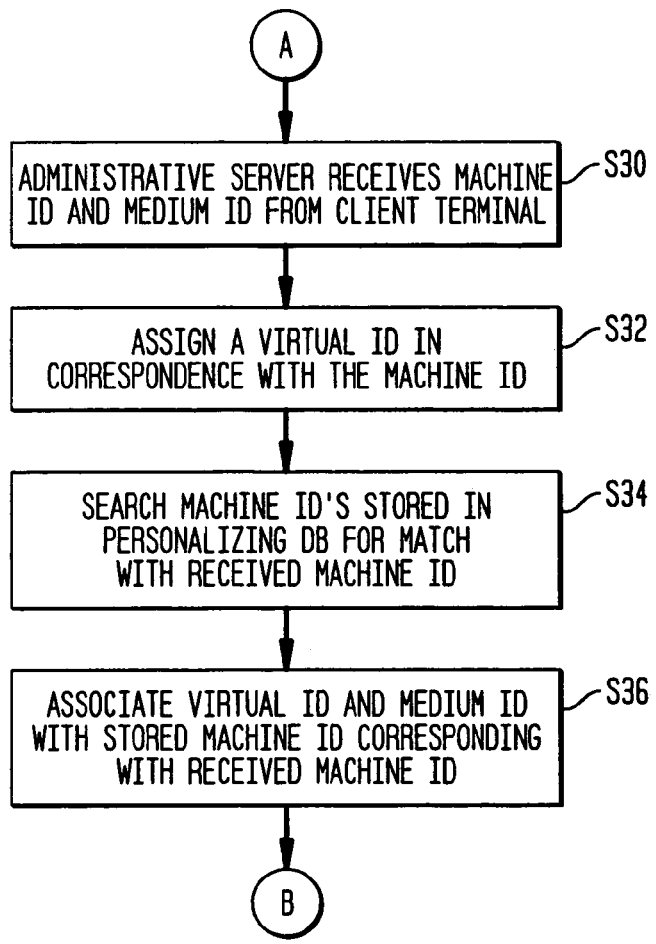

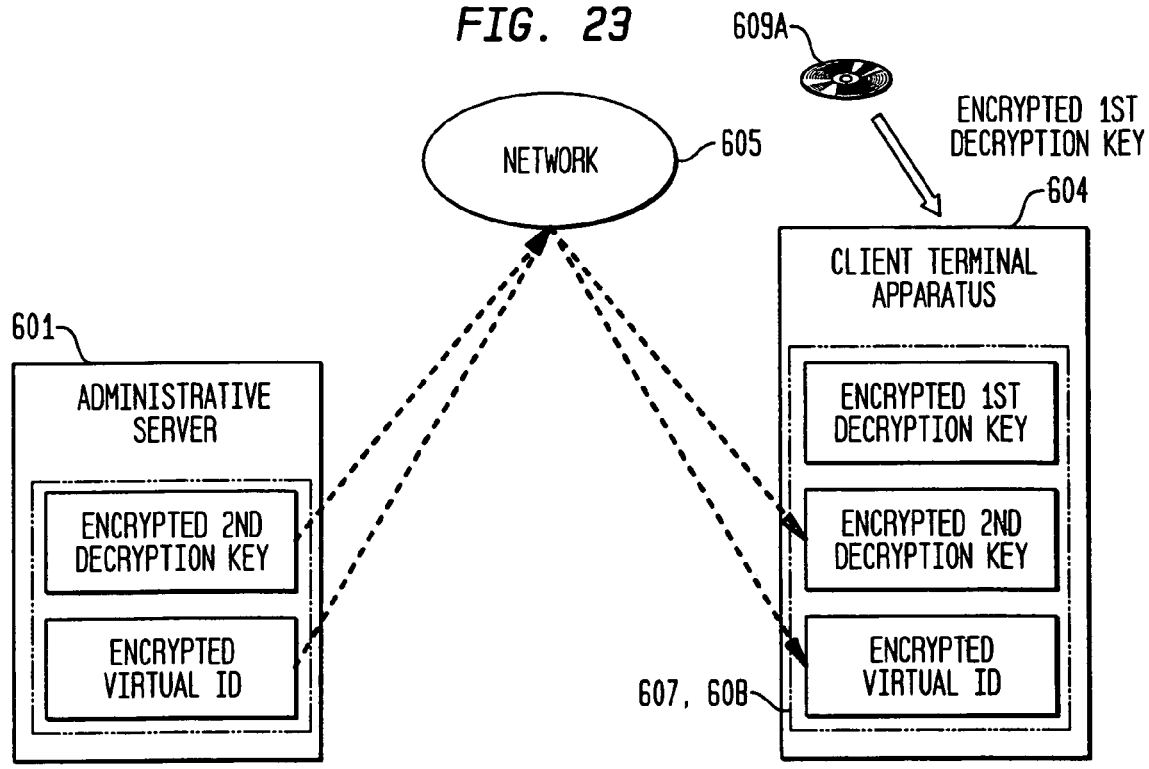
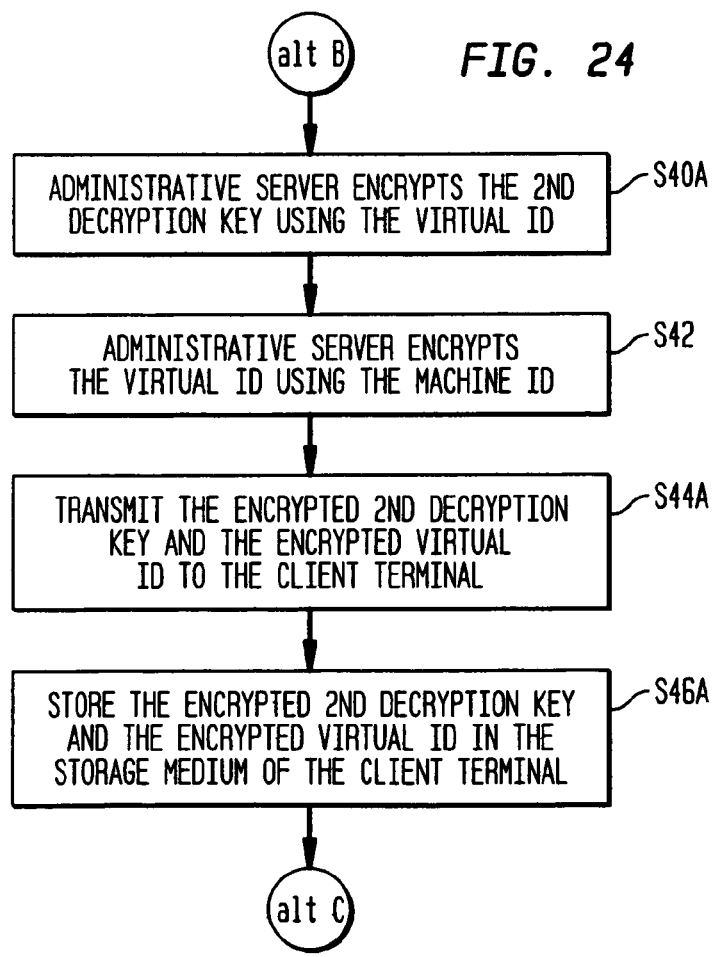

| MACHINE ID | DIST. ID |
|---|---|
| K1234 | D3456 |
| K2345 | D1278 |
| K6789 | -- |
| K0987 | -- |
| | |
| | |

707A

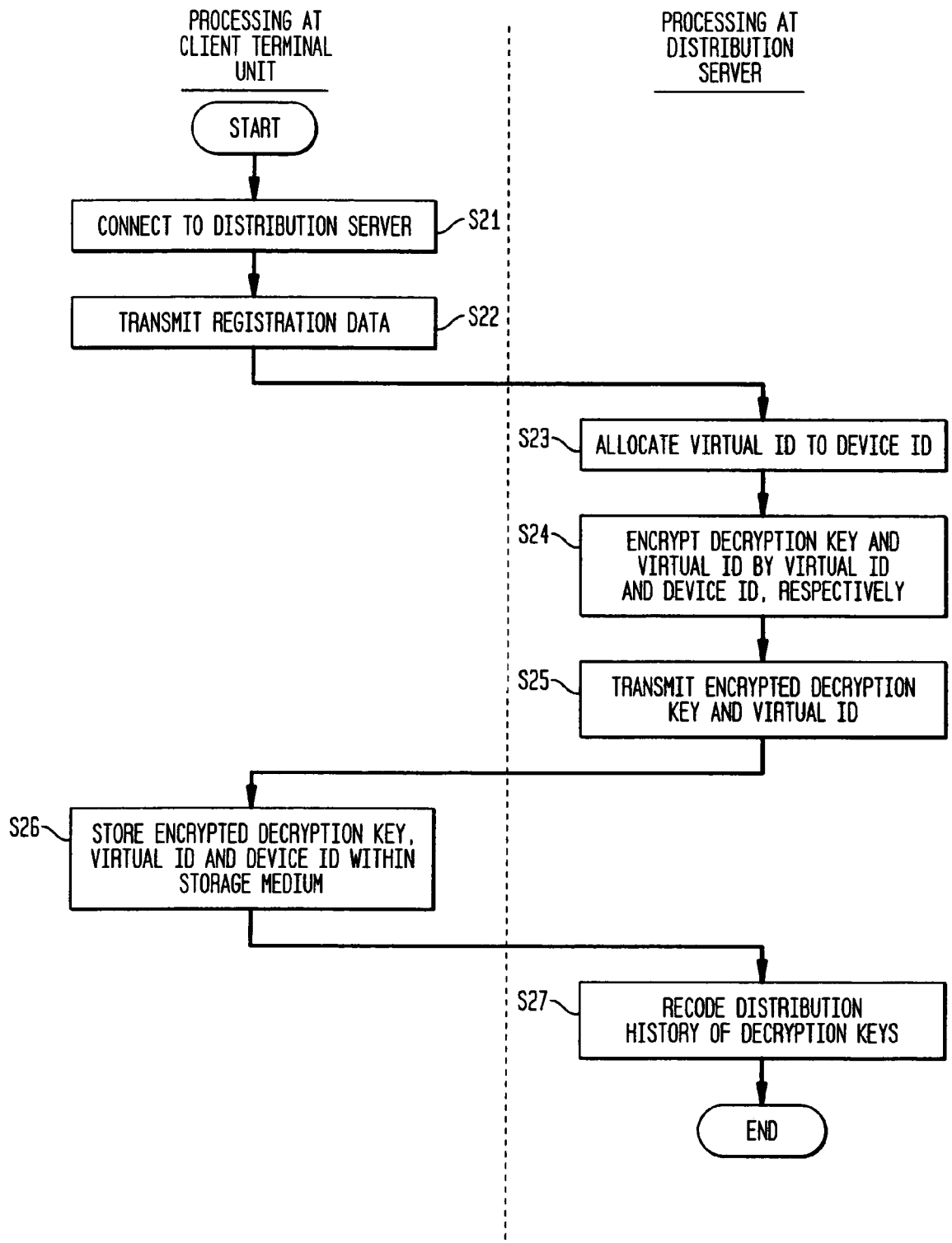

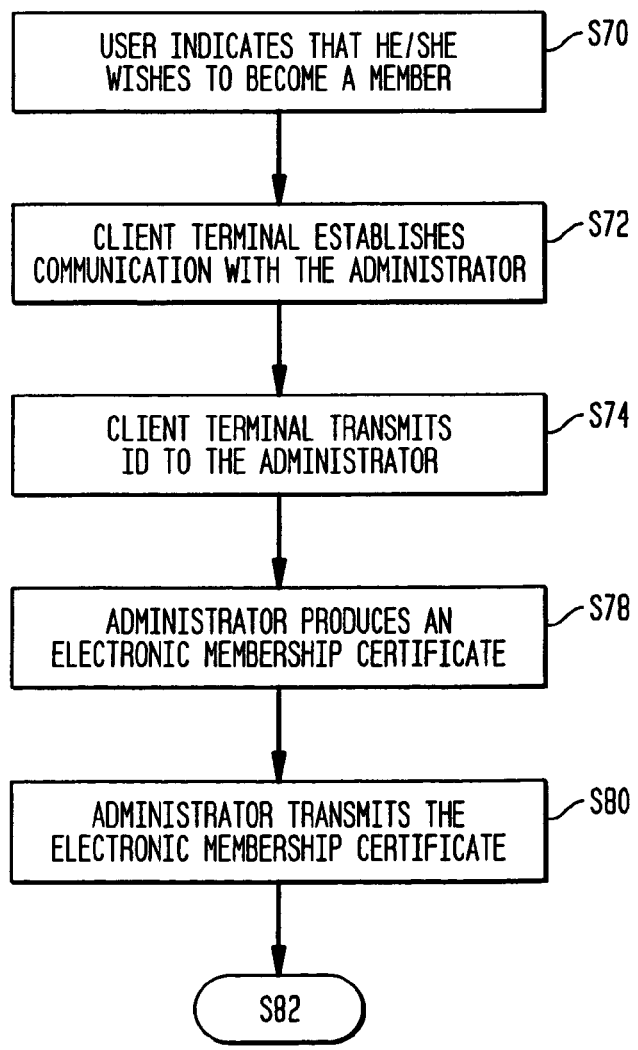

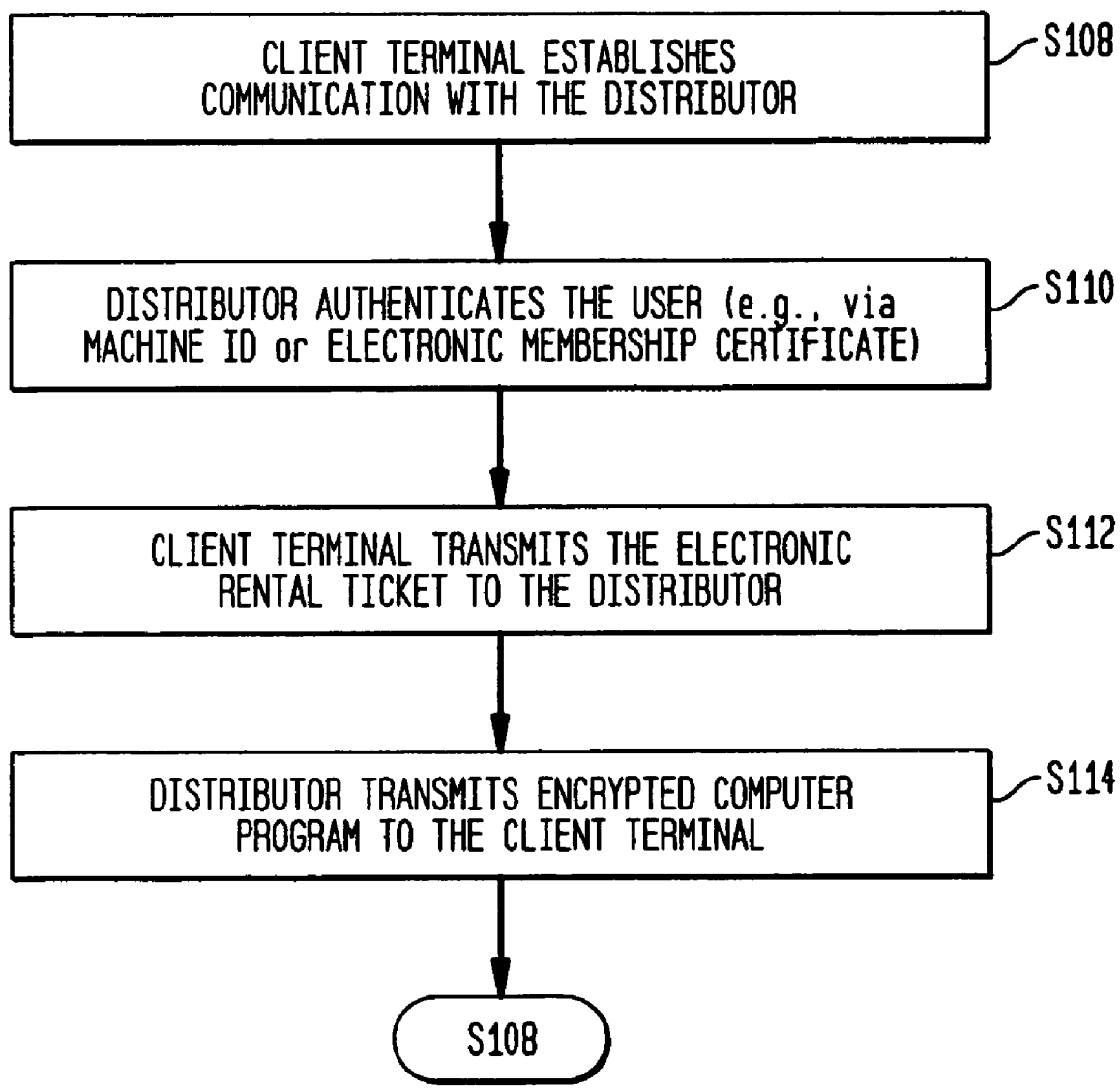

METHODS AND APPARATUS FOR DISTRIBUTING SOFTWARE APPLICATIONS

CROSS-REFERENCE TO RELATED APPLICATIONS

This application claims the benefit of U.S. Provisional Application No. 60/611,477, filed Sep. 20, 2004, the disclosure of which is incorporated by reference herein.

BACKGROUND OF THE INVENTION

The present invention relates to methods and apparatus for modifying a version of a software program to improve the results obtained when the software program is executed on a processor having far superior processing capabilities than those contemplated when the software program was developed.

The design marketing and sales of software programs for retail and commercial use continues to be an ever-evolving and expanding sector of the economy. Indeed, software developers are constantly seeking to satisfy a seemingly insatiable appetite by consumers for new and improved software applications. Nowhere is this more evident than in the area of computer graphics software, such as for video games, movie animation, and special effects, etc. Indeed, real-time, multimedia, applications are becoming increasingly important, particularly in the video game markets. These applications require extremely fast processing speeds, such as many thousands of megabits of data per second.

With this evolution of ever more complex and sophisticated software programs has been a corresponding evolution in the processing capabilities of the hardware on which such software program are executed. Indeed, incredible advancements have been made in the processing capabilities of microprocessors since the first microprocessor, Intel's 4004, introduced in 1971, which was a 4 bit processor capable of only adding and subtracting. In 1979, Intel introduced its 8080 microprocessor, which was incorporated into the IBM personal computer. The Intel 8080 microprocessor utilized about 29,000 transistors at a clock speed of 5 MHz, which could execute 0.33 million instructions per second (MIPS). From 1982 through 1989, Intel introduced the 80286, 80386, and 80486 microprocessors. The Intel 80486 microprocessor employed 1.2 million transistors at a clock speed of 25 MHz, which could execute 20 MIPS. From 1993 through 2000, Intel introduced the Pentium series of microprocessors, where the Pentium 4 microprocessor employed 42 million transistors at a clock speed of 1.5 GHz, which could execute about 17,000 MIPS. These data show that the speed and power of the hardware on which software programs are being executed are ever increasing (note that the Intel Pentium 4 runs about 5,000 faster than the Intel 8088 microprocessor). As will be discussed further in this description, newer and more powerful microprocessors are currently being developed that may achieve clock frequencies of about 4 GHz and even higher MIPS levels.

While single processing units are capable of fast processing speeds, they cannot generally match the processing speeds of multi-processor architectures. Indeed, in multi-processor systems, a plurality of processors can operate in parallel (or at least in concert) to achieve desired processing results. The types of computers and computing devices that may employ multi-processing techniques are extensive. In addition to personal computers (PCs) and servers, these computing devices include cellular telephones, mobile computers, personal digital assistants (PDAs), set top boxes, digital televisions and many others.

Reference is now made to FIG. 1, which illustrates an evolution of software programs and a corresponding evolution of the hardware used to execute same. The hardware system 102 at a particular point in time is not as powerful as other hardware systems, such as hardware system 106 or hardware system 112. Even these hardware systems are not as powerful as the hardware system 118, which is the subject of the instant invention. Moreover, the software programs 104 (illustrated as being stored on an optical disk) were designed to be executed on the then-existing hardware system 102. For example, the software programs 104 may have been written with the understanding that they would be executed on a processing unit having the processing characteristics afforded by, for example, the Intel 80286 microprocessor. The software programs 110, which were designed and purchased after the software programs 104, may have been designed to be executed on a processing unit having the processing characteristics afforded by, for example, the Intel 80486 microprocessor. Alternatively, the software programs 110 may have designed and developed to be executed on a processing unit having the processing capabilities of a PlayStation game console, manufactured by the assignee of the present application, which was introduced in 1994. Further, the software programs 116 may have been designed and developed to be executed on a processing unit having processing capabilities afforded by Intel's Pentium 3 microprocessor. Alternatively, the software programs 116 may have been designed and developed to be executed on a PlayStation 2 console, manufactured by the assignee of the present application, which among other things, was designed to execute video game software programs.

The conventional wisdom is that any software programs developed to be executed on a given processing unit having certain processing characteristics will execute on another processing unit having greater processing characteristics. While this may be true in many circumstances, it is not always the case, particularly when the software program is designed to provide a multi-media experience to the user on a display, such as would be the case in a video game software program. Indeed, running a software program designed for a processing unit of moderate sophistication on a processing unit having substantially higher processing capabilities may result in excessively fast moving objects of a moving image, loss of synchronization between audio and video components of a moving image, etc. In general, these problems manifest when interdependencies between program threads (the unit of parallel processing) are not guaranteed.

Unless features have been designed into a given processing unit that permit execution of software programs specifically designed therefor and software programs that were designed to run on less sophisticated processing units, a user would have to maintain two separate processing units to support his or her full complement of software programs. An exception to this is the PlayStation console and PlayStation 2 console. Indeed, the PlayStation 2 console employs more than one microprocessor to accommodate software programs specifically written for the PlayStation console and software programs specifically written for the PlayStation 2 console. More particularly, the PlayStation 2 console incorporates the microprocessor found in the PlayStation console in order to execute the PlayStation video game software programs. The other microprocessor within the PlayStation 2 console is used to execute the video game software programs designed specifically for the PlayStation 2 console.

While designing future processing units with multiple microprocessors of differing processing capabilities may address some of the problems associated with supporting a complement of software programs, it would be desirable to achieve a more elegant solution, preferably one that is much more versatile, efficient, and cost effective.

SUMMARY OF THE INVENTION

In accordance with one or more aspects of the present invention, a method of enabling execution of a software program includes: obtaining identification information that is indicative of a version of a software program; determining whether processing capabilities of at least one processor on which the software program is to be executed are not compatible with proper execution of the version of the software program; and at least partially modifying the version of the software program to obtain a more suitable version of the software program that will execute properly on the at least one processor.

The identification information may be obtained from a storage medium which may be at least one of an optical disc medium, a magnetic medium, and an electronic medium. The identification information may be part of a software program and may be obtained from the software program.

Preferably, the method further includes determining the processing capabilities of the processing unit using the identification information. This determination may entail determining whether the at least one processor is capable of using processing resources from one or more external processors in executing the software program. Alternatively, or in addition, the determination of the processing capabilities of the at least one processor may include obtaining a processing identifier indicative of the processing capabilities of the at least one processor.

Preferably, the method further includes: using the identification information for the software program and the processing identifier of the at least one processor for accessing a table that associates (i) respective identification information for a plurality of software programs, (ii) processing identifiers, and (iii) software program and/or data modules that may be used to at least partially modifying the version of the software program to obtain a more suitable version of the software program that will execute properly on the at least one processor. Thereafter the one or more of the software program and/or data modules may be used to at least partially modify the version of the software program to obtain a proper version of the software program.

The table may be stored locally in the processing unit, stored remotely in an administrative entity, and/or stored in a further location for access by the administrative entity. When the table is stored remotely from the processing unit, the method may further include: establishing a link between the processing unit and the administrative entity using a communications channel, and transmitting the identification information and the processing identifier from the at least one processor to the administrative entity over the communications channel.

The administrative entity preferably accesses the table using the identification information and the processing identifier to obtain the one or more associated software program and/or data modules. Thereafter, the method may include: receiving the one or more associated software program and/or data modules at the processing unit over the communications channel from the administrative entity; and using the one or more associated software program and/or data modules to modify the version of the software program to obtain a proper version of the software program.

The modification of the version of the software program to obtain a proper version of the software program may include overwriting the version of the software program in the storage medium to obtain a proper version of the software program in the storage medium.

In accordance with one or more further aspects of the present invention, a processing arrangement includes at least one processor, such as at least one processing unit that includes: a plurality of sub-processing units each having a local memory for performing processor tasks; a main processing unit operable to perform at least some management processing tasks over the sub-processing units; a main memory accessible by the main processing unit and the sub-processing units; and a data bus operatively coupling the main processing unit, the sub-processing units, and the main memory.

The at least one processor, such as at least one of the above main processing unit and the sub-processing units, is preferably operable to: (i) obtain identification information that is indicative of a version of a software program, (ii) determine whether processing capabilities of the processor on which the software program is to be executed are not compatible with proper execution of the version of the software program (such as being too high), and (iii) at least partially modify the version of the software program to obtain a further version of the software program that will execute properly.

The at least one processors, such as at least one of the main processing unit and/or the sub-processing units, are preferably operable to determine the processing capabilities of the processing unit using the identification information. This determination may include determining whether the at least one processor is capable of using processing resources from one or more external processing units in executing the software program. Alternatively, or in addition, the determination of the processing capabilities may include obtaining a processing identifier indicative of the processing capabilities.

The at least one processor, such as at least one of the above main processing unit and the sub-processing units, may be operable to: use the identification information for the software program and the processing identifier of the processing unit for accessing a table that associates (i) respective identification information for a plurality of software programs, (ii) processing identifiers, and (iii) software program and/or data modules that may be used to at least partially modifying the version of the software program to obtain a proper version of the software program that will execute properly thereon. The at least one main processing unit and/or the sub-processing units may also be operable to: use one or more of the software program and/or data modules to at least partially modifying the version of the software program to obtain a proper version of the software program.

The table may be stored locally in the processing unit and/or stored remotely in an administrative entity. When stored remotely, the processing unit may be operable to establish a link between the processing unit and the administrative entity using a communications channel, and to transmit the identification information and the processing identifier to the administrative entity over the communications channel.

The administrative entity may access the table using the identification information and the processing identifier to obtain the one or more associated software program and data modules. The at least one processor may be further operable to: receive the one or more associated software program and/or data modules over the communications channel from the administrative entity; and use the one or more associated software program and/or data modules to modify the version of the software program to obtain a proper version of the software program.

The act of modifying the version of the software program to obtain a proper version of the software program may include overwriting the version of the software program in the storage medium to obtain a proper version of the software program in the storage medium.

In accordance with one or more still further aspects of the invention, a recording medium is recorded with a program for operating a processing unit using a method as described above.

In accordance with the above aspects of the invention, a new computer architecture has been developed that exceeds the processing capabilities of present day microprocessors. In accordance with this new computer architecture, all processors of a multi-processor computer system are constructed from a common computing module (or cell). This common computing module has a consistent structure and preferably employs the same instruction set architecture. The multi-processor computer system can be formed of one or more clients, servers, PCs, mobile computers, game machines, PDAs, set top boxes, appliances, digital televisions and other devices using computer processors.

A plurality of the computer systems may be members of a network if desired. The consistent modular structure enables efficient, high speed processing of applications and data by the multi-processor computer system, and if a network is employed, the rapid transmission of applications and data over the network. This structure also simplifies the building of members of the network of various sizes and processing power and the preparation of applications for processing by these members.

The basic processing module is a processor element (PE). A PE preferably comprises a processing unit (PU), a direct memory access controller (DMAC) and a plurality of sub-processing units (SPUs), such as four SPUs, coupled over a common internal address and data bus. The PU and the SPUs interact with a shared dynamic random access memory (DRAM), which may have a cross-bar architecture. The PU schedules and orchestrates the processing of data and applications by the SPUs. The SPUs perform this processing in a parallel and independent manner. The DMAC controls accesses by the PU and the SPUs to the data and applications stored in the shared DRAM.

In accordance with this modular structure, the number of PEs employed by a particular computer system is based upon the processing power required by that system. For example, a server may employ four PEs, a workstation may employ two PEs and a PDA may employ one PE. The number of SPUs of a PE assigned to processing a particular software cell depends upon the complexity and magnitude of the programs and data within the cell.

The plurality of PEs may be associated with a shared DRAM, and the DRAM may be segregated into a plurality of sections, each of these sections being segregated into a plurality of memory banks. Each section of the DRAM may be controlled by a bank controller, and each DMAC of a PE may access each bank controller. The DMAC of each PE may, in this configuration, access any portion of the shared DRAM.

The new computer architecture also employs a new programming model that provides for transmitting data and applications over a network and for processing data and applications among the network's members. This programming model employs a software cell transmitted over the network for processing by any of the network's members. Each software cell has the same structure and can contain both applications and data. As a result of the high speed processing and transmission speed provided by the modular computer architecture, these cells can be rapidly processed. The code for the applications preferably is based upon the same common instruction set and ISA. Each software cell preferably contains a global identification (global ID) and information describing the amount of computing resources required for the cell's processing. Since all computing resources have the same basic structure and employ the same ISA, the particular resource performing this processing can be located anywhere on the network and dynamically assigned.

Other aspects, features, and advantages of the present invention will be apparent to one skilled in the art from the description herein taken in conjunction with the accompanying drawings.

BRIEF DESCRIPTION OF THE DRAWINGS

For the purposes of illustration, there are forms shown in the drawings that are presently preferred, it being understood, however, that the invention is not limited to the precise arrangements and instrumentalities shown.

FIG. 15 is a further flow diagram illustrating certain process steps carried out by, for example, the administrative server 601 of FIG. 11;

FIG. 16 is a block diagram illustrating certain database content;

FIG. 23 is a conceptual block diagram and flow diagram illustrating alternative process steps that may be carried out;

FIG. 24 is a flow diagram illustrating further details concerning the process steps of FIG. 23;

FIG. 35 is a flow diagram illustrating further process steps carried out by the apparatus of FIG. 34;

FIG. 36 is a block diagram illustrating certain database content;

FIG. 37 is a flow diagram illustrating the steps of an example of a process for the secure distribution of program content from a distributor of rental program content;

FIG. 40 is a flow diagram illustrating further steps of the process of FIG. 39.

DETAILED DESCRIPTION

Figure 1:
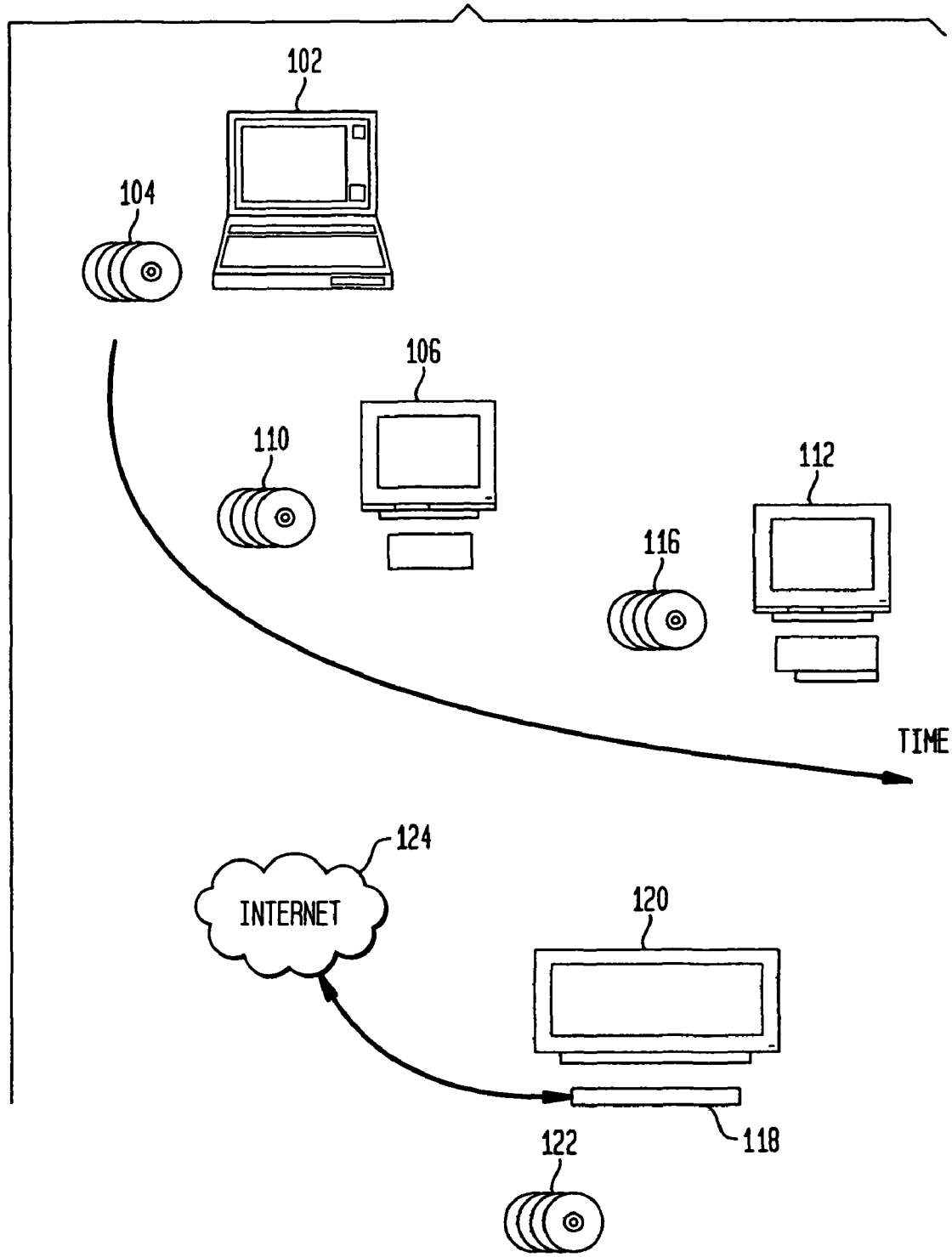
FIG. 1 is a graphical illustration of the progress that is made in the design of software programs and the processing systems on which they run, including a processing or multi-processing arrangement in accordance with the present invention.

With reference to the drawings wherein like numerals indicate like elements there is shown in FIG. 1 a processing arrangement 118 in accordance with one or more aspects of the present invention. The processing arrangement 118 is operable to execute software programs utilizing, for example, a microprocessing system that will be discussed in greater detail hereinbelow. A display 120 and audio capabilities (not shown) are employed to enable a multi-media experience for a user.

The software programs may be loaded in any number of ways, such as by inserting a storage medium containing the software program into the processing arrangement 118 and reading the software program into a random access memory (RAM). The storage medium may be an optical medium, a magnetic medium, an electronic medium, etc. In accordance with some aspects of the invention, the software programs may be loaded into the processing arrangement 118 by way of downloading them over a network, such as the Internet 124.

It has been discovered that advantageous processing characteristics may be achieved utilizing a very powerful multi-processing system to implement the processing arrangement 118 in accordance with the present invention. The processing arrangement 118 is preferably operable to determine whether its processing capabilities are incompatible to properly execute a version of a software program. Such incompatibility may include that the processing capabilities of the processing arrangement 118 are too high. The processing arrangement 118 is preferably further operable to at least partially modify the version of the software program to obtain a proper version of the software program that will execute properly when the determination is in the affirmative. Various details and examples of how this functionality may be achieved and of numerous modifications thereof will be discussed below. In this regard, a detailed discussion of an example of certain aspects of the internal construction of the processing arrangement 118 will now be discussed.

Figure 2A:
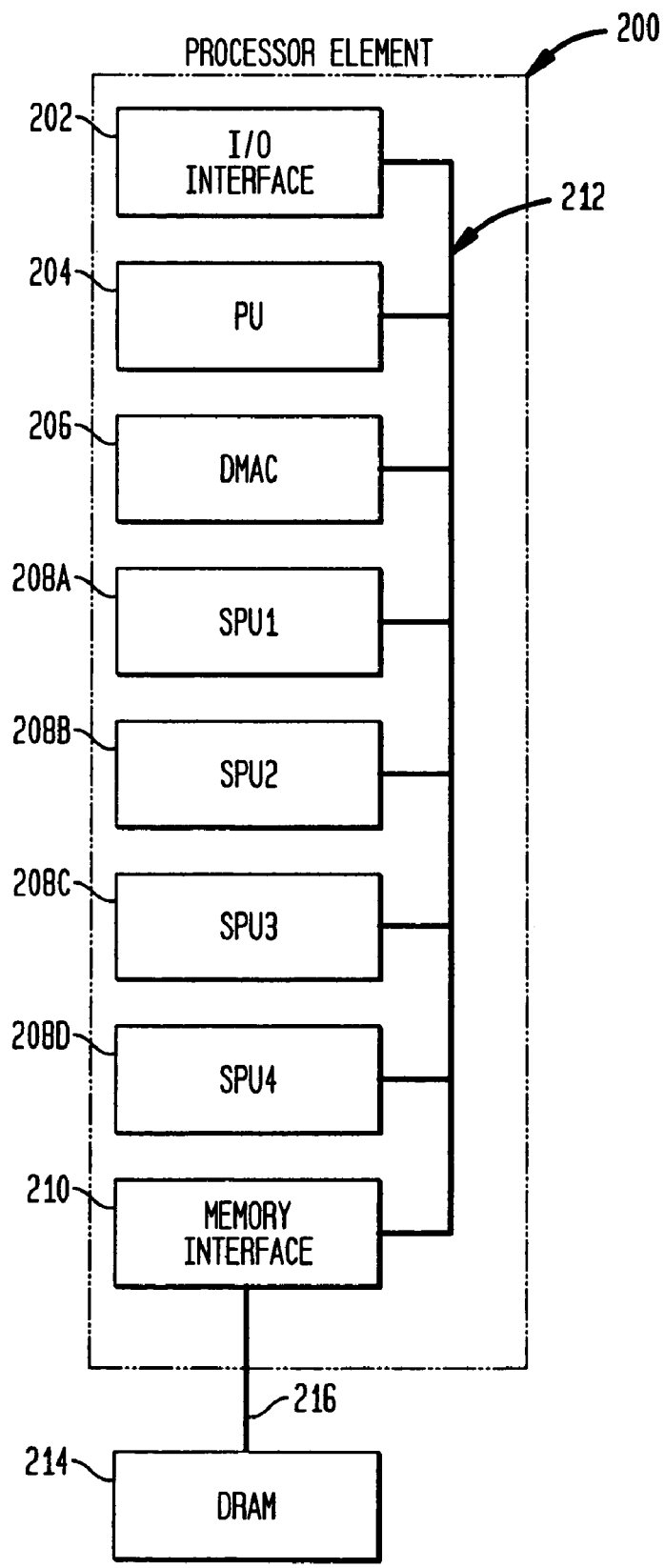
FIG. 2A is a diagram illustrating an exemplary structure of a processor element (PE) in accordance with an embodiment of the present invention.

Reference is now made to FIG. 2A, which is block diagram of an example of a basic processing module or processor element (PE) 200. As shown in this figure, PE 200 comprises an I/O interface 202, a processing unit (PU) 204, a direct memory access controller (DMAC) 206, and a plurality of SPUs 208, namely, SPU1 (208A), SPU2 (208B), SPU3 (208C), and SPU4 (208D). A local (or internal) PE bus 212 transmits data and applications among PU 204, the SPUs 208, DMAC 206, and a memory interface 210. Local PE bus 212 can have, e.g., a conventional architecture or can be implemented as a packet switch network implementation as a packet switch network, while requiring more hardware, increases available bandwidth.

PE 200 can be constructed using various methods for implementing digital logic. PE 200 preferably is constructed, however, as a single integrated circuit chip employing a complementary metal oxide semiconductor (CMOS) on a silicon substrate. Alternative materials for substrates include gallium arsinide, gallium aluminum arsinide and other so-called III-B compounds employing a wide variety of dopants. PE 200 also could be implemented using superconducting material, e.g., rapid single-flux-quantum (RSFQ) logic.

PE 200 is closely associated with a dynamic random access memory (DRAM) 214 through a high bandwidth memory connection 216. DRAM 214 functions as the main (or shared) memory for PE 200. Although DRAM 214 preferably is a dynamic random access memory, DRAM 214 could be implemented using other means, e.g., as a static random access memory (SRAM), a magnetic random access memory (MRAM), an optical memory or a holographic memory. The DRAM 214, or its other implementations, may be incorporated into the same integrated circuit chip as the PE 200 or, alternatively, provided as a separate, external memory. When the DRAM 214 is incorporated into the same chip as the PE 200, the DRAM 214 may be disposed on a separate location on the chip or integrated with one or more of the processors that comprise the PE. DMAC 206 and memory interface 210 facilitate the transfer of data between DRAM 214. The SPUs 208, and PU 204 of PE 200. It is noted that the DMAC 206 and/or the memory interface 210 may be integrally or separately disposed with respect to the sub-processing units 208 and the PU 204. Indeed, instead of a separate configuration as shown, the DMAC 206 function and/or the memory interface 210 function may be integral with one or more (preferably all) of the sub-processing units 208 and the PU 204.

PU 204 can be, e.g., a standard processor capable of stand-alone processing of data and applications. In operation, PU 204 schedules and orchestrates the processing of data and applications by the SPUs 208. In an alternative configuration, the PE 200 may include multiple PUs 204. Each of the PUs 204 may control one, all, or some designated group of the SPUs 208. The SPUs 208 preferably are single instruction, multiple data (SIMD) processors. Under the control of PU 204, the SPUs 208 perform the processing of these data and applications in a parallel and independent manner. DMAC 206 controls accesses by PU 204 and the SPUs to the data and applications stored in the shared DRAM 214. It is noted that the PU 204 may be implemented by one or more of the sub-processing units 208 taking on the role of a main processing unit.

A number of PEs, such as PE 200, may be joined or packaged together to provide enhanced processing power. This configuration may be referred to as a broadband engine (BE).

Figure 2B:
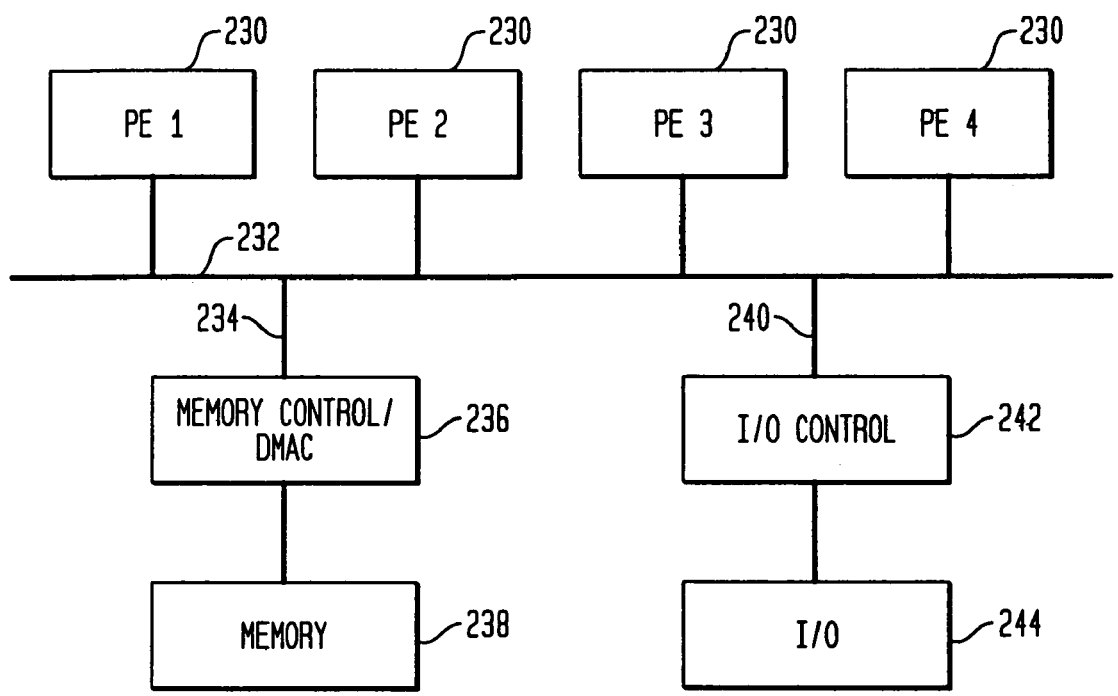
FIG. 2B is a diagram illustrating an exemplary structure of a multiprocessing system of PEs in accordance with aspects of the present invention.

FIG. 2B illustrates an example of a processing architecture comprised of multiple PEs 230 (PE 1, PE 2, PE 3, and PE 4) that can be operated in accordance with aspects of the present invention. Preferably, the PEs 230 are on a single chip. The PEs 230 may or may not include the subsystems such as the PU and/or SPUs discussed above with regard to the PE 200 of FIG. 2A. The PEs 230 may be of the same or different types, depending upon the types of processing required. For example, one or more of the PEs 230 may be a generic microprocessor, a digital signal processor, a graphics processor, microcontroller, etc.

The PEs 230 are preferably tied to a shared bus 232. A memory controller or DMAC 236 may be connected to the shared bus 232 through a memory bus 234. The DMAC 236 connects to a memory 238, which may be of one of the types discussed above with regard to memory 214. An I/O controller 242 may also be connected to the shared bus 232 through an I/O bus 240. The I/O controller 242 may connect to one or more I/O devices 244, such as frame buffers, disk drives, etc. It should be understood that the above processing modules and architectures are merely exemplary, and the various aspects of the present invention may be employed with other structures, including, but not limited to multiprocessor systems of the types disclosed in U.S. Pat. No. 6,526,491, entitled "Memory Protection System and Method for Computer Architecture for Broadband Networks," issued on Feb. 25, 2003, and U.S. application Ser. No. 09/816,004, entitled "Computer Architecture and Software Cells for Broadband Networks," filed on Mar. 22, 2001, which are hereby expressly incorporated by reference herein.

Figure 3:
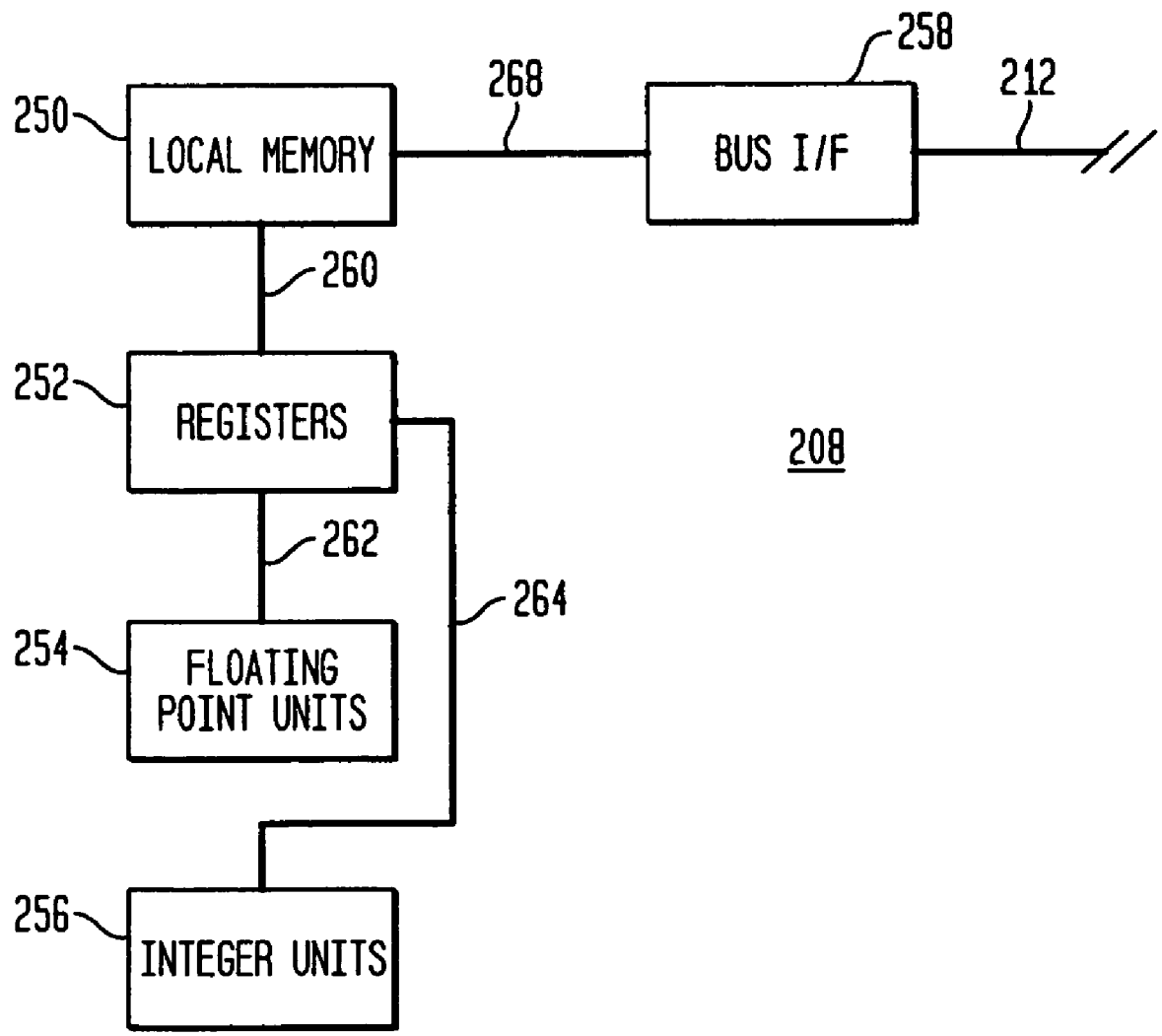
FIG. 3 is a diagram illustrating the structure of an exemplary sub-processing unit (SPU) in accordance with the present invention.

FIG. 3 illustrates an example of the structure and function of an SPU 208. SPU 208 includes local memory 250, registers 252, one ore more floating point units 254 and one or more integer units 256. Again, however, depending upon the processing power required, a greater or lesser number of floating points units 254 and integer units 256 may be employed. In a preferred embodiment, local memory 250 contains 128 kilobytes of storage, and the capacity of registers 252 is 128×128 bits. Floating point units 254 preferably operate at a speed of 32 billion floating point operations per second (32 GFLOPS), and integer units 256 preferably operate at a speed of 32 billion operations per second (32 GOPS).

In a preferred embodiment, the local memory 250 contains 256 kilobytes of storage, and the capacity of registers 252 is 128×128 bits. It is noted that processor tasks are not executed using the shared memory 214. Rather, the tasks are copied into the local memory 250 of a given sub-processing unit 208 and executed locally.

Local memory 250 may or may not be a cache memory. Local memory 250 is preferably constructed as a static random access memory (SRAM). A PU 204 may require cache coherency support for direct memory accesses initiated by the PU 204. Cache coherency support is not required, however, for direct memory accesses initiated by the SPU 208 or for accesses from and to external devices.

SPU 208 further includes bus 268 for transmitting applications and data to and from the SPU 208. The sub-processing unit 208 further includes a bus interface (I/F) 258 for transmitting applications and data to and from the sub-processing unit 208. In a preferred embodiment, the bus I/F 258 is coupled to a DMAC (not shown) that is integrally disposed within the sub-processing unit 208. Note that the DMAC 206 may be externally disposed (as shown in FIG. 3). A pair of busses interconnect the integrally disposed DMAC between the bus I/F 258 and the local memory 250. The busses would preferably be 256 bits wide. In a preferred embodiment, bus 268 is 1,024 bits wide.

SPU 208 further includes internal busses 260, 262 and 264. In a preferred embodiment, bus 260 has a width of 256 bits and provides communications between local memory 250 and registers 252. Busses 262 and 264 provide communications between, respectively, registers 252 and floating point units 254, and registers 252 and integer units 256. In a preferred embodiment, the width of busses 264 and 262 from registers 252 to the floating point or integer units is 384 bits, and the width of busses 264 and 262 from the floating point or integer units 254, 256 to registers 252 is 128 bits. The larger width of these busses from registers 252 to the floating point or integer units 254, 256 than from these units to registers 252 accommodates the larger data flow from registers 252 during processing. A maximum of three words are needed for each calculation. The result of each calculation, however, normally is only one word.

Figure 4:
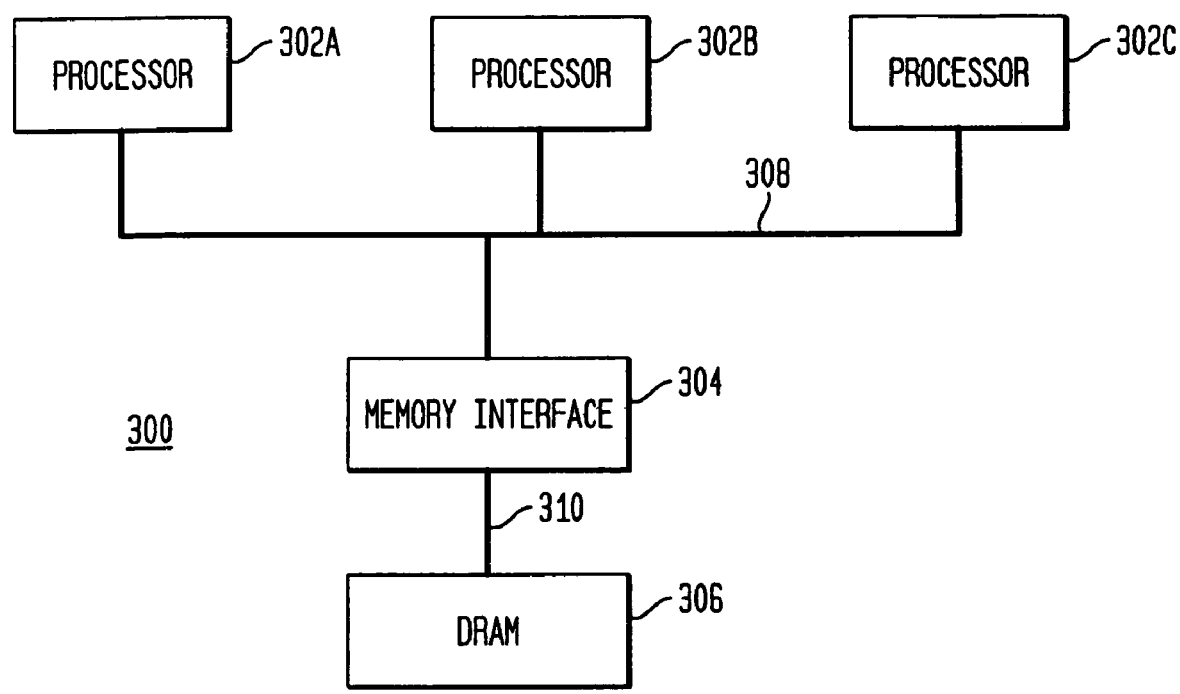
FIG. 4 is an alternative configuration suitable for implementing a multi-processor system in accordance with one or more aspects of the present invention.

It is noted that while the present invention is preferably carried out using the PE 200 of FIG. 2A, alternative single processor or multi-processor systems may also be employed. For example, the multi-processor system 300 of FIG. 4 may be used to carry out one or more aspects of the present invention. The multi-processor system 300 includes a plurality of processors 302 (any number may be used) coupled to a memory interface 304 over a bus 308. The memory interface 304 communicates with a shared memory 306, such as a DRAM, over another bus 310. The memory interface 304 may be distributed among the processors 302 and may also work in conjunction with a DMAC if desired. The processors 302 may be implemented utilizing the same or similar structure of FIG. 3 or any other known or hereinafter developed technology.

Figure 5:
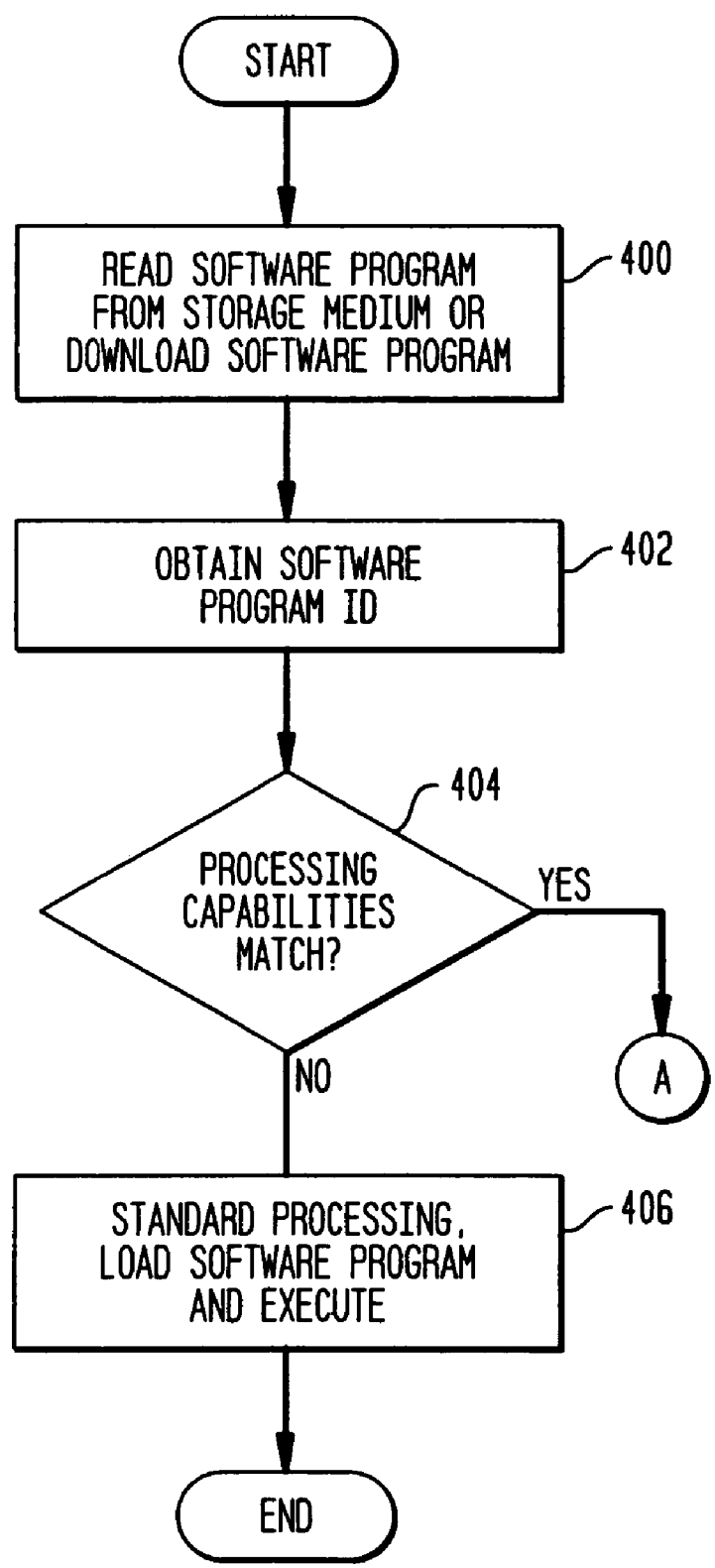
FIG. 5 is a flow diagram illustrating process steps that may be carried out at least in part by a processing system in order to alter its processing capabilities in accordance with one or more aspects of the present invention.

Reference is now made to FIG. 5, which is flow diagram illustrating process steps that may be carried out at least in part by the processing arrangement 118 employing, for example, the PE 200 (FIG. 2A), in order to obtain a modified version of a software program in accordance with one or more aspects of the present invention. It is understood that some or all of the process steps illustrated in FIG. 5 (and subsequent process steps) may be implemented by way of software, hardware, or a combination thereof integral or external to the PE 200.

For example, at action 400 a software program is read from a storage media into the random access memory (RAM) of the processing arrangement 118 (which may be a software player console). In this context, the PE 200 is a part of an overall software player console that is capable of reading a software program from a storage medium, such as an optical storage medium 122 (FIG. 1), a magnetic storage medium, or an electronic storage medium. As an example, when the storage medium is an optical storage medium, the storage medium may be a CD, a DVD or a Blu-ray disk and may be configured as either a "read only", a "writeable", or a "rewriteable" device. Alternatively, or in addition to these capabilities, the processing arrangement 118 may be operable to download software programs over a network, such as the Internet 124.

Turning again to FIG. 5, at action 402, the processing arrangement 118 obtains identification information indicative of a version of the software program. When the software program is read from a storage medium, the identification information may be a program ID located on the optical storage medium 122. Alternatively, the software program may be part of a file header or contained within a software program table that is likewise found on the optical storage medium 122. In many circumstances, the user copies the software program from the optical storage medium 122 to another storage medium contained within the processing arrangement 118, such as a hard disk drive, an electronic storage medium, etc. In such circumstances, the step of obtaining the software program ID may involve retrieving the ID from the internal storage medium within the processing arrangement 118 as opposed to obtaining the software program ID from an external storage medium.

When the software program is downloaded, such as via the Internet 124, the identification information may be the program ID, a user ID, etc. The identification information is preferably contained within the downloaded software program but, alternatively, may be stored within the processing arrangement 118 or entered by a user into the processing arrangement or into another device.

It is also noted that step 400 is not required to practice the invention, although it is likely to be performed prior to step 402 when the software program is stored on an internal storage medium of the processing arrangement 118, such as a hard disk. Further, step 402 may be carried out before step 400, such as when a user is authenticated prior to downloading or reading the software program.

At action 404, a determination is made as to whether the processing capabilities of the processing arrangement 118 substantially exceed those contemplated at the time that the software program was developed. More particularly, if the processing capabilities of the processing arrangement 118 so far exceed the capabilities contemplated by the software designer when the software program was developed that running the software program on the processing arrangement 118 would yield undesirable results, then special procedures may need to be carried out by the processing arrangement 118. In this regard, the processing arrangement 118 preferably utilizes the software ID or other identification information to determine the version of the software program and/or to obtain an indication of the processing capabilities needed to run the software program properly. The processing arrangement 118 may then compare the processing capabilities needed to run the software program and the processing capabilities of the processing arrangement 118.

Examples of the processing capabilities of the processing arrangement 118 that may far exceed those contemplated by software developers in the past are: the clock frequencies utilized by the processor to process data and applications. For example, a given SPU 208 (FIG. 2A) may normally operate at a clock frequency of about 4 GHz, which may be substantially higher than conventional processing systems. This may have a substantial impact on the number of floating point operations that may be carried out in a given unit of time will be reduced, the number of integer calculations that may be carried out in a given unit of time will be reduced, the number of instructions that may be carried out in a given unit of time will be reduced, etc. Furthermore, the PU 204, which conducts many managerial functions within the processor element 200, also relies on a clock frequency in order to carry out its functions. Still further, the bus 212 may also operate in accordance with the clock frequency, which may enjoy substantially faster operation as compared to conventional systems.

Other aspects and parameters of the processing arrangement 118 that may far exceed those of standard processing systems may include the memory map of the local memories 250 and/or the shared memory 214, the bus utilization of the bus 212 (such as by the PU 204), the bandwidth of the bus 212 (such as 128 bits, 64 bits, 32 bits, etc.). Other parameters of the processing arrangement 118 may include the cache size of the local memories 250 and/or the shared memory 214, the cache organization thereof, the instruction latency of one or more of the SPUs 208 of the PU 204 of the processing arrangement 118, the instruction throughput thereof, the memory latency of the local memories 250 and/or the shared memory 214, and the memory throughput thereof.

Still further, the endian of the processing arrangement 118 may not be optimum, e.g., a little endian (least significant byte at the end of a string) versus a big endian (most significant byte at the end of the string) Another parameter that may not be optimum is the instruction type, e.g., MIPS versus powerPC.

If the processing capabilities of the processing arrangement 118 do not exceed those needed to run the software program by such an extent as to cause undesirable results, then the result of the determination at action 404 may be in the negative, and the process flow may advance to action 406. At action 406, the processing arrangement 118 may execute the software program without taking any special steps to deal with any mismatch of processing capabilities. Following execution of the software program, the process flow may terminate.

Figure 6:
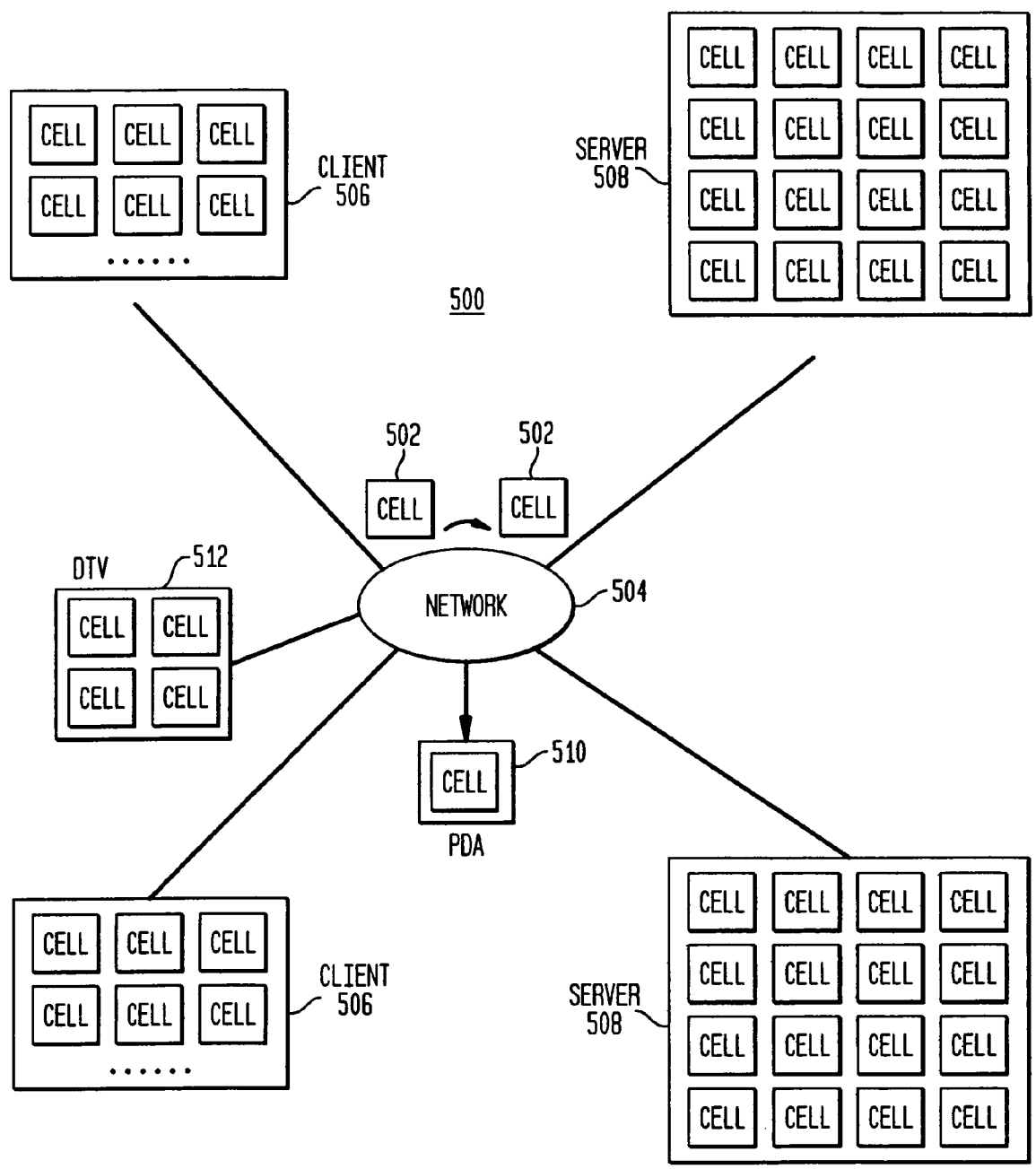
FIG. 6 is a block diagram of an overall computer network in accordance with one or more aspects of the present invention.
Figure 7:
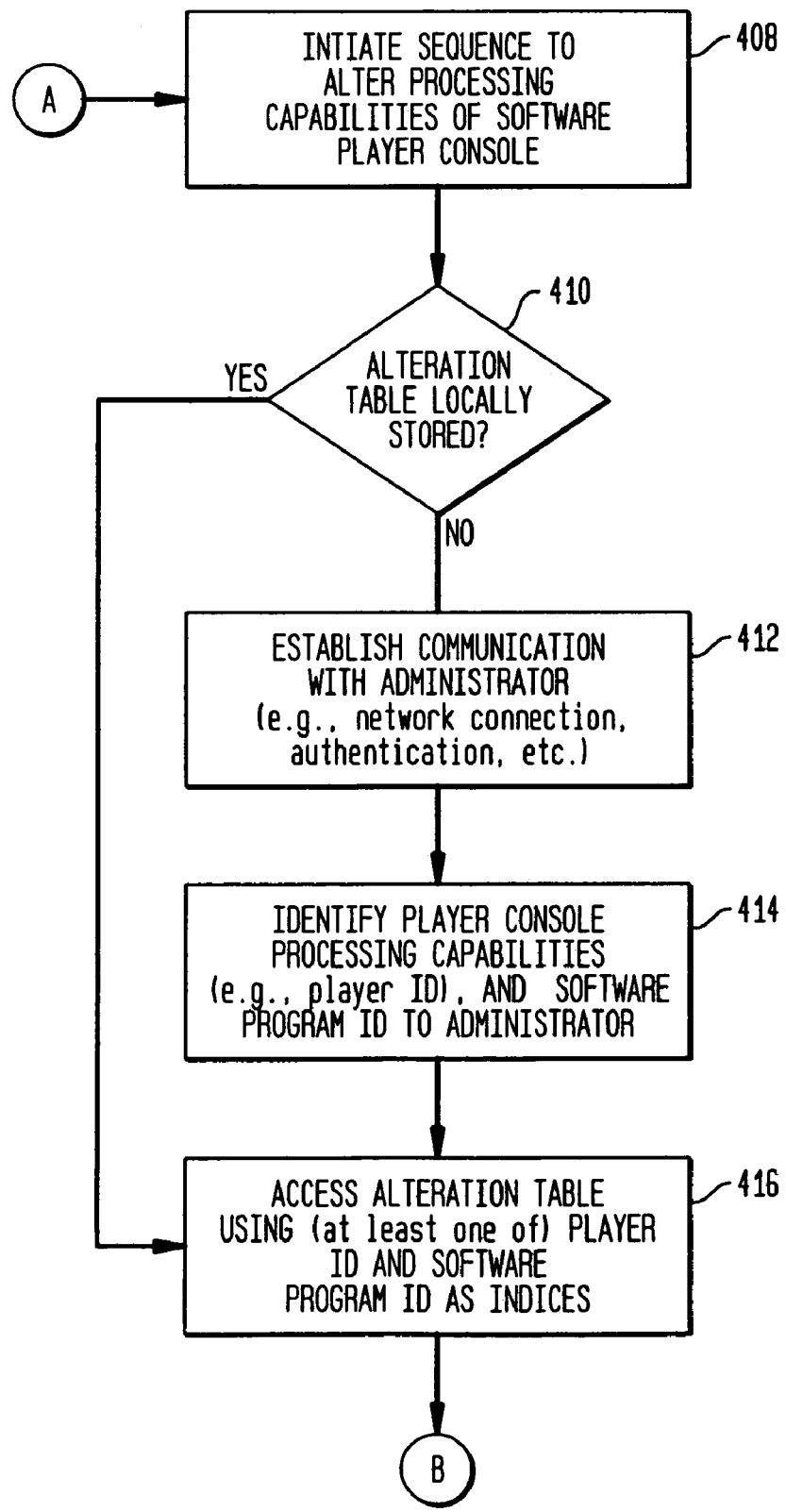
FIG. 7 is a flow diagram illustrating further process steps related to those of FIG. 5.

If the processing capabilities of the processing arrangement 118 are so far above those needed to run the software program, however, then the determination at action 404 may be in the affirmative and the process may branch to node A (FIG. 7). It is noted that the determination as to the processing capabilities of the processing arrangement 118 may entail an accounting of the number of processor elements 200 available to the processing arrangement 118. Indeed, one or more processor elements 200 may be contained within the processing arrangement 118, while one or more other processor elements may be located remotely from the processing arrangement 118. In this regard, reference is made to FIG. 6, which is a block diagram of an overall computer network in accordance with one or more aspects of the present invention. Here, the PEs 200 and/or broadband engines (made of multiple PEs) may be used to implement an overall distributed architecture for a computer system 500. The system 500 includes a network 504 to which a plurality of computer and/or computing devices may be connected. The network 504 may be a local area network (LAN), a global network, such as the Internet, or any other computer network. The computers and computing devices that are connected to the network 504 (the network's "members") include, e.g., client computers 506, server computers 508, personal digital assistants (PDAs) 510, digital television (DTV) 512, and other wired or wireless computers and computing devices. The processors employed by the members of the network 504 are preferably constructed from the PEs 200 or other suitable multiprocessor systems.

Since the servers 508 of the system 500 perform more processing of data and applications than clients 506, servers 508 contain more computing modules (e.g., PEs 200) then the clients 506. The PDAs 510, on the other hand, in this example perform the least amount of processing. Thus, PDAs 510 contain the smallest number of PEs 200, such as a single PE 200. The DTVs 512 perform a level of processing that is substantially between that of the clients 506 and the servers 508. Thus, the DTVs 512 contain a number of processor elements between that of the clients 506 and the servers 508.

It is noted, therefore, that the determination of the processing capability of the processing arrangement 118 performed at action 404 (FIG. 5) and the resultant determination as to whether or not to adjust the processing capabilities thereof, may involve a determination of the number of processor elements 200, for example, within and external to the processing arrangement 118.

Before returning to the description of the processing steps illustrated in FIG. 5, further details concerning the distributed system 500 of FIG. 6 will be provided. The homogenous configuration for the system 500 facilitates adaptability, processing speed, and processing efficiency. Because each member of the system 500 performs processing using one or more (or some fraction) of the same computing module, e.g., processor element 200, the particular computer or computing device performing the processing of data and/or application is unimportant because the processing of such data and applications may be shared among the network's members. By uniquely identifying the software cells comprising the data and applications processed by the system 500, the processing results can be transmitted to the computer or computing device requesting the processing regardless of where this processing occurred. Because the modules performing this processing have a common structure and employ a common instruction set architecture, the computational burdens of an added layer of software to achieve compatibility among the processors is avoided. This architecture and programming model facilitates the processing speed necessary to execute, e.g., real-time, multimedia applications.

To take further advantage of the processing speeds and efficiencies facilitated by the system 500, the data and applications processed by this system may be packaged into uniquely identified, uniformly formatted software cells 502. Each software cell 502 contains, or can contain, both applications and data. Each software cell also contains an ID to globally identify the cell throughout the network 504 and the system 500. This uniformity of structure for the software cells, and the software cells unique identification throughout the network, facilitates the processing of applications and data on any computer or computing device of the network 504. For example, a client 506 may formulate a software cell 502 but, because of the limited processing capabilities of the client 506, transmit the software cell 502 to a server 508 for processing. Software cells 502 can migrate, therefore, throughout the network 504 for processing on the basis of the availability of processing resources on then network 504.

The homogenous structure of processors and software cells 502 of the system 500 also avoids many of the problems of today's heterogeneous networks. For example, inefficient programming modules which seek to permit processing of applications on any ISA using any instruction set, e.g., virtual machines such as the Java virtual machine, are avoided. The system 500, therefore, can implement broadband processing far more effectively and efficiently than conventional networks.

Turning again to FIG. 5, the processing capabilities that the processing arrangement 118 enjoys are significant (particularly when it may draw upon the processing capabilities of external devices as shown in FIG. 6). Under some circumstances this may adversely affect the execution of a software program that was designed to run on a much less sophisticated system. Thus, when a determination is made at action 404 that the processing capabilities of the processing arrangement 118 (which may include external capabilities) exceed those contemplated for executing the version of the software program, the process flow preferably advances to node A (FIG. 7).

At action 408, a sequence to alter the version of the software program such that it may properly execute on the processing arrangement 118 is initiated. When it is determined that the processing capabilities of the processing arrangement 118 are incompatible (such as being too high), it is preferred that an alteration table is referenced to determine which of a plurality of predetermined software modules should be used to modify or replace the version of the software program. It is noted that the software modules may be portions of programs or complete software programs. In this regard, reference is now made to FIG. 8, which is an illustration of an alteration table 550 in accordance with one or more aspects of the present invention. In a general sense, the alternation table 550 associates respective identification information (e.g., software program IDs) with one or more software program and/or data modules. By way of illustration, the identification information is shown as being oriented in a vertical row 552, where each entry (0010, 0020, 0030 . . . N) represents a given piece of identification information, such as a software program ID. Associated with each piece of identification information is a software program and data module P1, P2, P3, etc. In accordance with some embodiments of the invention, there may be more than one module associated with each piece of identification information. Further embodiments of the invention may dictate that a complete, proper (or new) version of a software program be formed from one or more modules.

By way of example, the identification information labeled 0040 may correspond to a given version of a software program to be executed on the processing arrangement 118 and it may have been determined that the processing capabilities of the processing arrangement 118 far exceed those that were contemplated at the time that the software program was developed. It may have further been determined that the processing capabilities of the processing arrangement 118 are so high that if the given software program were to be executed at the full capabilities of the processing arrangement 118, undesirable results would obtain. Thus, the alteration table 550 may include one or more software program modules, P1, associated with identification information 0040. The software program and data module(s) P1 preferably represent part of or all of a proper software program, which may augment or replace the existing version of the software program identified by information 0040 to obtain a proper version of the software program. This version of the software program preferably exhibits desirable results when executed on the processing arrangement 118 as compared with the original version thereof.

In accordance with other aspects and embodiments of the present invention, the alteration table 550 preferably includes a further dimension that permits an association of the respective software program and/or data modules (or sets of modules) with a given piece of identification information. In this regard, the alteration table 550 preferably includes a dimension 556 along which a plurality of processing identifiers S001, S002, . . . S00X are disposed. Each processing identifier is associated with a super-set of software program and/or data modules, namely, a plurality of modules within a given unit of the dimension 556. Thus, each of the software program identifiers along column 552 are associated with each of the processing identifiers along dimension 556. Likewise, for a given identifier, such as identifier 0040, each of the software program and data module(s) are associated with a respective one of the processing identifiers S001, S002, . . . S00X.

Figure 8:
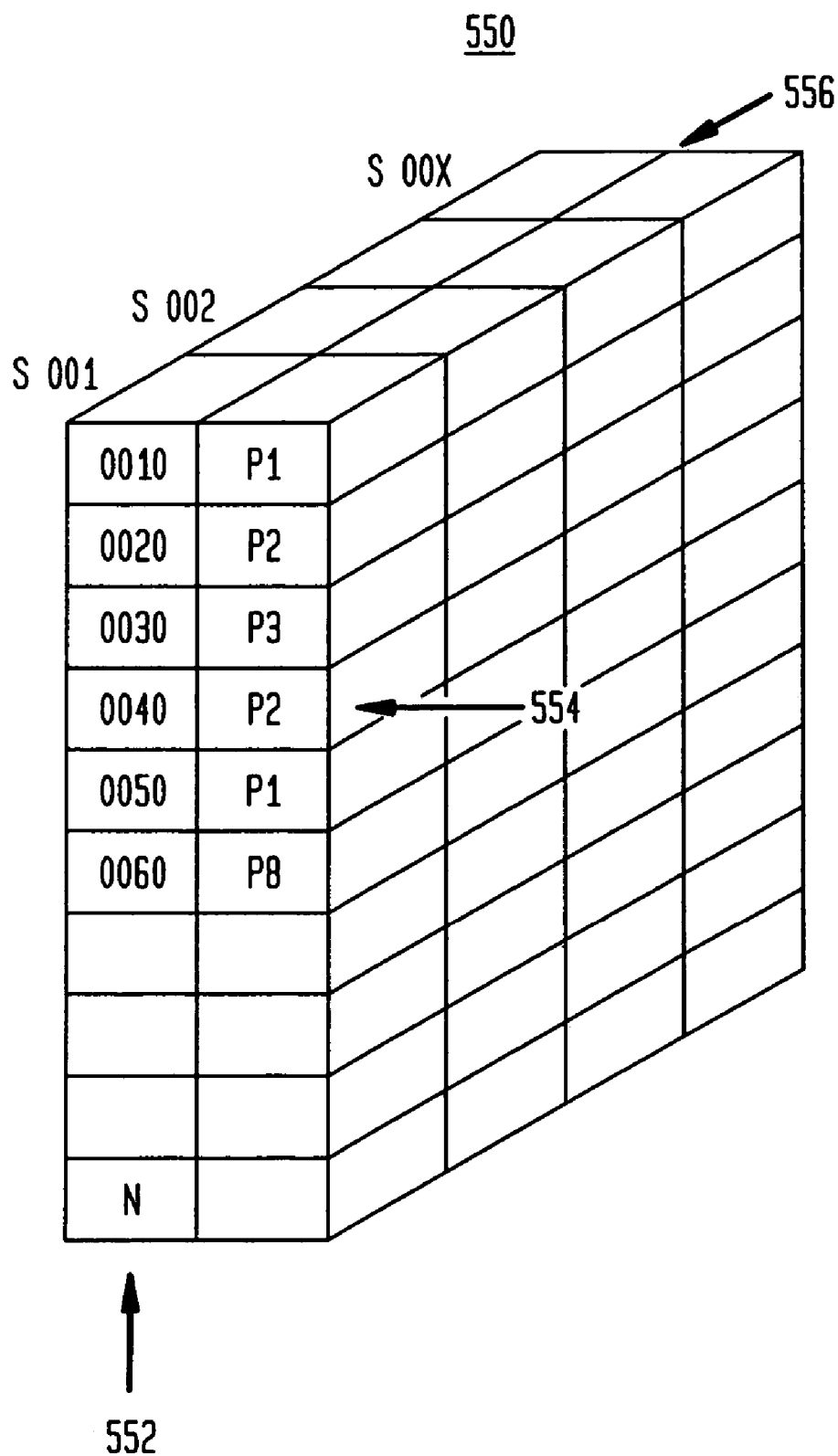
FIG. 8 is an alteration table used by the processing element in accordance with one or more aspects of the present invention.

In the example illustrated in FIG. 8, the software program and data module(s). P2 that are associated with identifier 0040 are also associated with processing identifier S001. A plurality of potentially different software program and/or data modules exist in association with identifier 0040, namely, those associated with both identifier 0040 and processing identifiers S001, S002, . . . S00X. Advantageously, this arrangement enables many degrees of freedom in terms of how to establish and maintain the software program and/or data modules, particularly when a given version of a software program may be executed on processing units having vastly different processing capabilities, for example, as is the case with the system 500 of FIG. 6.

Turning again to FIG. 7, at action 410, a determination is made as to whether the alteration table 550 is stored locally in the processing arrangement 118 or is located remotely from the processing arrangement 118, such as at a node on the network 124 (which may be the same network 504 of FIG. 6). In this regard, the alteration table 550 may be stored in one or more of the local memories 250 (FIG. 3) and/or in the shared memory 214 (FIG. 2A) of one or more processor elements 200. The advantage of having the alteration table 550 locally stored is that the time and effort necessary to access a remotely located alteration table are avoided. On the other hand, in order to insure that the contents of the alteration table 550 are accurate and updated, it may be advantageous to have the alteration table 550 stored remotely where it can be controlled and maintained by an administrative entity.

Figure 9:
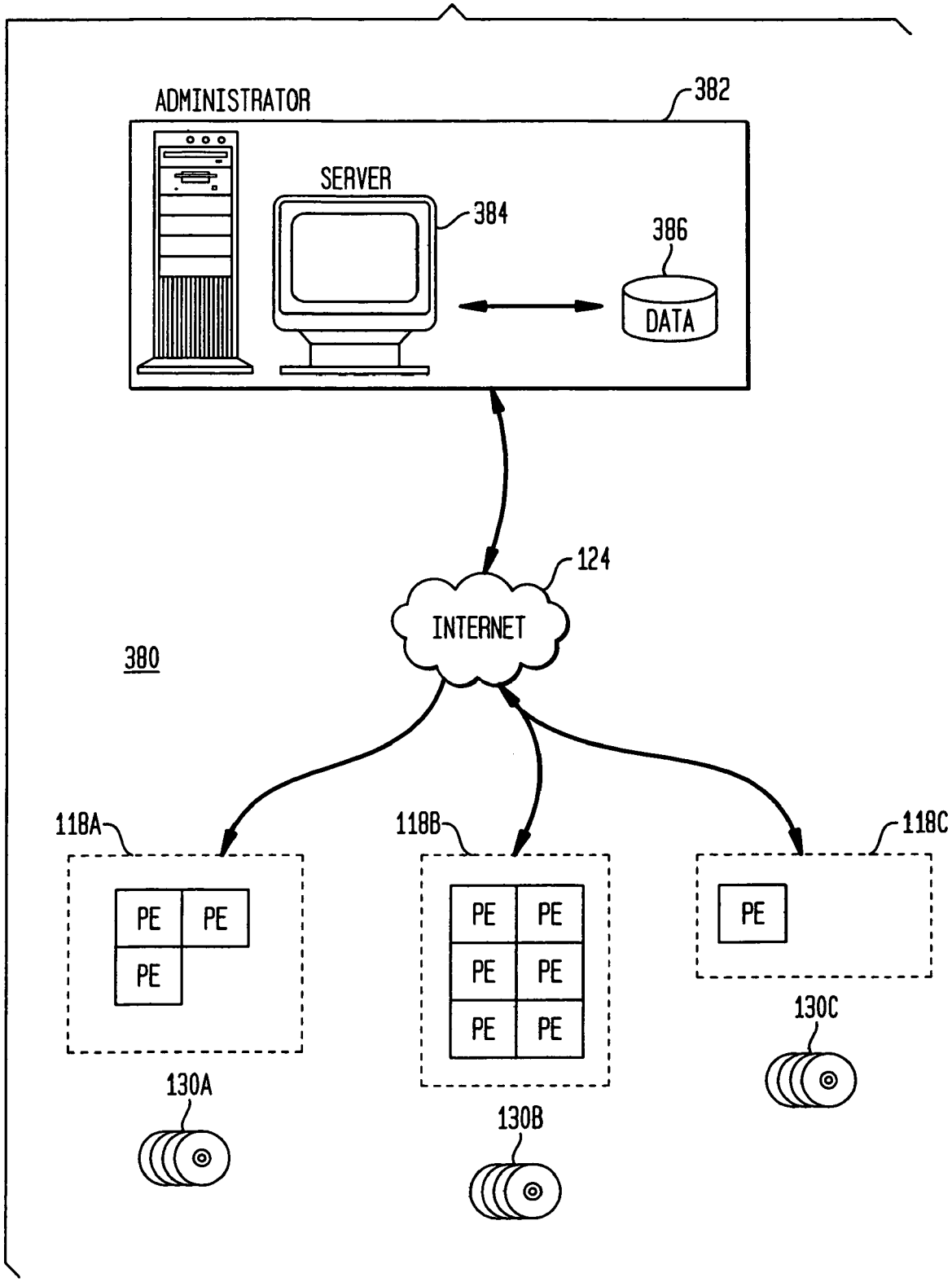
FIG. 9 is a block diagram of a processing system capable of network communication and operable to alter its processing capabilities in accordance with one or more aspects of the present invention.

In this regard, reference is made to FIG. 9, which is a block diagram of a processing system 380 comprising a plurality of processing arrangements 118A-C that are operatively connectable to a network, such as the Internet 124. An administrator 382, serving as an administrative entity, is also connectable to the Internet 124. The administrator 382 preferably includes a network and/or database server 384 that is operatively coupled to a database 386. The database 386 may reside at the same location as the server 384 or may be remotely connected to the server via another network connection. The plurality of processing arrangements 118A-C may have varying processing capabilities and, therefore, may contain and/or be used to execute different versions of software programs 130A-C. Advantageously, however, the processing arrangements 118A-C may avail themselves of the services provided by the administrator 382, which will ensure that the software programs 130A-C will properly execute and achieve desirable results even when the processing capabilities of the processing arrangements 118A-C far exceed those contemplated when the software programs 130A-C were developed and marketed.

When the alteration table 550 is not locally stored on the one or more processing units, such as processing arrangement 118 (or even if a version thereof is stored locally), it is preferred that a substantially accurate and updated version of the alteration table 550 is stored in the database 386 of the administrator 382. Turning again to FIG. 7, if the alteration table 550 is not locally stored, then the process flow preferably advances to action 412, where a given processing unit, such as processing arrangement 118, establishes a communication link with the administration 382 via the Internet 124. It is understood that while the Internet 124 provides a preferred link, any of the known communications techniques may be employed to establish a link without departing from the spirit and scope of the invention. Part of the action of establishing a communication link with the administrator 382 may include authentication of the processing arrangement 118 or the user thereof. Indeed, the services provided by the administrator 382 need not be enjoyed by users that are not willing to pay, or otherwise compensate, the administrator therefore. Thus, the authentication process may involve transmitting some substantially unique or otherwise controlling information from the processing arrangement 118 to the administrator 382 in accordance with known techniques. This information may include a user name and/or password, a membership number, a serial number of some kind, proof of purchase of software, etc.

Once the communications link is established between the processing arrangement 118 and the administrator 382, the process preferably advances to action 414 where at least the identification information concerning the software program (such as the software program ID or other indicia) is transmitted from the processing arrangement 118 to the administrator 382 over the Internet 124. Although not required, it is preferred that the alteration table 550 include the dimension 556, which dictates that a processing identifier such as a player ID number or other indicia of processing capabilities is transmitted from the processing arrangement 118 to the administrator 382 over the Internet 124.

Figure 10:
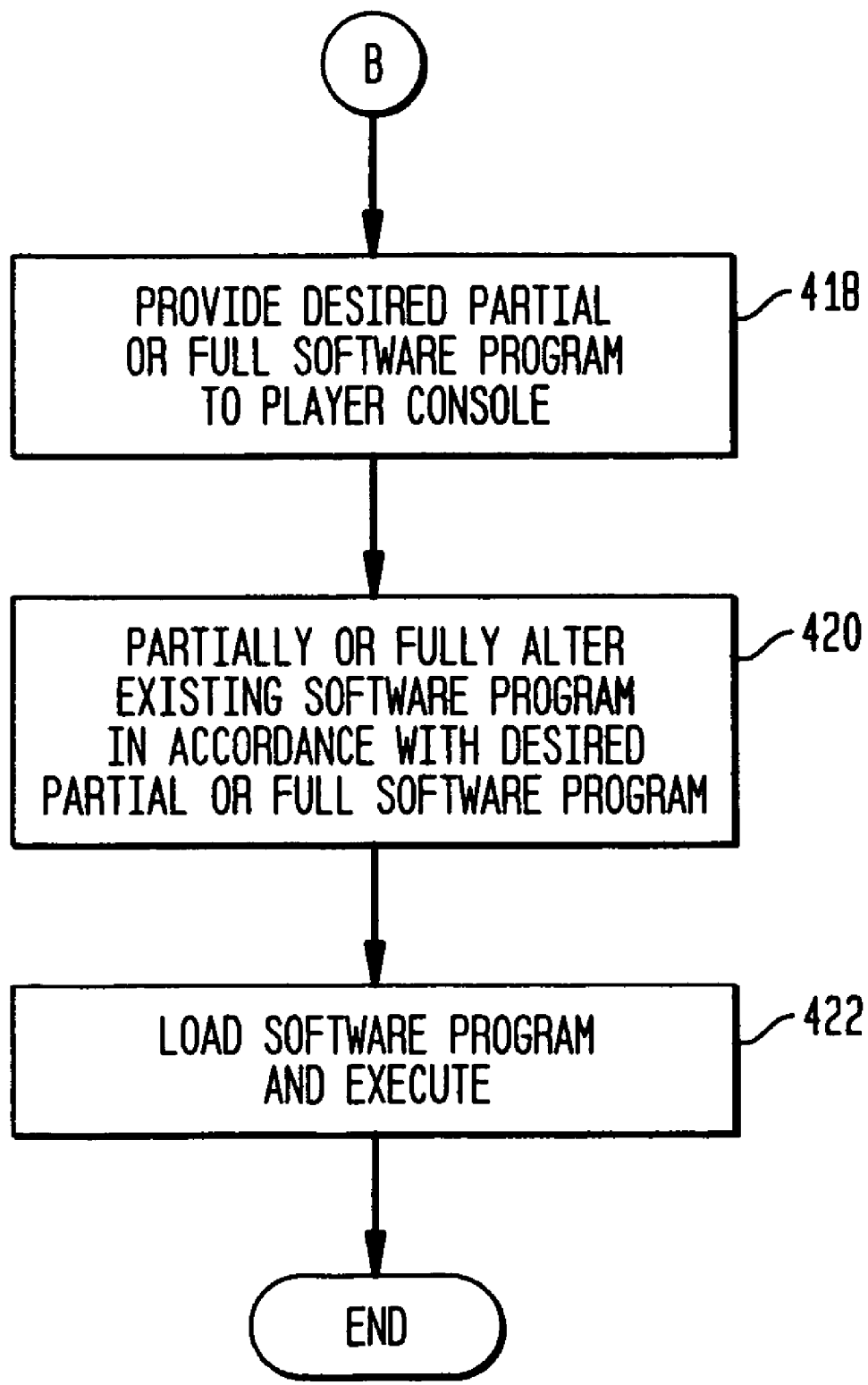
FIG. 10 is a flow diagram illustrating further process steps related to those of FIG. 7.

Next, the administrator 382 preferably utilizes the server 384 to process the incoming data and access the alteration table 550 (action 416). In particular, the server 384 preferably utilizes the identification information (and the processing identifier, if utilized) to obtain a one or more software program and/or data modules that may augment or replace the existing version of the software program in order to achieve desirable results when running the software program on the processing arrangement 118. Thereafter, the server 384 preferably packages the one or more module(s) in an appropriate form (e.g., the cell format discussed hereinabove) and transmits same to the processing arrangement 118 over the Internet 124. The process flow then preferably advances to node B, which is illustrated in FIG. 10, and to which reference is now made.

At action 418, the processing arrangement 118 preferably takes steps to modify the software program utilizing the software program and/or data modules received from the alteration table 550 (whether such modules were received from a locally stored version or from an administrative entity). Assuming that the processing arrangement 118 is under the control of an operating system or other system level control program, the one or more software program and/or data modules are preferably provided to such program such that actions may be taken to alter or overwrite the existing version of the software program stored in the processing arrangement 118. On the other hand, if an all hardware approach and/or if a combination software and hardware approach is taken, the modules are preferably routed to the appropriate destination, e.g., memory locations, etc. to effect the modifications to the software program.

At action 420, the processing arrangement 118 preferably alters or overwrites the existing version of the software program in accordance with the one or more modules provided.

As an example, when the version of the software program is stored in an optical device, such as a CD, DVD or Blu-ray Disc, that is not configured to be "read-only", the information stored on the optical device is altered or overwritten. When the device is "read-only", the modifications may be written on another device, such as a hard disk or an external memory card, e.g., a flash memory. At action 422, the processing arrangement 118 may execute the proper version of the software program, which advantageously results in desirable results as compared to the results obtained with the original version of the software program due to mismatches of processing capabilities. Following execution of the software program, the process flow may terminate.

In accordance with an alternative example of further aspects of the invention, some or all of the distributed system 500 (FIG. 6) may be used to execute a game title (software application). An extended functional module could be downloaded from an administrative entity to a client device. The extended functional module may operate to modify (become stored in) a storage medium of the client device (such as a memory, optical device or hard disc) such that it may be executed and enjoyed by the user. As an example, when the storage medium is an optical storage medium, the storage medium may be a. CD, a DVD or a Blu-ray disc and may be configured as either a "writeable" or a "rewriteable" device. Similarly, a basic functional module may be downloaded to the client device. The basic functional module may be replaced if the processor elements required for an extended functional module cannot be used. The replacement with a more optimal module may be achieved by downloading such module to the client device such that it may be executed.

In accordance with another aspect of the invention, the server broadcasts multi-streaming data, in which a version of the software programs and/or data modules is packaged, instead of downloading the software programs and/or data modules to a respective processing arrangement. The processing arrangement then selects one or more suitable software programs and/or data modules from the multi-streaming data. When only limited bandwidth is available between the client terminal apparatus and a router (not shown) that connects to the Internet, the router may select the suitable software programs and/or data modules. The processing load of the server is thereby reduced. Preferably, the selection of the suitable software programs and/or data modules from the multi-streaming data is based on the user ID or on the software ID included in the multi-streaming data.

It is also preferred that the software programs and/or data modules be obtained from the server in consideration of other conditions, such as the processing capabilities of the server, the processing capabilities of the client terminal apparatus, and/or the bandwidth.

Figure 11:
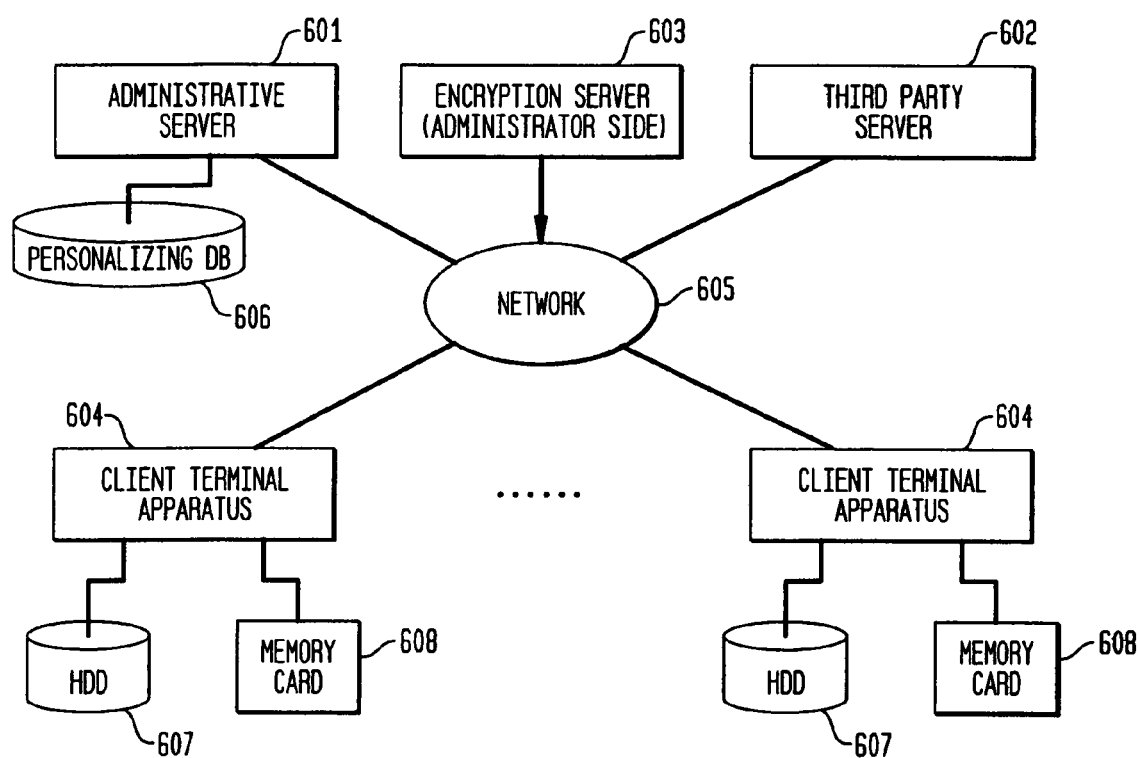
FIG. 11 is a block diagram of a system for distributing software programs and software program and/or data modules to one or more users.

FIG. 11 shows an example of a system 610 that is operable to permit the processing arrangement 118 to download program content, such as the software programs and/or the software program and/or data modules described above, in a secure manner, e.g., such that unauthorized copies are either prevented or rendered useless. Such a system is described in U.S. application Ser. No. 10/316,675 titled "METHODS AND APPARATUS FOR SECURE DISTRIBUTION OF PROGRAM CONTENT", filed Dec. 11, 2002 and published on Jul. 3, 2003 as Application Publication No. US 2003/0123670 A1, the disclosure of which is incorporated herein by reference.

The system 610 preferably includes an administrative server 601, a third party server 602, an encryption server 603, and a plurality of client terminal apparatus 604, such as the processing arrangements 118, all coupled to a network 605, such as the Internet. It is noted that the system 610 may include a plurality of administrative servers 601, a plurality of third party servers 602, and a plurality of encryption servers 603. For brevity and clarity, only one of each such servers will be described in detail herein.

Each of the servers 601, 602, 603 is preferably maintained by, controlled by, and/or otherwise associated with an entity or person. It is noted that reference may be made herein to the server and the entity associated therewith interchangeably.

The administrative server 601, such as the server 384 described above, which is preferably operably coupled to a personalizing database 606, such as the above-described database 386, and is preferably maintained by, controlled by, and/or otherwise associated with an entity charged with performing certain administration functions. The administrative server 601 and personalizing database 606 may be implemented utilizing any of the known hardware suitable for carrying out network server functions and database functions.

The third party server 602 is preferably controlled by, maintained by, and/or otherwise associated with an entity other than that of the administrative server 601, such as a developer of software programs and/or software program and/or data modules. By way of example, the third party server 602 may be a developer of computer application programs, computer system programs, etc. It is noted, however, that the entity associated with the third party server 602 need not be different than that of the administrative server 601 and, indeed, may be the same entity. For example, the functions carried out by the third party server 602, may be carried out by the administrative server 601. The third party server 602 may be implemented utilizing any of the known hardware for carrying out server related functions.

The encryption server 603 is preferably controlled by, maintained by, and/or otherwise associated with the same entity as that of the administrative server 601. As an example, the encryption server may be co-located with the server 384 within the administrator 382. It is noted, however, that the encryption server 603 may be associated with another entity. The encryption server 603 may be implemented utilizing any of the known hardware for carrying out server related functions. The respective functions carried out by the administrative server 601, the third party server 602, and the encryption server 603 may be distributed among one or more servers and/or one or more entities controlling, maintaining, and/or being otherwise associated with those servers, although such distribution is preferably consistent with that illustrated in FIG. 11.

Generally, each client terminal apparatus 604 is preferably operably coupled to a hard disk drive 607, such as any of the known hard disk drive hardware, and a memory card 608, such as the Sony Memorystick. Alternatively, the client terminal apparatus is coupled to an optical device such as a CD drive, a DVD drive, or a Blu-ray disk drive, which operate as described above. While the hard disk drive 607, memory card 608 and/or optical device (which is preferably removably coupled to the client terminal apparatus 604) are shown as separate items from the apparatus 604, it is understood that they may be integrally located with the apparatus 604. The client terminal apparatus 604 may be implemented utilizing any of the known hardware, such as a personal computer, the PlayStation 602, etc.

The client terminal apparatus 604 preferably includes one or more processing arrangements 118 and is preferably operable to receive a source encrypted program or to receive source encrypted program and/or data modules, such as the computer programs or modules described above, by way of downloading over the network 605. While the source encrypted program or source encrypted modules may be obtained from any authorized entity, it is preferred that the client terminal apparatus 604 receives the source encrypted program or the source encrypted modules from the third party server 602 (e.g., by way of downloading over the network 605) or from the administrative server 603.

Thus, the end-user may receive the computer program and/or the program and/or data modules in a form (i.e., source encrypted) in which it cannot be used to execute or modify the program on the client terminal apparatus 604 without first obtaining a decryption key and decrypting the source encrypted program and/or the source encrypted modules. The decryption key may only be obtained by an authorized client terminal apparatus 604.

Figure 12:
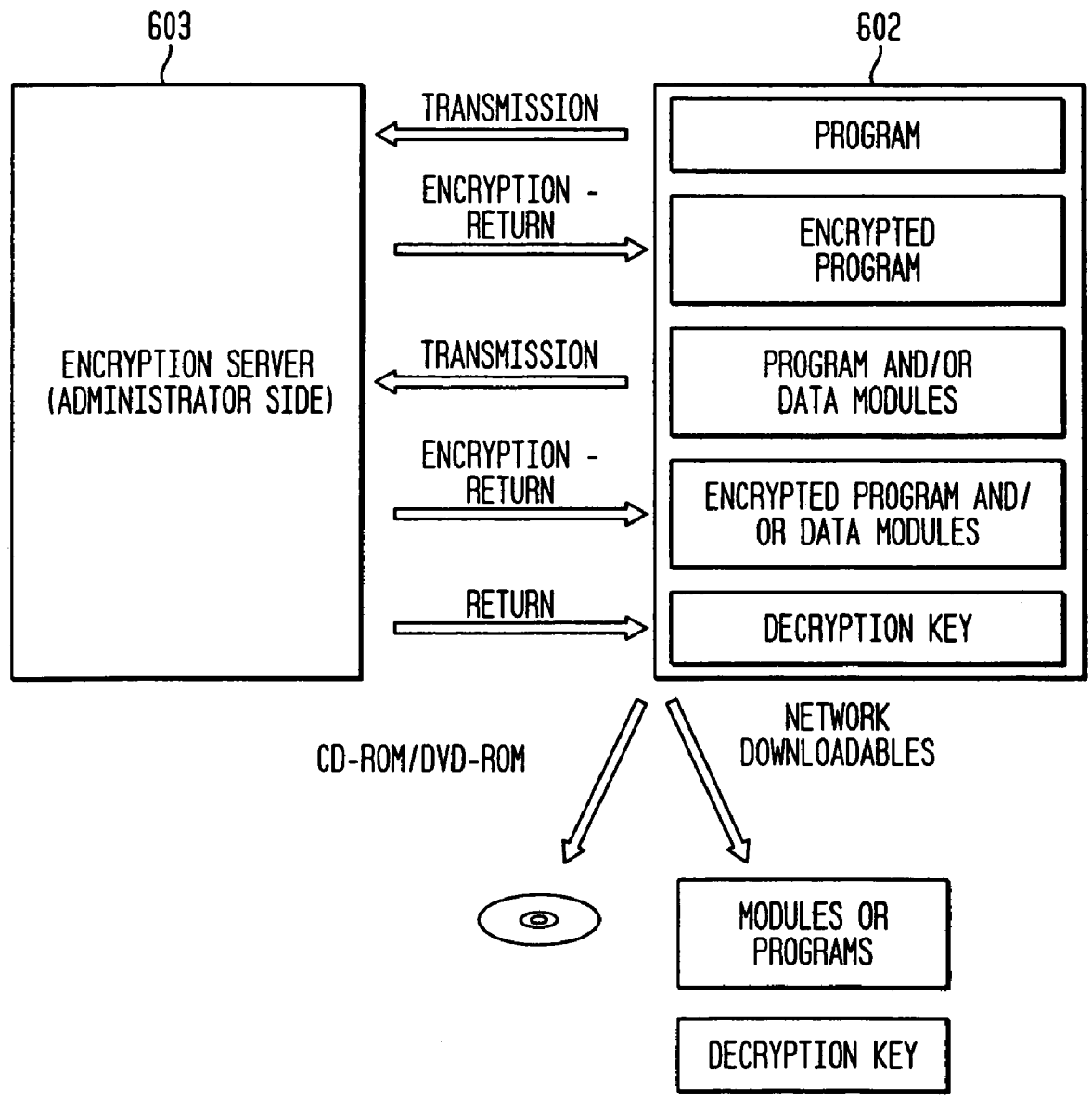
FIG. 12 is a conceptual block diagram and flow diagram illustrating certain process steps that are carried out by certain portions of the system of FIG. 11.

Reference is now made to FIG. 12, which is a conceptual block diagram and flow diagram illustrating certain process steps performed by the encryption server 603 and the third party server 602. This figure provides an example of how the source encrypted computer program or source encrypted modules are generated. In this example, the third party server 602 is associated with a software developer that either itself or in conjunction with another entity obtains programs and/or obtains software and/or data modules. As shown in FIG. 12, the third party server 602 may contain at least one program, such as a system program or an application program, and/or at least one software program and/or data module. One or more of these programs or modules are transmitted to the encryption server 603 over the network 605.

The encryption server 603 preferably encrypts the software program or the software program and/or data modules and returns the encrypted program or the encrypted modules to the third party server 602. The encryption process may employ any of the known encryption techniques, such as public key encryption, symmetric key encryption, etc., in order to produce the encrypted program or the encrypted modules. Also, the encryption server 603 may provide the decryption key, which is capable of decrypting the encrypted program or the encrypted modules, to the third party server 602. The third party server 602 may distribute the encrypted program and/or the encrypted modules to the client terminal apparatus 604 by way of an electronic download over the network 605. Irrespective of how the source encrypted program or the source encrypted program and/or data modules are distributed, however, the end-user preferably cannot execute the program and/or modify the program without performing certain registration steps.

Figure 13:
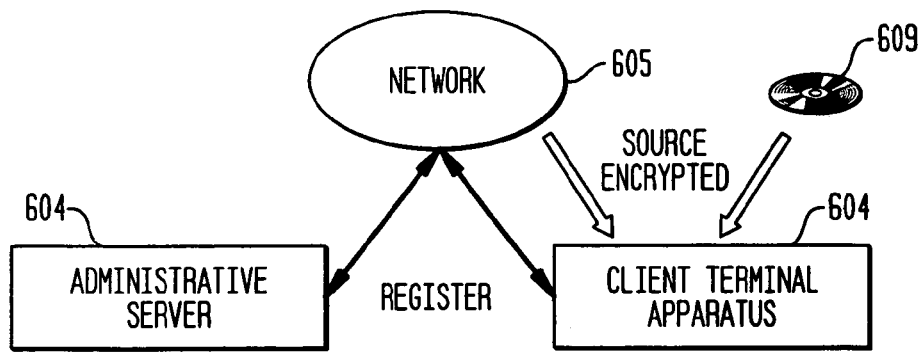
FIG. 13 is a further conceptual block diagram and flow diagram illustrating further steps that are carried out by certain portions of the system of FIG. 11.

Reference is now made to FIG. 13, which is a conceptual block diagram and flow diagram illustrating certain process steps that are preferably carried out in order to process the source encrypted computer program and/or the source encrypted modules. The client terminal apparatus 604 has preferably received the source encrypted computer program and/or the source encrypted modules by way of a downloading operation over the network 605. In order to execute the source encrypted computer program or to modify an existing program, however, the client terminal apparatus 604 must register the source encrypted computer program or the source encrypted modules, preferably with the administrative server 601 over the network 605.

Figure 14:
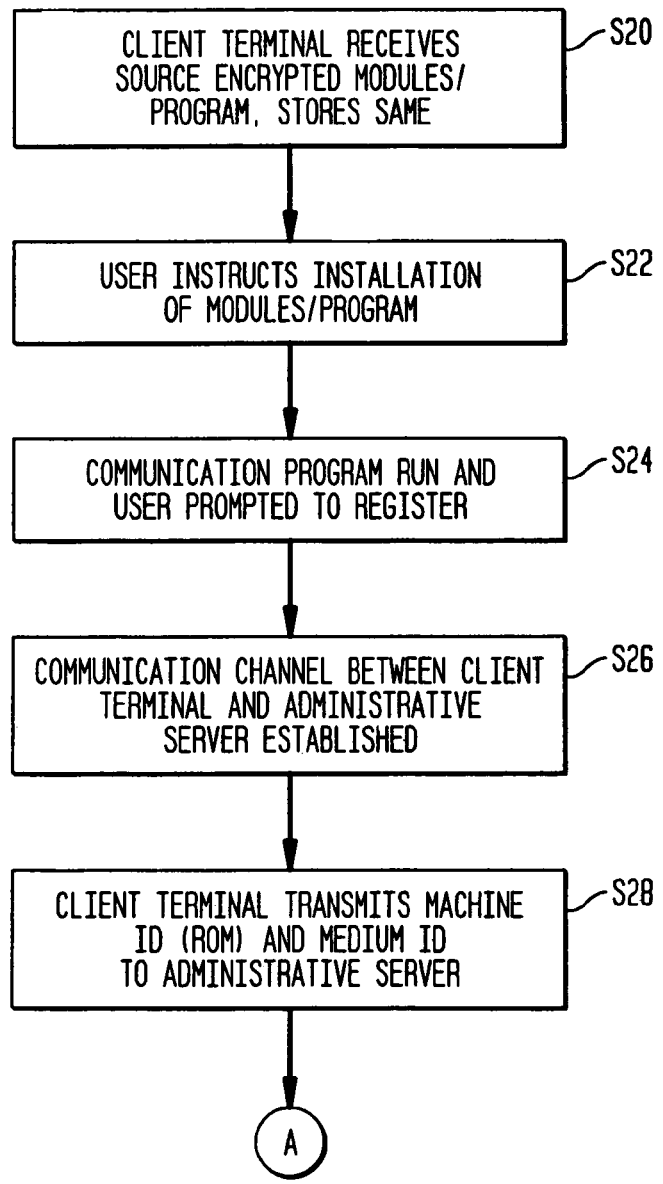
FIG. 14 is a flow diagram showing certain process steps carried out as illustrated in FIG. 13.

At least some of the steps in the registration process are illustrated in the flow diagram of FIG. 14. At step S20, the client terminal apparatus 604 receives the source encrypted computer program or the source encrypted modules and stores the same as discussed hereinabove. At step S22, the user preferably provides an instruction indicating that he or she wishes to install the downloaded computer program and make it ready for execution or wishes to modify an existing program. In this regard, the client terminal apparatus 604 preferably includes a further computer program that is invoked in response to the user's installation instruction. The further program prompts the user to register the source encrypted computer program or the source encrypted modules and invokes a communication feature (step S24).

It is noted that the client terminal apparatus 604 preferably includes a network interface, which is operable to provide communications over the network 605 as is known in the art. Any of the known network interface hardware may be employed for this purpose. At step S26, a channel of communication is preferably initiated by the client terminal apparatus 604 and established between the apparatus 604 and the administrative server 601. The network interface of the client terminal apparatus 604 is preferably operable to facilitate the transmission of at least some identification information related to the apparatus 604 to the administrative server 601 over the network 605. In particular, the identification information preferably includes a machine ID, such as the above-described player ID, that is substantially unique to the client terminal apparatus 604. The identification information may also include a medium ID, which indicates a type of memory employed by the client terminal apparatus 604 to store the source encrypted computer program.

It is preferred that the client terminal apparatus 604 include a first storage device, such as the hard disk drive 607, the memory card 608, etc. operable to store the source encrypted computer program and/or the source encrypted modules together with certain other information that will be discussed hereinbelow, and a second storage device, such as a read only memory (ROM) that is operable to store the machine ID. The network interface of the client terminal apparatus 604 is preferably further operable to transmit the machine ID (from the ROM) over the network 605 to the administrative server 601 (action S28). The medium ID may also be transmitted from the client terminal apparatus 604 to the administrative server 601.

With reference to FIG. 15, the administrative server 601 receives the identification information, e.g., the machine ID (and possibly the medium ID) from the client terminal apparatus 604 over the network 605 (step S30). In this regard, the administrative server 601 preferably includes a network interface operable to facilitate communication with the network 605 such that the identification information may be received over the network 5 from the client terminal apparatus 604. At step S32, the administrative server 601 assigns another ID, called a virtual ID herein, that corresponds with the machine ID received from the client terminal apparatus 604. It is noted that the virtual ID may be selected from a plurality of preexisting IDs, the virtual ID may be derived through numeric operations performed on the machine ID or some other operand, or any other known or hereinafter developed technique may be employed to generate the virtual ID.

At step S34, the administrative server 601 searches the personalizing database 606 for an existing machine ID that matches the machine ID received from the client terminal apparatus 604 (i.e., the machine ID stored in the second storage device(ROM) thereof). With reference to FIG. 16, the personalizing database 606 is preferably operable to store respective registration information, each set of registration information corresponding with a respective one of the client terminal apparatus 604. At least some identification information of the client terminal apparatus 604 is included in the registration information, such as the machine ID. As illustrated in FIG. 16, a plurality of machine IDs are pre-stored in the personalizing database 606, as shown in the left column of FIG. 16. It is preferred that each of these machine IDs corresponds with a given one of the client terminal apparatus 604 and that such machine IDs are substantially unique to the respective client terminal apparatus 604. The administrative server 601 also preferably includes a data processor operable to search the personalizing database 606 for the registration information (e.g., the machine ID) that matches the machine ID received from the client terminal apparatus 604 over the network 605. Any of the known or hereinafter developed data processing hardware may be employed for this purpose.

Turning again to FIG. 15, at step S36, the virtual ID is associated with the machine ID stored in the personalizing database 606, which is to say that the virtual ID is associated with the particular client terminal apparatus 604 that transmitted the received machine ID to the administrative server 601. This association is preferably achieved by storing the virtual ID within the personalizing database 606 in a manner such that it corresponds with the stored machine ID.

As noted above, the identification information transmitted from the client terminal apparatus 604 to the administrative server 601 over the network 605 (step S28, FIG. 14) may include the transmission of a medium ID (or media ID) that corresponds with the type of storage device employed by the client terminal apparatus 604 to store the source encrypted computer program or the source encrypted program and/or data modules. For example, the medium ID may indicate that the client terminal apparatus 604 stores the source encrypted computer program or the source encrypted modules in a hard disk drive 607, in a memory card 608, or in some other type of storage medium. In response, the administrative server 601 may associate the virtual ID with the stored machine ID and the received medium ID by storing the received medium ID in the personalizing database 606 at a position that corresponds with the stored machine ID.

Figure 17:
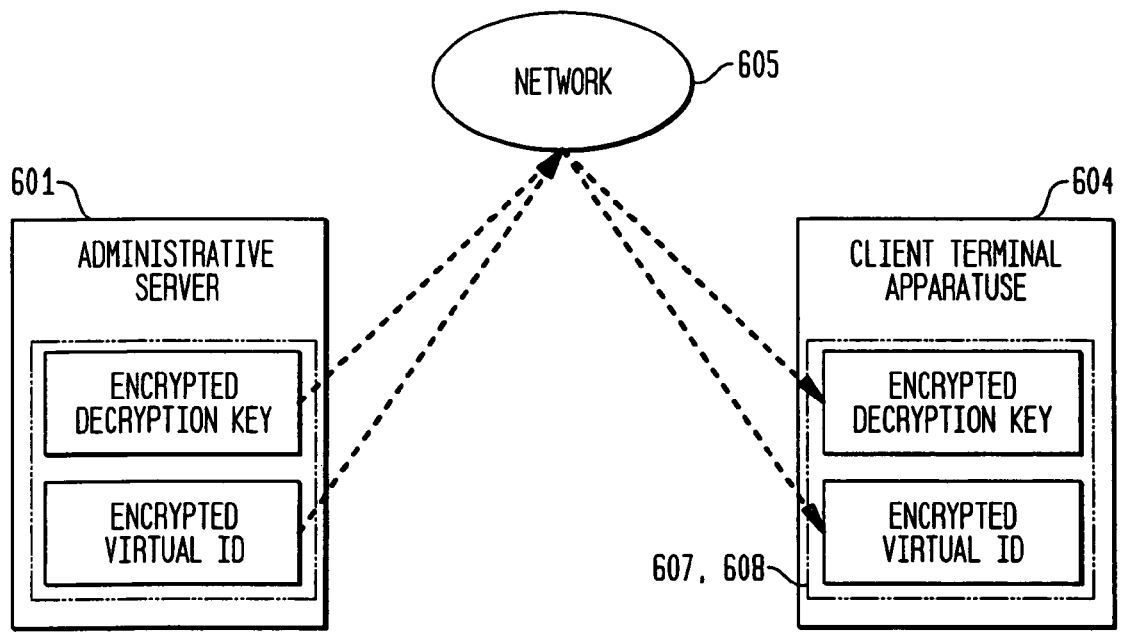
FIG. 17 is a further conceptual block diagram and flow diagram illustrating certain process steps carried out by portions of the system of FIG. 11.
Figure 18:
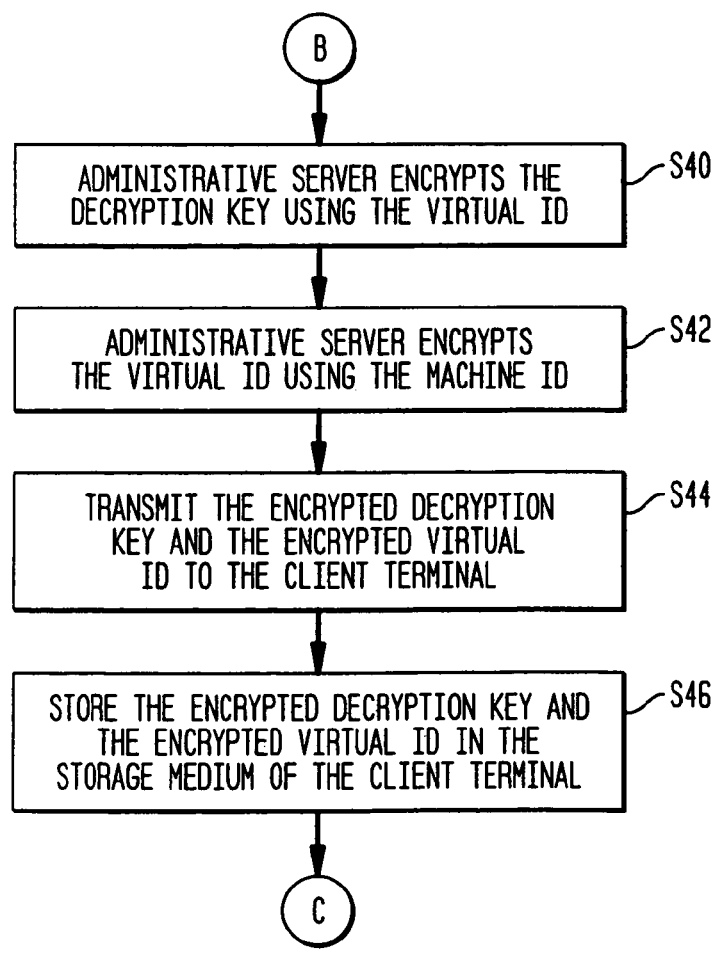
FIG. 18 is a flow diagram illustrating further process steps carried out in accordance with FIG. 17.

With reference to FIGS. 17 and 18, the administrative server 601 is preferably operable to produce an encrypted decryption key and an encrypted virtual ID, where the decryption key is operable for use in decrypting the source encrypted computer program or the source encrypted modules at the client terminal apparatus 604. It is noted that the administrative server 601 may have access to any number of decryption keys that may be used to decrypt respective source encrypted computer programs produced by the encryption server 603 (FIGS. 11-12). These decryption keys may be provided to the administrative server 601 by the encryption server 603 and/or by the third party server 602. Furthermore, the decryption keys may be transmitted to the administrative server 601 by way of the network 605, by way of another network, or may be manually provided by way of storage media, etc.

At step S40, the administrative server 601 preferably encrypts the decryption key using the virtual ID associated with the client terminal apparatus 604. Further, the administrative server 601 preferably encrypts the virtual ID using the associated machine ID of the client terminal apparatus 604, each of which is preferably obtained from the personalizing database 606 (step S42).

The network interface of the administrative server 601 is preferably further operable to facilitate the transmission of the encrypted decryption key and the encrypted virtual ID to the client terminal apparatus 604 over the network 605 (step S44). At step S46, the client terminal apparatus 604 preferably receives the encrypted decryption key and the encrypted virtual ID over the network 605 and stores same in the first storage device (e.g., the hard disk drive 607, the memory card 608, etc.).

The encrypted decryption key is only provided to an authorized client terminal apparatus 604, e.g., a client terminal apparatus 604 that has provided a valid machine ID and has registered such machine ID in association with a virtual ID used to encrypt the decryption key. Furthermore, any interception of the encrypted decryption key, such as by way of network piracy or unauthorized duplication, will fail to provide the necessary information (i.e., a usable decryption key) to decrypt the source encrypted computer program. Indeed, such a decryption key is encrypted with a substantially unique virtual ID. Similarly, the encrypted virtual ID is provided to the client terminal apparatus 604 only after the registration process has been completed and the client terminal apparatus 604 has been deemed authorized. As the virtual ID is transmitted from the administrative server 601 to the client terminal apparatus 604 in an encrypted manner (i.e., encrypted using the machine ID of the client terminal apparatus 604), any unauthorized acquisition of the encrypted virtual ID will not yield the necessary information to decrypt the encrypted decryption key.

Figure 19:
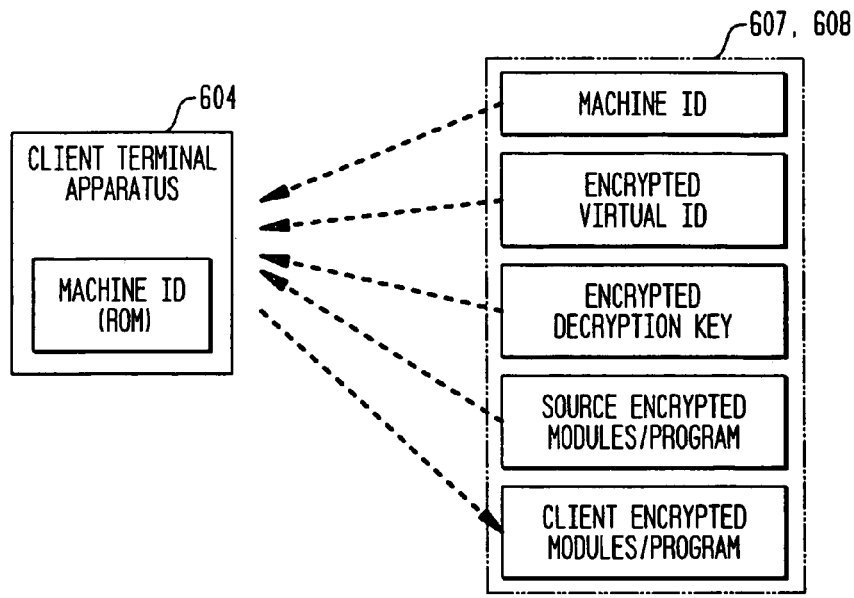
FIG. 19 is a further conceptual block diagram and flow diagram illustrating one or more further process steps carried out by, for example, the client terminal apparatus 604 of FIG. 11.
Figure 20:
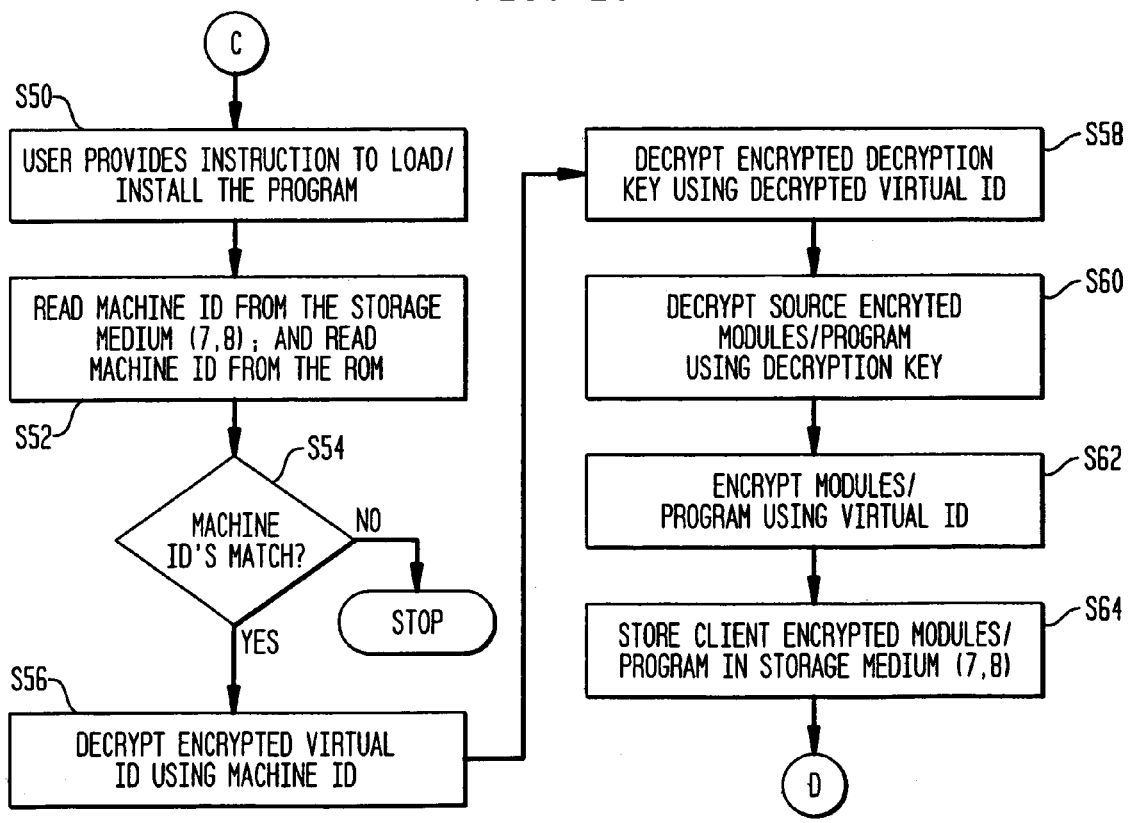
FIG. 20 is a flow diagram illustrating further process steps carried out in accordance with FIG. 19.

Reference is now made to FIGS. 19 and 20, which illustrate certain processes that are carried out in order to load/install the source encrypted computer program and/or the source encrypted modules within the client terminal apparatus 604. FIG. 19 illustrates that the client terminal apparatus 604 is separate from the first storage device, e.g., the hard disk drive 607, the memory card 608, etc. As discussed above, however, these elements may be integrated or semi-integrated. It is noted that at this stage of the process, the client terminal apparatus 604 includes the machine ID stored in the second storage device, e.g., the ROM, and the first storage device 607, 608 contains the following items: the machine ID, the encrypted virtual ID, the encrypted decryption key, and the source encrypted computer program.

At step S50, the user may provide an instruction to the client terminal apparatus 604 to load/install the source encrypted computer program or to modify an already installed/loaded software program using the source encrypted program and/or data modules. In response, the client terminal apparatus 604, using appropriate hardware and software processes, reads the machine ID from the first storage device 607, 608 and reads the machine ID from the second storage device, e.g., the ROM (step S52). At step S54, a determination is made as to whether these machine IDs match. If they do not, then the process terminates and/or enters an alternative process. If they match, however, the process flow advances to step S56, where the encrypted virtual ID is decrypted using the machine ID (preferably the machine ID that was stored in the ROM). Once the virtual ID is obtained, the encrypted decryption key is decrypted using the virtual ID (step S58). Next, the source encrypted computer program or the source encrypted modules are decrypted using the decryption key (step S60). At step S62, the computer program or the program and/or data modules may be re-encrypted using the virtual ID obtained at step S56 to obtain a client encrypted computer program or client encrypted modules. The client encrypted computer program or the client encrypted modules are stored in the first storage device 607, 608 (step S64). At this stage, neither the encrypted decryption key, the source encrypted computer program nor the source encrypted modules need be retained in the first storage device 607, 608.

The client terminal apparatus 604 preferably includes a decryption device and an encryption device in order to execute the encryption and decryption functions discussed hereinabove. The decryption device and the encryption device may be integrated together and, for simplicity referred to as a decryption device. Any of the known or hereinafter developed hardware and/or software for performing such encryption and decryption may be employed in accordance with the invention. For example, a decryption library, an encryption library, etc., may be employed.

The client encrypted computer program and/or client encrypted modules are secure because unauthorized copies thereof cannot be executed by unauthorized end-users on different client terminal apparatus 604. Indeed, the client encrypted computer program and/or the client encrypted modules must first be decrypted, which as will be explained hereinbelow cannot be performed on any other client terminal apparatus 604 other than the one that registered the computer program with the administrative server 601.

Figure 21:
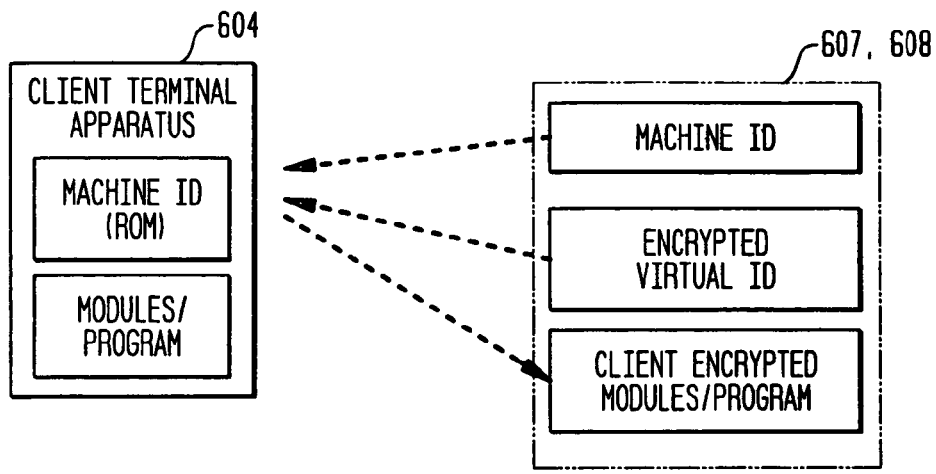
FIG. 21 is a conceptual block diagram and flow diagram illustrating further process steps.
Figure 22:
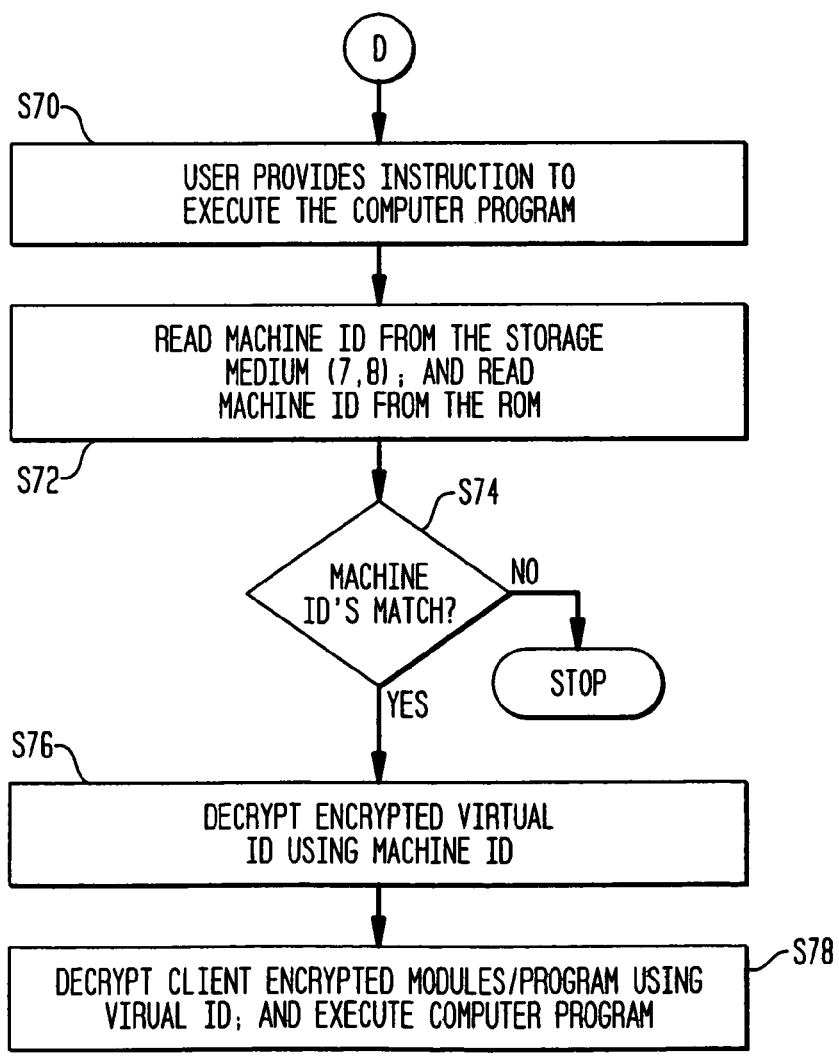
FIG. 22 is a flow diagram illustrating further details concerning the process steps of FIG. 21.

With reference to FIGS. 21 and 22, the process by which the computer program is executed or modified by the client terminal apparatus 604 will now be discussed. At this stage in the process, the client terminal apparatus 604 includes the second storage device, e.g., the ROM, containing the machine ID and the first storage device 607, 608 containing the machine ID, the encrypted virtual ID, and the client encrypted computer program.

At step S70, the user may provide an instruction to the client terminal apparatus 604 to execute or modify the computer program. In response, the client terminal apparatus, operating under the control of an appropriate computer program, reads the machine ID from the first storage device 607, 608 and reads the machine ID from the second storage device (ROM) (step S72). At step S74 a determination is made as to whether the machine IDs match one another. If the machine IDs match, the process flow advances to step S76, where the decryption device of the client terminal apparatus 604 decrypts the encrypted virtual ID using the machine ID (preferably the machine ID that is contained in the ROM). At step S78, the decryption device of the client terminal apparatus 604 decrypts the client encrypted computer program or the client encrypted program and data modules using the virtual ID obtained at step S76. At this point, the client terminal apparatus 604 may execute or modify the computer program, which is resident in RAM.

The client encrypted computer program or the client encrypted modules may only be decrypted using the client terminal apparatus 604 that is associated with the virtual ID used to encrypt the client encrypted computer program. Thus, if unauthorized copies of the client encrypted computer program or the client encrypted modules are provided to non-authorized end-users, the apparatus on which such unauthorized end-users would attempt to execute or modify the computer program would not be capable of decrypting the client encrypted computer program or the client encrypted modules. Further, if the first storage device 607, 608 were provided to an unauthorized end-user (e.g., such that the storage device 607, 608 were coupled to a different client terminal apparatus 604), the encrypted virtual ID could not be decrypted inasmuch as any machine ID stored in ROM would not match the machine ID contained in the first storage device 607, 608. Thus, the client encrypted computer program or the client encrypted program and/or data modules could not be decrypted. This approach to the secure distribution of computer programs and/or modules ensures that unauthorized copies are rendered useless and that only a particular client terminal apparatus 604 is capable of executing or updating the computer programs.

While the aspects discussed above contemplate that the decryption key is provided to the client terminal apparatus 604 over the network 605, alternative aspects contemplate that the decryption key may be provided to the client terminal apparatus 604 by way of a storage medium (e.g., a CD-ROM, etc.) for manual distribution. These aspects of the present invention will now be described with reference to FIGS. 23 and 24. As shown in FIG. 23, the client terminal apparatus 604 receives an encrypted first decryption key by way of a storage medium 609A. The first decryption key is preferably operable for use in decrypting the source encrypted computer program or the source encrypted program and/or data modules at the client terminal apparatus 604. The administrative server 601 is preferably operable to produce an encrypted second decryption key and an encrypted virtual ID, where the second decryption key is operable for use in decrypting the encrypted first decryption key. It is noted that the administrative server 601 may have access to any number of second decryption keys that may be used to decrypt respective encrypted first decryption keys. These second decryption keys may be provided to the administrative server 601 by the encryption server 603 and/or by the third party server 602. Furthermore, these second decryption keys may be transmitted to the administrative server 601 by way of the network 605, by way of another network, or may be manually provided by way of storage media, etc.

At step S40A, the administrative server 601 preferably encrypts the second decryption key using the virtual ID associated with the client terminal apparatus 604. Further, the administrative server 601 preferably encrypts the virtual ID using the associated machine ID of the client terminal apparatus 604, each of which is preferably obtained from the personalizing database 606 (step S42). The network interface of the administrative server 601 is preferably further operable to facilitate the transmission of the encrypted second decryption key and the encrypted virtual ID to the client terminal apparatus 604 over the network 605 (step S44A). At step S46A, the client terminal apparatus 604 preferably receives the encrypted second decryption key and the encrypted virtual ID over the network 605 and stores same in the first storage device (e.g., the hard disk drive 607, the memory card 608, etc.).

The encrypted second decryption key is only provided to an authorized client terminal apparatus 604, e.g., a client terminal apparatus 604 that has provided a valid machine ID and has registered such machine ID in association with a virtual ID used to encrypt the second decryption key. Any interception of the encrypted second decryption key, such as by way of network piracy or unauthorized duplication, will fail to provide the necessary information (i.e., a usable second decryption key) to decrypt the encrypted first decryption key. Indeed, such second decryption key is encrypted with a substantially unique virtual ID. Similarly, the encrypted virtual ID is provided to the client terminal apparatus 604 only after the registration process has been completed and the client terminal apparatus 604 has been deemed authorized. As the virtual ID is transmitted from the administrative server 601 to the client terminal apparatus 604 in an encrypted manner (i.e., encrypted using the machine ID of the client terminal apparatus 604), any unauthorized acquisition of the encrypted virtual ID will not yield the necessary information to decrypt the encrypted second decryption key.

Figure 25:
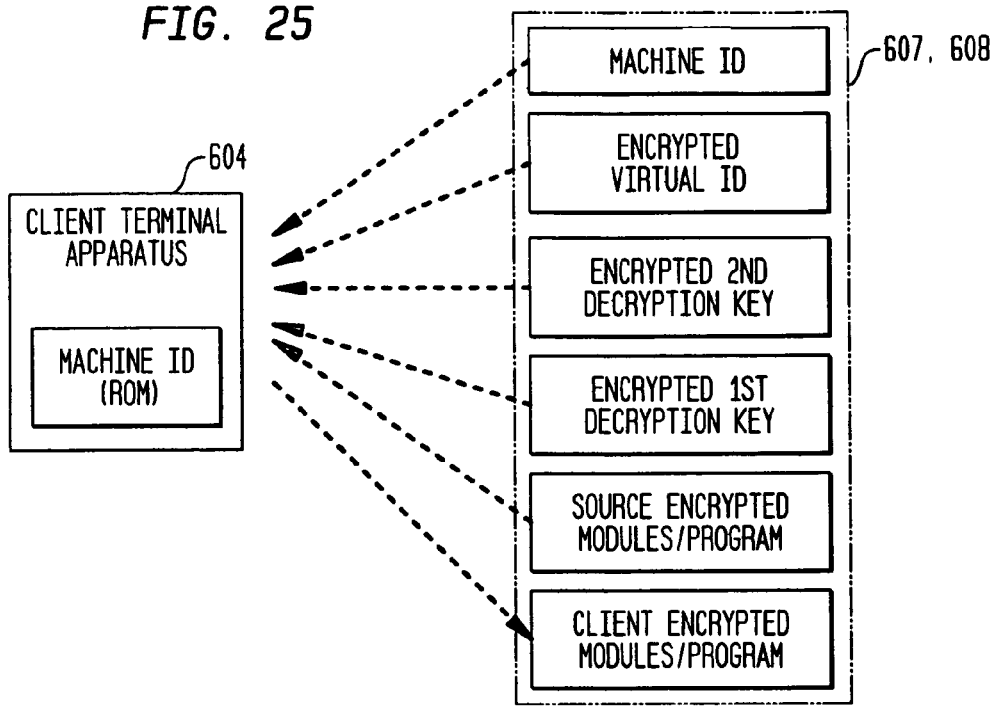
FIG. 25 is a conceptual block diagram and flow diagram illustrating further process steps in accordance with the alternative concept of FIG. 23.
Figure 26:
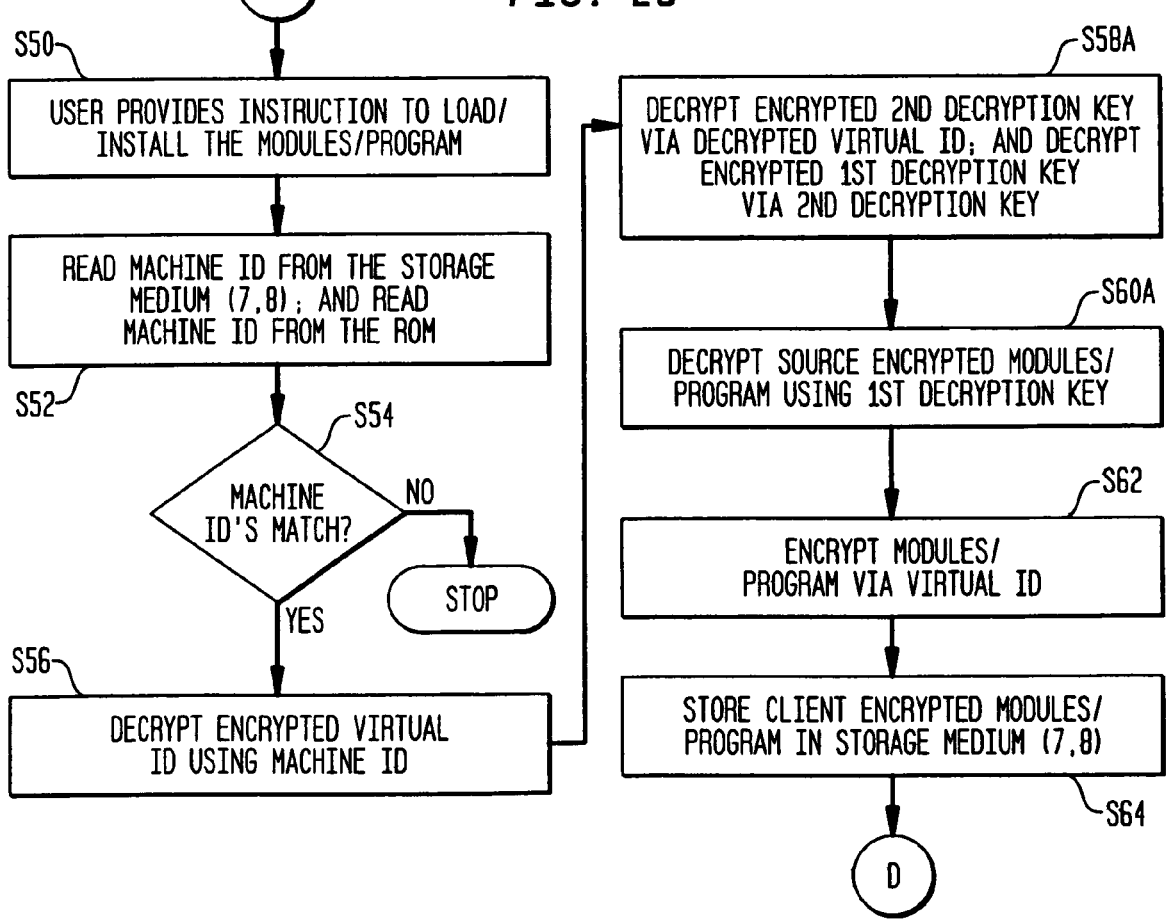
FIG. 26 is a flow diagram illustrating further details concerning the process steps of FIG. 25.

Reference is now made to FIGS. 25 and 26, which illustrate certain processes that are carried out in order to load/install the source encrypted computer program or the source encrypted program and/or data modules within the client terminal apparatus 604. FIG. 25 illustrates that at this stage of the process, the client terminal apparatus 604 includes the machine ID stored in the second storage device (ROM), and the first storage device 607, 608 contains the following items: the machine ID, the encrypted virtual ID, the encrypted second decryption key, the encrypted first decryption key, and the source encrypted computer program or the source encrypted program and/or data modules.

At step S50, the user may provide an instruction to the client terminal apparatus 604 to load/install the source encrypted computer program or the source encrypted modules for future use. In response, the client terminal apparatus 604, using appropriate hardware and software processes, reads the machine ID from the first storage device 607, 608 and reads the machine ID from the second storage device, e.g., the ROM (step S52). At step S54, a determination is made as to whether these machine IDs match. If they do not, then the process terminates and/or enters an alternative process. If they match, however, the process flow advances to step S56, where the encrypted virtual ID is decrypted using the machine ID (preferably the machine ID that was stored in the ROM). Once the virtual ID is obtained, the encrypted second decryption key is decrypted using the virtual ID and the encrypted first decryption key is decrypted using the second decryption key (step S58A). Next, the source encrypted computer program or the source encrypted modules are decrypted using the first decryption key (step S60A). At step S62, the computer program or the modules may be re-encrypted using the virtual ID obtained at step S56 to obtain a client encrypted computer program. The client encrypted computer program or the client encrypted modules are stored in the first storage device 607, 608 (step S64). At this stage, neither the encrypted first decryption key, the encrypted second decryption key, the source encrypted computer program, nor the source encrypted program and/or data modules need be retained in the first storage device 607, 608.

Once the client encrypted computer program or the client encrypted program and/or data modules are obtained and stored in the first storage device 607, 608, the process discussed with respect to FIGS. 21 and 22 may be utilized to execute the computer program.

Figure 27:
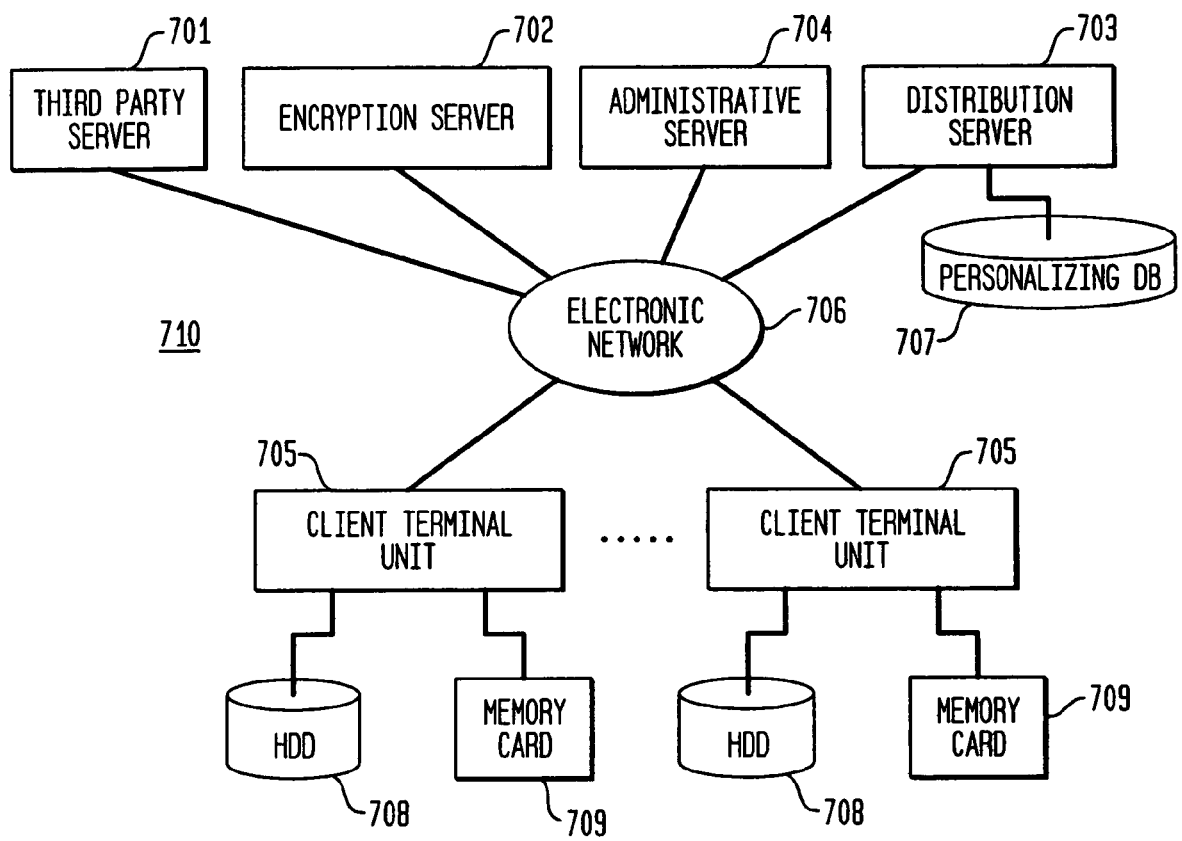
FIG. 27 is a block diagram of a further system for distributing software programs and software program and/or data modules to one or more users.

FIG. 27 shows another system 710 that is operable to permit the processing arrangement 118 to download the programs and/or download the program and/or data modules described above in a secure manner, e.g., such that unauthorized copies of the program and/or the program and/or data modules are either prevented or rendered useless. Such a system is described in U.S. application Ser. No. 10/316,309, titled "METHODS AND APPARATUS FOR SECURE DISTRIBUTION OF CONTENT," filed Dec. 11, 2002 and published Jul. 3, 2003 as application Publication No. US 2003/0126430 A1, the disclosure of which is incorporated herein by reference.

The system 710 preferably includes a third party server 701, an encryption server 702, a distribution server 703, an administrative server 704, and a plurality of client terminal apparatus 705, such as the processing arrangement 118, all coupled to a network 706, such as the Internet. It is noted that the system 710 may include a plurality of third party servers 701, a plurality of encryption servers 702, a plurality to distribution servers 703, and/or a plurality of administrative servers 704. For brevity and clarity, only one of each such servers will be discussed herein. Each of the servers 701, 702, 703, 704 is preferably maintained by, controlled by, and/or otherwise associated with an entity or person. It is noted that reference may be made herein to the server and the entity associated therewith interchangeably.

The third party server 701 is preferably controlled by, maintained by, and/or otherwise associated with an entity, such as a developer of software programs and/or software program and/or data modules, as described above with reference to FIG. 11.

The encryption server 702 is preferably controlled by, maintained by, and/or otherwise associated with an entity charged with administrative functions. Preferably, this entity is the same entity as that of the administrative server 704. It is noted, however, that the encryption server 702 may be associated with another entity. The encryption server 702 may be implemented utilizing any of the known hardware for carrying out server related functions.

The distribution server 703 is preferably controlled by, maintained by, and/or otherwise associated with an entity charged with distributing the software program and/or the software program and/or data modules to the client terminal apparatus 705, such as by way of the network 706. The distribution server 703 is preferably coupled to a personalizing database 707, such as the above-described database 386, which will be discussed in detail later herein. The distributor server 703 and personalizing database 707 may be implemented utilizing any of the known hardware suitable for carrying out network server functions and database functions.

The administrative server 704, such as the above-described server 384, is preferably maintained by, controlled by, and/or otherwise associated with an entity charged with performing certain administration functions. The administrative server 704 may be implemented utilizing any of the known hardware suitable for carrying out network server functions and database functions.

The respective functions carried out by the third party server 701, the encryption server 702, the distribution server 703, and the administrative server 704 may be distributed among one or more servers and/or one or more entities controlling, maintaining, and/or being otherwise associated with those servers. Indeed, separate entities for each server are not required, e.g., one entity may be associated with the encryption server 703 and the administrative server 704. The distribution, however, is preferably consistent with that illustrated in FIG. 27.

Generally, each client terminal apparatus 705 includes one or more processing arrangements 118 and is preferably operably coupled to a hard disk drive 708, such as any of the known hard disk drive hardware, and a memory card 709, such as the Sony Memorystick. Alternatively, the client terminal apparatus is coupled to an optical device such as a CD drive, a DVD drive, or a Blu-ray disk drive, which operate as described above. While the hard disk drive 708, memory card 709 and/or optical device (which is preferably removably coupled to the client terminal apparatus 705) are shown as separate items from the apparatus 705, it is understood that they may be integrally located with the apparatus 705. The client terminal apparatus 705 may be implemented utilizing any of the known hardware, such as a personal computer, the PlayStation 702, etc.

The client terminal apparatus 705 is preferably operable to receive a source encrypted program and/or source encrypted program modules and/or data modules, as described above, by way of downloading over the network 706 in the manner described above regarding the client terminal apparatus 604 of FIG. 11.

Figure 28:
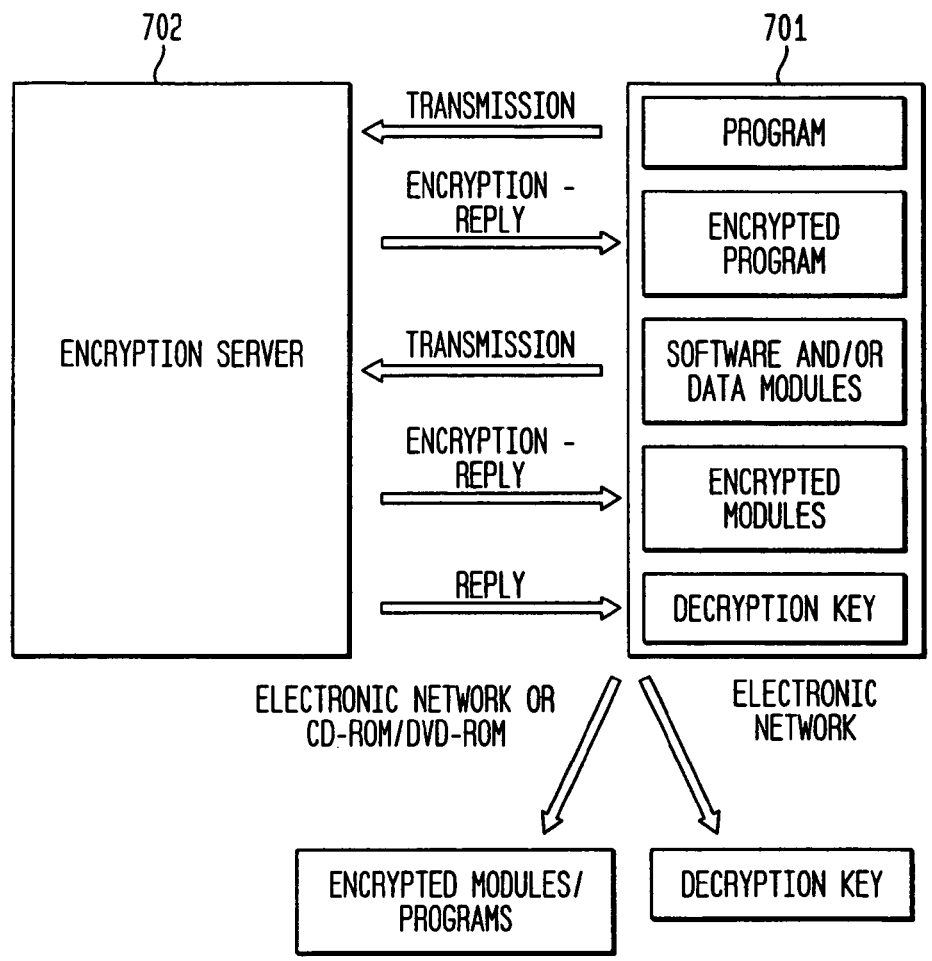
FIG. 28 is a conceptual block diagram and flow diagram illustrating certain process steps that are carried out by certain portions of the system of FIG. 27.

Reference is now made to FIG. 28, which is a conceptual block diagram and flow diagram illustrating certain process steps performed by the encryption server 702 and the third party server 701. The figure provides an example of how the source encrypted computer program or the source encrypted modules are generated. In this example, the third party server 701 is associated with a software developer, that either itself or in conjunction with another entity obtains the program or the modules, which are transmitted to the encryption server 702 over the network 706. It is noted, however, that the program or the modules may be manually provided to the encryption server 702, e.g., by way of storage media.

The encryption server 702 preferably encrypts the program or the program and/or data modules and returns the encrypted program or the encrypted modules to the third party server 701. The encryption process may employ any of the known encryption techniques, such as public key encryption, symmetric key encryption, etc., in order to produce the encrypted program or encrypted modules. As an example, the encryption server 702 returns an encrypted system program (a source encrypted system program) and an encrypted application program (a source encrypted application program) or returns source encrypted modules to the third party server 701. Also, the encryption server 702 may provide the decryption key, which is capable of decrypting the encrypted program-or the encrypted modules, to the third party server 701. Preferably, the decryption key is provided to the distribution server 703 in a non-activated state, i.e., in a way in which it may not be readily used to decrypt the source encrypted computer program or the source encrypted modules. For example, the decryption key may be initially encrypted an entity such as by the encryption server 702 such that it is non-active. As will be discussed later herein, this provides an advantageous level of security.

Figure 29:
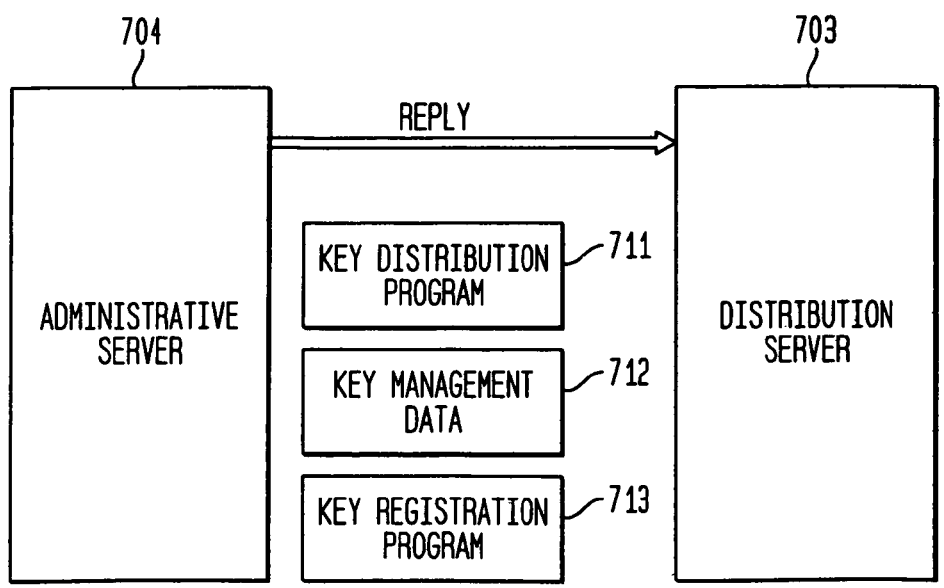
FIG. 29 is a further conceptual block diagram and flow diagram illustrating further steps that are carried out by certain portions of the system of FIG. 27.

Reference is now made to FIG. 29, which is a conceptual block diagram and flow diagram illustrating certain process steps that are preferably carried out between the distribution server 703 and the administrative server 704. The distribution server 703 preferably establishes a communication link with the administrative server 704 over the network 706. The administrative server 704 preferably transmits a key distribution program 711, key management data 12, and a key registration program 713 to the distribution server 713 over the network 706. As will be discussed later herein, the key distribution program 711 is executed by the distribution server 703 in order to permit distribution of the decryption keys to end-users. The key management data is preferably a secure collection of information, including a distribution ID, which is preferably substantially unique to each distribution server 703. The key registration program 713 is preferably executed by the distribution server 703 in order to convert the non-active decryption key into an active decryption key (i.e., usable to decrypt the source encrypted computer program).

Figure 30:
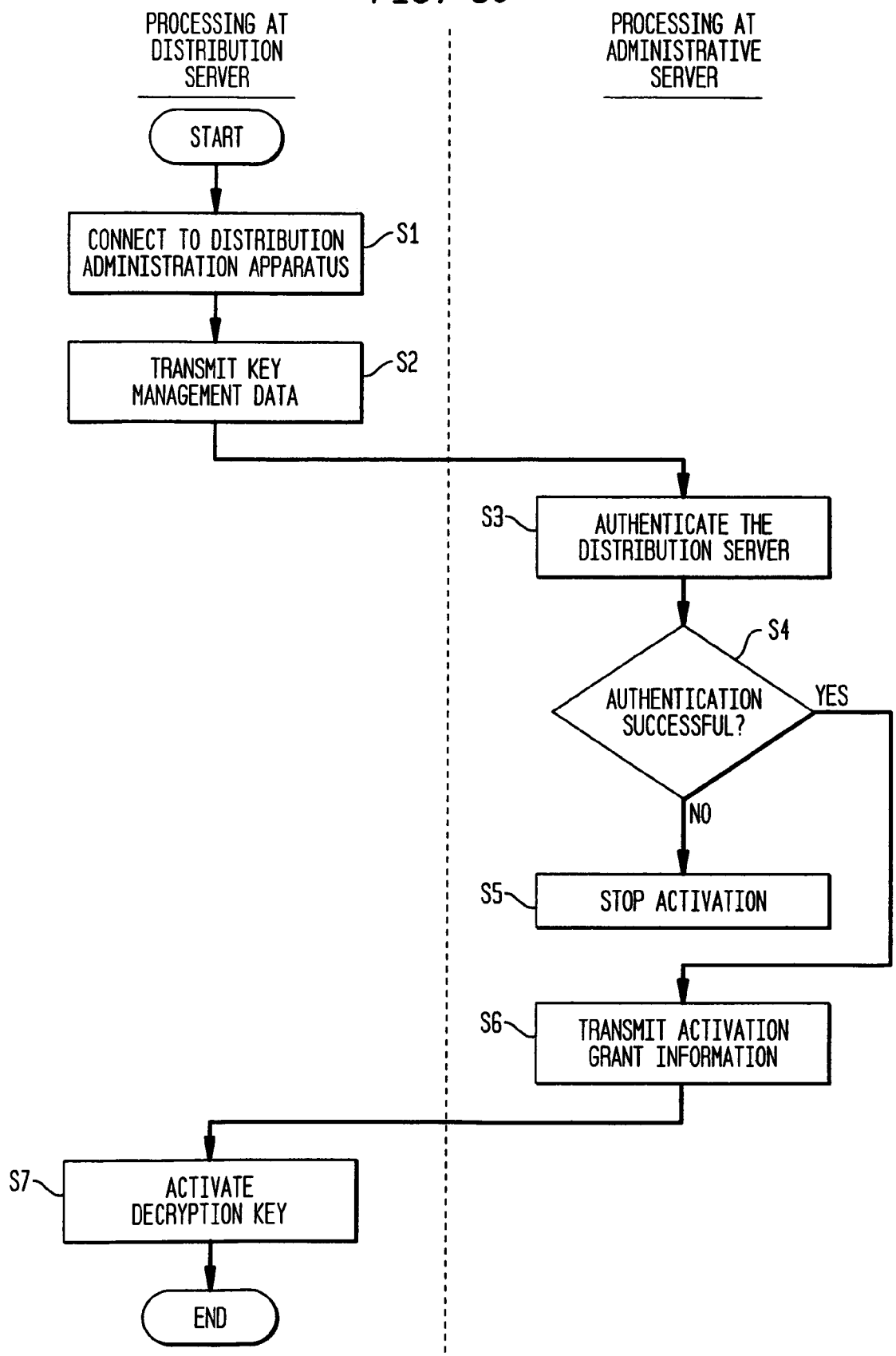
FIG. 30 is a flow diagram showing certain process steps carried out as illustrated in FIG. 29.
Figure 31:
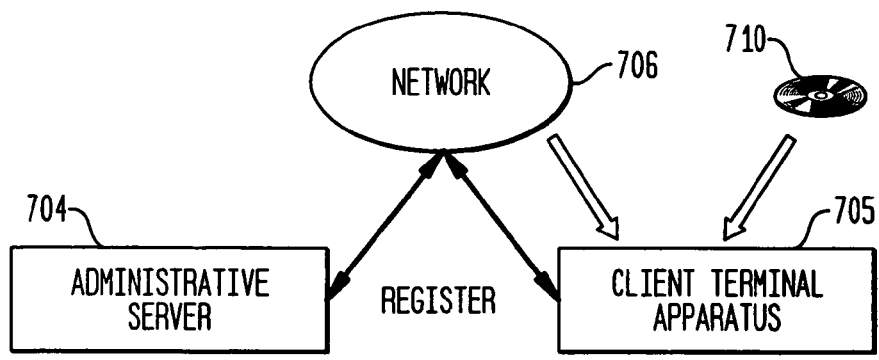
FIG. 31 is a conceptual block diagram and flow diagram illustrating certain process steps carried out by, for example, the administrative server and client terminal of FIG. 27.

Reference is now made to FIG. 30, which is a flow diagram illustrating further process steps that are preferably carried out between the distribution server 703 and the administrative server 704. In general, the distribution server 703 may make an activation request to the administrative server 704 over the network 706 and receive activation grant information from the administrative server 704 in response. More particularly, at action S1, the distribution server 703 preferably connects to the administrative server 704 over the network 706. At action S2, the distribution server 703 transmits the key management data (which includes the distributor ID therein) to the administrative server 704.

At action S3, the administrative server 704 preferably authenticates the distribution server 703 utilizing a suitable authentication process. For example, the administrative server 704 may require that the distribution server 703 provide a user ID, password, etc., or some other verifiable information in order to permit authentication. It is preferred, however, that the administrative server 704 extracts the distributor ID from the key management data 712 in order to authenticate the distribution server 703. At action S4, a determination is made as to whether the authentication is successful. If authentication is not successful, then the process advances to action S5, where no activation is permitted and the process terminates. If authentication is successful, then the process flow preferably advances to action S6, where activation grant information is transmitted from the administrative server 704 to the distribution server 703 over the network 706.

At action S7, the distribution server 703 preferably activates the decryption key associated with the source encrypted computer program or with the source encrypted modules. More particularly, the distribution server 703 preferably executes the key registration program 713, which requires the activation grant information as input. In response, the key registration program 713 activates the decryption key such that it may be used to decrypt the source encrypted computer program. By way of example, the activation grant information may include a decryption key that is suitable for decrypting an initially encrypted decryption key. In this scenario, the key registration program 713 includes a decryption capability that utilizes the activation grant information to decrypt the initially encrypted decryption key.

Irrespective of how or whether the decryption key is activated, the distribution server 703 preferably stores the decryption key in the personalizing database 707. At this stage, the distribution server 703 contains (or has access to) the source encrypted computer program and the source encrypted modules as well as the decryption key capable of decrypting same.

Figure 32:
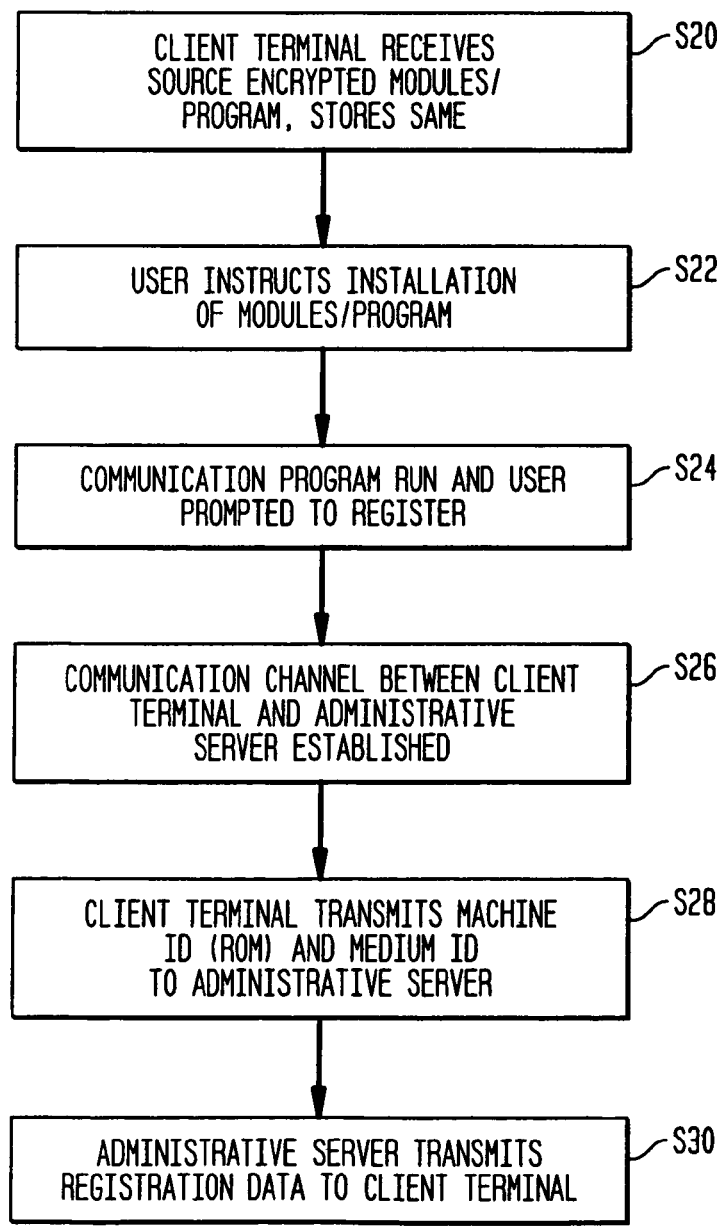
FIG. 32 is a flow diagram illustrating further process steps carried out by the apparatus of FIG. 31.

Reference is now made to FIG. 32, which is a conceptual block diagram and flow diagram illustrating certain process steps that are preferably carried out in order to process the source encrypted computer program or the source encrypted modules. In order to execute the source encrypted computer program or to modify an existing program using the source encrypted modules, however, the client terminal apparatus 705 must perform certain registration steps. These steps are preferably illustrated with the administrative server 704 over the network 706.

At least some of the steps in the registration process are illustrated in the flow diagram of FIG. 32. Steps S20, S22, S24, S26 and S28 are similar to the steps having like reference numerals shown in FIG. 16.

Thereafter, at action S30, the administrative server 704 preferably generates and transmits registration data to the client terminal apparatus 705 over the network 706. By way of example, the registration data may be formed from the machine ID and the distributor ID, preferably such that these IDs may be identified later by appropriate analysis of the registration data. Upon receipt of the registration data, the client terminal apparatus stores same, preferably in the first storage device, e.g., the hard disc drive and/or the memory card 709.

Figures 33, 34:
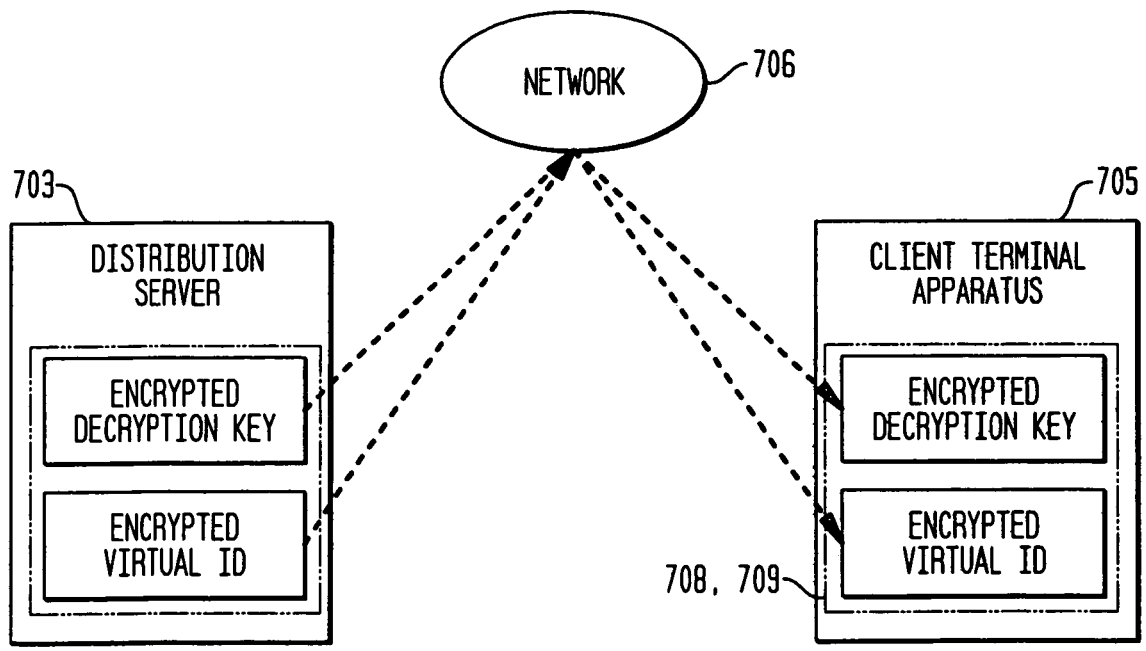
FIG. 33 is a block diagram illustrating certain database content.
FIG. 34 is a further conceptual block diagram and flow diagram illustrating certain process steps carried out by portions of the system of FIG. 27.

With reference to FIG. 33, it is noted that the administrative server 704, such as the server 384, may be coupled to a database 707A, such as the database 386. The database 707A may contain any machine IDs and/or distributor IDs received during the above-described phase of the registration process. Preferably, the machine IDs and distributor IDs are stored in association with one another such that useful history data and analysis thereof may be obtained. For example, it may be determined from such analysis that certain client terminal apparatus 705 have received source encrypted computer programs or source encrypted program and data modules from certain distribution servers 703. Taken in conjunction with data obtained from the distribution servers 703 the machine IDs, distributor IDs, and/or the associations therebetween may be used to ensure that any obligations (e.g., by way of contract) on the part of the distribution server 703 are being met.

Reference is now made to FIGS. 34 and 35 which are, respectively, a conceptual block diagram and a flow diagram illustrating further process steps that are preferably carried out in order to register the computer program or the program and/or data modules and to permit the end-user to execute or modify a program. The user preferably provides an instruction to the client terminal apparatus 705 indicating a desire to obtain a decryption key suitable to decrypt the source encrypted computer program. At step S21, the client terminal apparatus 705 establishes a communication link with the distribution server 703 over the network 706. Thereafter, the client terminal apparatus 705 transmits the registration data (previously obtained from the administrative server 704) to the distribution server 703 (action S22).

At action S23, the distribution server 703 receives the registration data, e.g., containing the machine ID (and possibly the distributor ID) from the client terminal apparatus 705 over the network 706. In this regard, the distribution server 703 preferably includes a network interface operable to facilitate communication with the network 706 such that the registration data may be received over the network 706 from the client terminal apparatus 705. At step S23, the administrative server 704 also assigns another ID, called a virtual ID herein, that preferably corresponds with the machine ID received from the client terminal apparatus 705. It is noted that the virtual ID may be selected from a plurality of preexisting IDs, the virtual ID may be derived through numeric operations performed on the machine ID, the distributor ID, and/or some other operand, or any other known or hereinafter developed technique may be employed to generate the virtual ID.

The distribution server 703 searches the personalizing database 707 for an existing machine ID that matches the machine ID received from the client terminal apparatus 705 (i.e., the machine ID stored in the second storage device (ROM) thereof). With reference to FIG. 36, the personalizing database 707 is preferably operable to store respective machine IDs, each ID corresponding with a respective one of the client terminal apparatus 705. A plurality of machine IDs are pre-stored in the personalizing database 707, e.g., in the left column of FIG. 36. It is preferred that each of these machine IDs corresponds with a given one of the client terminal apparatus 705 and that such machine IDs are substantially unique to the respective client terminal apparatus 705. The distribution server 703 also preferably includes a data processor operable to search the personalizing database 707 for the registration information (e.g., the machine ID) that matches the machine ID received from the client terminal apparatus 705 over the network 706. Any of the known or hereinafter developed data processing hardware may be employed for this purpose.

Referring again to FIG. 35, at step S23, the virtual ID is associated with the machine ID stored in the personalizing database 707, which is to say that the virtual ID is associated with the particular client terminal apparatus 705 that transmitted the received machine ID to the distribution server 703. This association is preferably achieved by storing the virtual ID within the personalizing database 707 in a manner such that it corresponds with the stored machine ID.

As noted above, the registration data transmitted from the client terminal apparatus 705 to the distribution server 703 over the network 706 (step S22, FIG. 35) may include the transmission of the distributor ID that corresponds with the distribution server 703 from which the source encrypted computer program or the source encrypted modules was obtained. Alternatively, the distributor ID contained within the registration data may also be stored in the personalizing database 707 in association with the machine ID.

Figure 38:
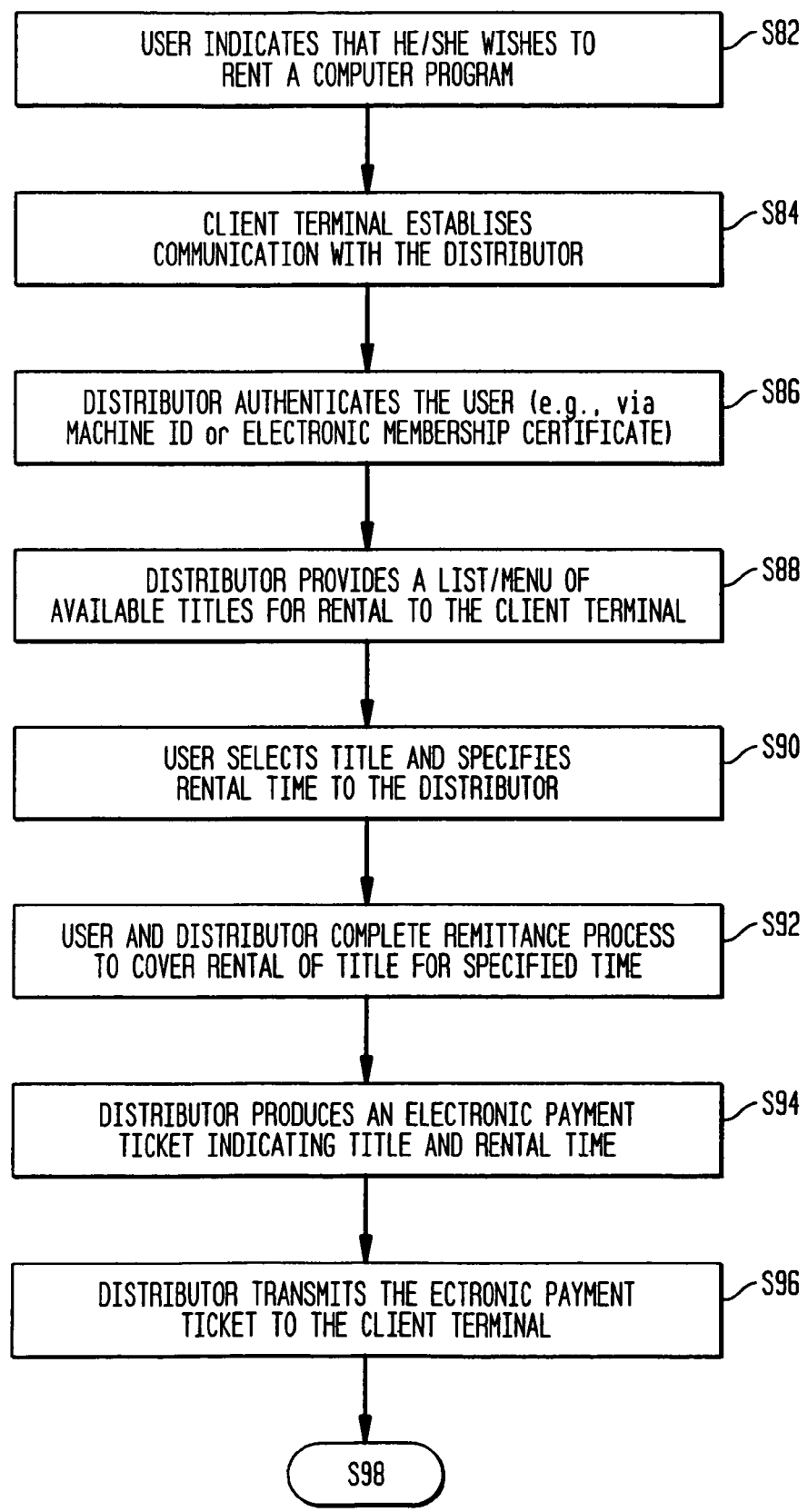
FIG. 38 is a flow diagram illustrating further steps of the process of FIG. 37.

With reference to FIG. 38, the distribution server 703 is preferably operable to produce an encrypted decryption key and an encrypted virtual ID, where the decryption key is operable for use in decrypting the source encrypted computer program or the source encrypted modules at the client terminal apparatus 705. It is noted that the distribution server 703 may have access to any number of decryption keys that may be used to decrypt respective source encrypted computer programs or source encrypted modules produced by the encryption server 702 (FIGS. 27-28). The decryption keys may be provided to the distribution server 703 by the encryption server 702 and/or by any other appropriate entity. Furthermore, the decryption keys may be transmitted to the distribution server 703 by way of the network 706, by way of another network, or may be manually provided by way of storage media, etc.

At step S24, the distribution server 703 preferably encrypts the decryption key using the virtual ID associated with the client terminal apparatus 705. Further, the distribution server 703 preferably encrypts the virtual ID using the associated machine ID of the client terminal apparatus 705, each of which is preferably obtained from the personalizing database 707.

The network interface of the distribution server 703 is preferably further operable to facilitate the transmission of the encrypted decryption key and the encrypted virtual ID to the client terminal apparatus 705 over the network 706 (step S25). At step S26, the client terminal apparatus 705 preferably receives the encrypted decryption key and the encrypted virtual ID over the network 706 and stores same in the first storage device (e.g., the hard disk drive 708, the memory card 709, etc.). At action S27, the distribution server 703 preferably records (as history data) that a particular decryption key was transmitted to a client terminal apparatus 705. This information is preferably later provided to the administrative server 704, e.g., over the network 706. Preferably, the distribution server 703 is not capable of accessing the data contained in the history data. This data may be used for billing purposes, for tracking of obligations, etc.

The encrypted decryption key is only provided to an authorized client terminal apparatus 705, e.g., a client terminal apparatus 705 that has provided a valid machine ID and has registered such machine ID in association with a virtual ID used to encrypt the decryption key. Furthermore, any interception of the encrypted decryption key, such as by way of network piracy or unauthorized duplication, will fail to provide the necessary information (i.e., a usable decryption key) to decrypt the source encrypted computer program. Indeed, such decryption key is encrypted with a substantially unique virtual ID. Similarly, the encrypted virtual ID is provided to the client terminal apparatus 705 only after the registration process has been completed and the client terminal apparatus 705 has been deemed authorized. As the virtual ID is transmitted from the distribution server 703 to the client terminal apparatus 705 in an encrypted manner (i.e., encrypted using the machine ID of the client terminal apparatus 705), any unauthorized acquisition of the encrypted virtual ID will not yield the necessary information to decrypt the encrypted decryption key.

The processes carried out to load/install the source encrypted computer program or the source encrypted modules within the client terminal apparatus 705 are described above with reference to FIGS. 19 and 20.

The process by which the computer program is executed or modified by the client terminal apparatus 705 is discussed above with reference to FIGS. 21 and 22.

Reference is now made to FIG. 37, which is a process flow diagram illustrating an example of the secure distribution of program content, such as software programs, from a distributor of rental program content. Such distribution is described in the above-referenced U.S. application Ser. Nos. 10/316, 309 and 10/316,675.

The distributor of rental program content may be the administrative server 601,704, the third party server 602,701, the distribution server 703, or some other server (not shown). When a user desires to rent program content, the user is preferably required to first become a member of the rental system. In this regard, at step S70, the user indicates that he or she wishes to become a member of the system, for example, by way of activating mechanisms of the client terminal apparatus 604,705. By way of example, the client terminal apparatus 604,705 may be the same apparatus in which the user will run the rented program content or may be a separate device. Further, the client terminal apparatus 604,705 may contain and execute a suitable computer program that facilitates the membership process.

At step S72, the client terminal apparatus 604,705 establishes a communication link with the administrative server 601,704, preferably over the network 605,706. At step S74, a request is sent by the client terminal apparatus 604,705 indicating that the user wishes to become a member of the rental system. The client terminal apparatus 604,705 may transmit the machine ID to the administrative server 601,704 over the network 605,706, such as when the user will rent and execute content only using the current client terminal apparatus, or may transmit other ID information specific to the user, such as when the user will also rent program content via other devices. In response, the administrative server 601,704 produces an electronic membership certificate, which may be substantially unique to the client terminal apparatus 604,705 when the user only rents and executes program content using the same client terminal apparatus. The administrative server 601,704 may also associate the machine ID of the client terminal apparatus 604,705 or the user information with the electronic membership certificate, for example, using the database association techniques described hereinabove. At step S80, the administrative server 601,704 preferably transmits the electronic membership certificate to the client terminal apparatus 604,705 over the network 605,706. As will be described below, the electronic membership certificate is used in the rental process.

Once the user has become a member of the rental system, the user is preferably permitted to rent program content, such as application programs and system programs. Preferably, the program content is a video game computer program. With reference to FIG. 38, the computer software running on the client terminal apparatus 604,705 preferably permits the user to indicate that he or she wishes to rent a computer program. Here, the client terminal apparatus in which the user wishes to rent program content may be the same apparatus that was used to establish membership, may be another apparatus, or may be neither. As an example, the user may rent software programs for use on a game console but may initiate user authentication by transmitting the membership certificate or other data from another device, such as from the user's mobile telephone, PDA, or other device. The membership certificate or other data may be entered into the device by either manually entering data, swiping a magnetic card or smart card, or reading data already stored in the device.

In response to an indication from the user in this regard (step 82), the client terminal apparatus 604,705 preferably establishes a communication link with the distributor (step S84) over which a rental request by the user is transmitted to the distributor. At step S86, the distributor preferably authenticates the client terminal apparatus 604,705, for example, by analyzing the machine ID of the client terminal apparatus 604,705, such as when the apparatus is the same device employed by the user to become a member, and/or by analyzing the electronic membership certificate. This is accomplished by requiring that the client terminal apparatus 604, 705 provide the machine ID and/or the electronic membership certificate to the distributor and that the distributor has access to a database where this information may be verified.

When the user has been authenticated, the distributor preferably provides a list or a menu of available titles for rental to the client terminal apparatus 604,705 over the network 605, 706 (step S88). The computer software running on the client terminal apparatus 604,705 preferably facilitates the display of the list or menu of titles to the user so that the user may select a title and specify a rental time (step S90). The user's selection and specified rental time are preferably transmitted to the distributor over the network 605,706.

At step S92, the distributor preferably requires that the user provide remittance to cover the rental cost of the computer program for the specified time. This may be accomplished utilizing any of the known techniques, for example, by transmitting a credit card number, a demand deposit account number, by way of invoice, etc. using either the client terminal apparatus 604,705 or other device. Once remittance has been made, the distributor preferably produces an electronic payment ticket indicating that remittance has been made for the indicated title and rental time (step S94). At step S96, the distributor preferably transmits the electronic payment ticket to the client terminal apparatus 604,705 or to another device over the network 605,706.

The electronic payment ticket preferably provides the user (or the client terminal apparatus 604,705 when it receives the electronic payment ticket) with a certain level of rental rights in exchange for the remittance provided to the distributor. For example, the rental rights may be limited to a specific title of the computer program, rental time, remittance value, etc. In addition, the electronic payment ticket may include additional information, such as a decryption key that is capable of decrypting the computer program. It is not required that the electronic payment ticket include the decryption key, and the inclusion thereof is given by way of example only. It is also contemplated that the electronic payment ticket may include the decryption key in an encrypted form, for example, by encrypting it using the machine ID or utilizing other information that may be part of the electronic membership certificate (such as a virtual ID or the like). In any case, at this point in the process, the user has preferably received a certain level of rental rights, but has not yet received the computer program or an encrypted version of the computer program.

Figure 39:
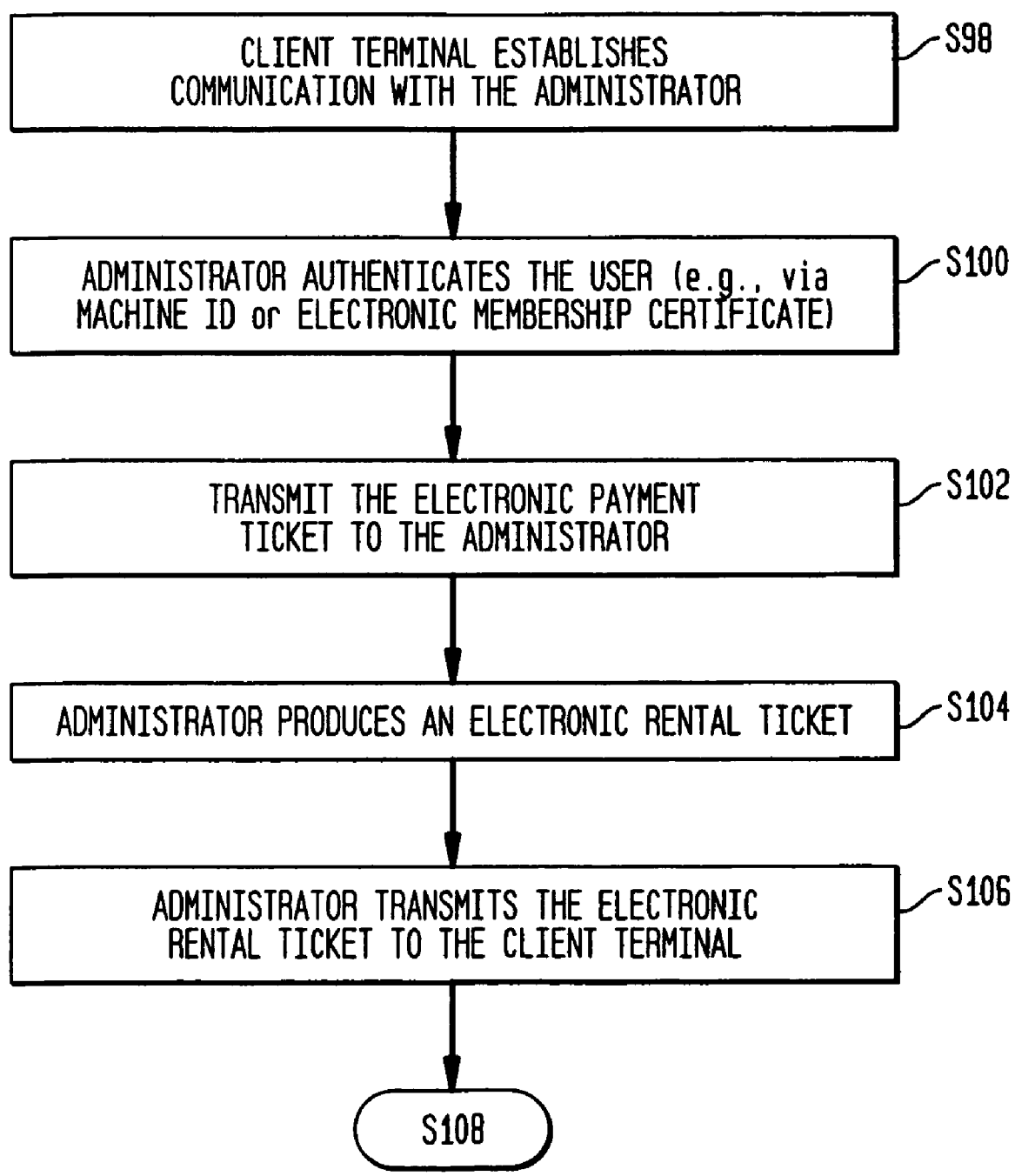
FIG. 39 is a flow diagram illustrating further steps of the process of FIG. 38.

At this stage in the process, the client terminal apparatus 604,705 or other device has possession of an electronic payment ticket indicating that remittance has been made for a title for a given period of time and may also hold the user's electronic membership certificate. With reference to FIG. 39, the client terminal apparatus 604,705 or other device preferably establishes a communication link with the administrative server 601,704 over the network 605,706 (step S98). At step S100, the administrative server 601,704 preferably authenticates the client terminal apparatus 604,705 or other device by way of the machine ID and/or electronic membership certificate. It is noted that this may be achieved by accessing an appropriate database, such as the personalizing database 606,707, At step S102, the client terminal apparatus 604,705 or other device preferably transmits the electronic payment ticket to the administrative server 601,704 over the network 605,706. In response, the administrative server 601, 704 preferably produces an electronic rental ticket (step 104)

and transmits the electronic rental ticket to the client terminal apparatus 604,705 or other device over the network 605,706 (step S106).

The electronic rental ticket preferably provides the user (or the client terminal apparatus 604,705) with a level of rental rights that may be the same as, or greater than, the rental rights provided by the electronic payment ticket. For example, the electronic rental ticket may specify the computer program title, the rental time, the remittance value, and may also include additional information, such as a decryption key that is capable of decrypting the encrypted computer program (assuming that the decryption key is not contained in the electronic payment ticket). It is not required that the electronic rental ticket include the decryption key, and the inclusion thereof is given by way of example only. It is also contemplated that the electronic rental ticket may include the decryption key in an encrypted form, for example, by encrypting it using the machine ID or utilizing other information that may be part of the electronic membership certificate (such as a virtual ID or the like). In any case, at this point in the process, the user has preferably received a certain level of rental rights, but has not yet received the computer program or an encrypted version of the computer program.

With reference to FIG. 40, the client terminal apparatus 604,705 preferably establishes a communication link with the distributor over the network 605,706 (step S108). In response, the distributor may authenticate the client terminal apparatus 604,705, for example, by way of analysis of the machine ID and/or the electronic membership certificate as discussed hereinabove (step S110). Next, the client terminal apparatus 604,705 or other device, for example, preferably transmits the electronic rental ticket (or at least a portion thereof) to the distributor over the network 605,706 (step S112). Preferably, this indicates to the distributor that the client terminal apparatus 604,705 or other device has completed all previous necessary steps so that the client terminal apparatus is authorized to receive an encrypted version of the computer program for rental (step S114). At this point in the process, the client terminal apparatus 604,705 or other device preferably has possession of the machine ID, the electronic payment ticket, the electronic rental ticket, the encrypted decryption key, and the encrypted computer program.

The user may load, install, and execute the computer program, as well as adjust the processing capabilities of the client terminal apparatus, utilizing the processes described hereinabove with respect to previous embodiments of the invention. The rental system thus enables the secure distribution of rental program content to a user using any client terminal apparatus 604,705 over the network 605,706.

The present invention is also suitable for an application where a user purchases the right to run a particular software program, or a particular version of such a program, to be run independent of any particular device. As an example, the user may purchase the right to run a specific game program or other software program on any console, such as the user's own console, a console owned by another, or an arcade game machine located at an amusement arcade.

The user may also own a copy of a specific version of the game program, or other software program, that is stored on a transportable software medium, such as a disk or other storage device, and may copy the program from the storage medium onto the user's console, the another's console, or the arcade game machine. Alternatively, the user may merely possess the right to run a particular version of the game program or other software program. In either case, the user also possesses a user ID or other authentication information, such as an electronic certificate (a virtual ID or the like).

When such a user desires to execute the game program or other software program on a device such as the user's console, the another's console, or the arcade game machine, and a copy of the program is already stored in the console, the user authentication information may be required to execute the program on the console and/or may be required to permit the console to obtain the requisite software and/or data modules to permit proper execution of the program on the console. Alternatively, when the game program or other software program is not stored in the user's console, the another's console, or the arcade console, the authentication information may be required to permit the console to download the version of the program for which the user has purchased the rights and/or may be required to thereafter obtain the software and/or data modules required to obtain the proper software version for the console.

The user authentication may be carried out in the manner described above with reference to FIGS. 37-40, namely, by transmitting authentication information from another device, such as from the user's mobile telephone, PDA, or other device, or the membership certificate or other data may be entered into the console either by manually entering data, swiping a magnetic card or smart card, or, when the console is the user's console, reading data already stored in the user's console.

The user authentication may be transmitted to one or more of the administrative server 601,704, the third-party server 602,701, the distribution server 703, or some other server (not shown), as described above with reference to FIGS. 11 and 27. Additionally, the game program or other software program whose rights are owned by the user and the software and/or data modules needed for proper operation of the game program or other software program on the console may be downloaded via one or more of the servers in the manner described above with reference to FIGS. 5-36.

In this manner, the owner of the rights to run a game program or other software program may execute the program on any device such as the owner's console, another's console, or a public (arcade) console using the version of the software best suited for the console.

An example of a hardware device, such as an arcade game machine, is now described in accordance with alternative aspect of the invention. Such arcade game machines generally provide higher performance than home game consoles. Also, for some game programs, a greater degree of realism is provided for the user when the game program is run on an arcade game machine, rather than on a home game console, because of the larger display size and better video/sound performance provided by the arcade game machine.

The above-explained system may be incorporated into the hardware device, such as the arcade game machine. The user may load a video game computer program into the hardware device (e.g., the arcade game machine) depending on the license associated with the user's software package. The hardware device can obtain a version of the software program, via a network, that is suitable for the processing capability of its processors. The user can therefore enjoy the game program on another hardware device as well as on the user's home game console.

In operation, the distributor server receives a user ID from the hardware device connected to the network. The distributor server verifies that the software program was properly purchased by the user based on the user's purchase history or based on the user's authentication history. Alternatively, or in addition to, the distributor server receives a software ID from the hardware device and authenticates the software ID by matching this ID with the IDs stored in a database. When the authentication is successful, the distributor server distributes portions of a program or distributes a complete software program for loading by the user into the hardware device.

When a predetermined interval has passed or when an authentication session is terminated, the downloaded software program, which is stored in a cache memory or in a hard disk drive of the hardware device, may be deleted automatically.

Any hardware device in which an authentication system for the user ID or the software ID is incorporated, or any hardware device in which authentication of the user ID or the software ID can be carried out by connecting to the distributor server via the network, may be used. The user inputs the user ID or the software ID into the hardware device using a controller. If the hardware device has no drive in which to load a media of the user-purchased software package, the hardware device may load the software program by downloading complete software program via network when the hardware device can authenticate the user ID or software ID.

Further, instead of manually inputting the software ID, a software ID provided on the software package may be read with a non-contact type ID reader. Also, fingerprint authentication, retina authentication, or other highly secure biometric authentication may be used instead of authenticating the user using the user ID.

When the user-purchased software package is a tangible type of package media, such as a CD-ROM, a DVD-ROM, or a Blu-ray Disc, a media ID specific to the software package may be used for authentication instead of using the software ID. Particularly, when the software package is a RAM-type or a rewritable-type Blu-ray Disc having a large memory capacity, the software programs and/or data modules that were downloaded from the distributor server after authentication may be stored in the vacant memory space of the disk and do not require further authentication.

When the user purchases the software package via the network, an ID of a hard disk storing the downloaded software program may be used as the media ID. Further, when the user ID is inputted using e-money or a credit card having a user-identification function and payment function, the authentication and payment can be completed at the same time.

The content within the software package may include non-video game entertainment content, such as a movie. By downloading upgrade software from the distributor server for playing the movie on the arcade game machine or for playing the movie in a theater, a better playing environment is provided.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of enabling execution of a software program, said method comprising:
obtaining particular identification information that is indicative of a given version of the software program, the given version of the software program being formed of a first plurality of modules so that each one of the first plurality of modules is also associated with the particular identification information, each one of the first plurality of modules being either (a) a software module, (b) a data module, or (c) a software and data module;
obtaining a particular processing identifier that is indicative of the processing capabilities of at least one processor on which the software program is to be executed, the processing capabilities of the at least one processor being compatible with a second plurality of modules so that each one of the second plurality of modules is also associated with the particular processing identifier, each one of the second plurality of modules being either (a) a software module, (b) a data module, or (c) a software and data module;
determining, using the particular identification information and the particular processing identifier, whether the processing capabilities of the at least one processor are incompatible with the processing capabilities needed for proper execution of the given version of the software program; and
in response to determining that the processing capabilities of the at least one processor are incompatible with proper execution of the given version of the software program, partially modifying the given version of the software program by replacing some of the modules of the first plurality of modules associated with the particular identification information with some of the modules of the second plurality of modules associated with the particular processing identifier to obtain a more suitable version of the software program, including:
providing a three-dimensional table having (i) a plurality of identification information arranged along a corresponding plurality of positions on a first axis of the table, the plurality of identification information being indicative of a corresponding plurality of software program versions each of which is formed of a corresponding portion of a plurality of available modules, the corresponding portion being also associated with the corresponding identification information, (ii) a plurality of processing identifiers individually arranged along a corresponding plurality of positions on a second axis of the table, the plurality of processing identifiers being indicative a corresponding plurality of processing capabilities each of which is compatible with a corresponding portion of the plurality of available modules, the corresponding portion being also associated with the corresponding processing identifier, (iii) the portion of the plurality of modules that is associated with a respective one of the plurality of identification information being arranged along one or more positions on a third axis of the table starting from the position on the first axis that corresponds to the respective software version, and (iv) the portion of the plurality of modules that is associated with a respective one of the plurality of processing capabilities being arranged along one or more positions on the third axis of the table starting from the position on the second axis that corresponds to the respective processing capabilities, wherein a location on the table having a coordinate along the second axis corresponding to a respective processing identifier and having a coordinate along the third axis corresponding to a particular module indicates whether that module is compatible with the processing capabilities indicated by that processing identifier;
accessing the table, using the particular identification information indicative of the particular version of the software program and the particular processing identifier, to locate a further version of the software program having modules wherein the processing capabilities needed for their proper execution are compatible with the processing capabilities indicated by the processing identifier; and using at least one of the modules of the further version of the software program to partially modify the version of the software program and obtain the more suitable version of the software program.

2. The method of claim 1, wherein the processing capabilities of the at least one processor are incompatible with proper execution of the given version of the software program when at least one of the following processing conditions is incompatible with that needed for proper execution of the given version of the software program: a clock frequency, a memory map, a bus utilization, a bus bandwidth, a cache size, a cache organization, an instruction latency, an instruction throughput, a memory latency, a memory throughput, an endian, and an instruction type.

3. The method of claim 1, wherein the particular identification information is a part of the software program, and said obtaining step includes obtaining the particular identification information from the software program.

4. The method of claim 1, wherein said obtaining step includes obtaining the particular identification information from a storage medium, and the storage medium is at least one of an optical disc medium, a magnetic medium, and an electronic medium.

5. The method of claim 1, wherein said determining step includes determining whether the at least one processor is capable of using processing resources from one or more external processors in executing the software program.

6. The method of claim 1, wherein said modifying step includes partially overwriting the given version of the software program in the storage medium.

7. The method of claim 1, wherein the table is at least one of stored locally in a common location with said at least one processor, stored in a remotely located administrative entity, or stored in a further location for access by the remotely located administrative entity.

8. The method of claim 7, further comprising:
establishing a link between the at least one processor and the administrative entity using a communications channel; and
transmitting the particular identification information and the particular processing identifier from the at least one processor to the administrative entity over the communications channel.

9. The method of claim 8, wherein the administrative entity accesses the table using the particular identification information and the particular processing identifier to obtain the at least one associated module.

10. The method of claim 9, further comprising:
receiving the at least one associated module at the at least one processor over the communications channel from the administrative entity; and
using the at least one associated module to modify the given version of the software program to obtain the more suitable version of the software program.

11. The method of claim 10, further comprising:
receiving an encrypted decryption key over the communication channel from the administrative entity in response to the particular identification information;
decrypting the encrypted decryption key; and
decrypting the at least one associated module using the decryption key.

12. The method of claim 10, further comprising:
receiving registration data over the communications channel from the administrative entity in response to the particular identification information;
transmitting the registration data over the communications channel to a distributor;
receiving an encrypted decryption key and an encrypted virtual ID at the processing apparatus over the network from the distributor in response to the registration data;
decrypting the encrypted decryption key using the virtual ID; and
decrypting the at least one associated module, using the decryption key.

13. The method of claim 10, further comprising:
receiving a non-activated decryption key from an administrator;
transmitting an activation request to the administrative entity over the communications channel;
receiving activation grant information from the administrative entity over the communications channel in response to the activation request;
converting the non-activated decryption key into an activated decryption key in response to the activation grant information; and
decrypting the at least one associated module, using the activated decryption keys.

14. The method of claim 1, wherein the software program includes a game program.

15. The method of claim 1, wherein the particular identification information indicates a user right to execute the software program on any one of plurality of processing devices.

16. The method of claim 1, further comprising obtaining the given version of the software program using the particular identification information prior to said step of partially modifying the given version of the software program.

17. The method of claim 16, wherein the given version of the software program is at least one of stored locally in a common location with said at least one processor, stored in a remotely located administrative entity, or stored in a further location for access by the remotely located administrative entity.

18. The method of claim 17, further comprising:
establishing a link between the at least one processor and the administrative entity using a communications channel;
transmitting the particular identification information from the at least one processor to the administrative entity over the communications channel, the administrative entity using the particular identification information to obtain the given version of the software program; and
receiving the given version of the software program at the at least one processor over the communications channel from the administrative entity.

19. The method of claim 17, further comprising:
establishing a link between a further device and the administrative entity using a communications channel;
transmitting the particular identification information from further device to the administrative entity over the communications channel, the administrative entity using the particular identification information to obtain the given version of the software program; and
receiving the given version of the software program at the at least one processor over the communications channel from the administrative entity.

20. A processing arrangement, comprising:
at least one hardware processor operable to perform processing tasks and to: (i) obtain particular identification information that is indicative of a given version of a software program, the given version of the software program being formed of a first plurality of modules so that each one of the first plurality of modules is also associated with the particular identification information, each one of the first plurality of modules being either (a) a software module, (b) a data module, or (c) a software and data module, (ii) obtain a particular processing identifier that is indicative of the processing capabilities of the at least one processor, the processing capabilities of the at least one processor being compatible with a second plurality of modules so that each one of the second plurality of modules is also associated with the particular processing identifier, each one of the second plurality of modules being either (a) a software module, (b) a data module, or (c) a software and data module, (iii) determine, using the particular identification information and the particular processing identifier, whether the processing capabilities of the processor are incompatible with the processing capabilities needed for proper execution of the given version of the software program, and (iv) in response to determining that the processing capabilities of the at least one processor are incompatible with proper execution of the given version of the software program, partially modify the given version of the software program by replacing some of the modules associated with the particular identification information with some of the modules associated with the particular processing identifier to obtain a more suitable version of the software program, including:

providing a three-dimensional table having (i) a plurality of identification information arranged along a corresponding plurality of positions on a first axis of the table, the plurality of identification information being indicative of a corresponding plurality of software program versions each of which is formed of a corresponding portion of a plurality of available modules, the corresponding portion being also associated with the corresponding identification information, (ii) a plurality of processing identifiers individually arranged along a corresponding plurality of positions on a second axis of the table, the plurality of processing identifiers being indicative a corresponding plurality of processing capabilities each of which is compatible with a corresponding portion of the plurality of available modules, the corresponding portion being also associated with the corresponding processing identifier, (iii) the portion of the plurality of modules that is associated with a respective one of the plurality of identification information being arranged along one or more positions on a third axis of the table starting from the position on the first axis that corresponds to the respective software version, and (iv) the portion of the plurality of modules that is associated with a respective one of the plurality of processing capabilities being arranged along one or more positions on the third axis of the table starting from the position on the second axis that corresponds to the respective processing capabilities, wherein a location on the table having a coordinate along the second axis corresponding to a respective processing identifier and having a coordinate along the third axis corresponding to a particular module indicates whether that module is compatible with the processing capabilities indicated by that processing identifier;

accessing the table, using the particular identification information indicative of the particular version of the software program and the particular processing identifier, to locate a further version of the software program having modules wherein the processing capabilities needed for their proper execution are compatible with the processing capabilities indicated by the processing identifier; and using at least one of the modules of the further version of the software program to partially modify the version of the software program and obtain the more suitable version of the software program.

21. A system, comprising:

a plurality of sub-processing units each operable to perform processing tasks;

a main processing unit operable to perform at least some management processing tasks over the sub-processing units; and a data bus operatively coupling the main processing unit and the sub-processing units;

wherein one or more units of the main processing unit or the plurality of sub-processing units is operable to:

(i) obtain particular identification information that is indicative of a given version of a software program, the given version of the software program being formed of a first plurality of modules so that each one of the first plurality of modules is also associated with the particular identification information, each one of the first plurality of modules being either (a) a software module, (b) a data module, or (c) a software and data module, (ii) obtain a particular processing identifier that is indicative of the processing capabilities of the at least one processor, the processing capabilities of the at least one processor being compatible with a second plurality of modules so that each one of the second plurality of modules is also associated with the particular processing identifier, each one of the second plurality of modules being either (a) a software module, (b) a data module, or (c) a software and data module, (iii) determine, using the particular identification information and the particular processing identifier, whether the processing capabilities of the processor are incompatible with the processing capabilities needed for proper execution of the given version of the software program, and (iv) in response to determining that the processing capabilities of the at least one processor are incompatible with proper execution of the given version of the software program, partially modify the given version of the software program by replacing some of the modules associated with the particular identification information with some of the modules associated with the particular processing identifier to obtain a more suitable version of the software program, including:

providing a three-dimensional table having (i) a plurality of identification information arranged along a corresponding plurality of positions on a first axis of the table, the plurality of identification information being indicative of a corresponding plurality of software program versions each of which is formed of a corresponding portion of a plurality of available modules, the corresponding portion being also associated with the corresponding identification information, (ii) a plurality of processing identifiers individually arranged along a corresponding plurality of positions on a second axis of the table, the plurality of processing identifiers being indicative a corresponding plurality of processing capabilities each of which is compatible with a corresponding portion of the plurality of available modules, the corresponding portion being also associated with the corresponding processing identifier, (iii) the portion of the plurality of modules that is associated with a respective one of the plurality of identification information being arranged along one or more positions on a third axis of the table starting from the position on the first axis that corresponds to the respective software version, and (iv) the portion of the plurality of modules that is associated with a respective one of the plurality of processing capabilities being arranged along one or more positions on the third axis of the table starting from the position on the second axis that corresponds to the respective processing capabilities, wherein a location on the table having a coordinate along the second axis corresponding to a respective processing identifier and having a coordinate along the third axis corresponding to a particular module indicates whether that module is compatible with the processing capabilities indicated by that processing identifier;

accessing the table, using the particular identification information indicative of the particular version of the software program and the particular processing identifier, to locate a further version of the software program having modules wherein the processing capabilities needed for their proper execution are compatible with the processing capabilities indicated by the processing identifier; and using at least one of the modules of the further version of the software program to partially modify the version of the software program and obtain the more suitable version of the software program.

22. A system, comprising:

a plurality of devices each including:
  a plurality of sub-processing units each operable to perform processing tasks,
  a main processing unit operable to perform at least some management processing tasks over the sub-processing units, and
  a data bus operatively coupling the main processing unit and the sub-processing units;

wherein one or more units of the main processing unit and the plurality of sub-processing units of at least one of the plurality of processing devices is operable to: (i) obtain particular identification information that is indicative of a given version of a software program, the given version of the software program being formed of a first plurality of modules so that each one of the first plurality of modules is also associated with the particular identification information, each one of the first plurality of modules being either (a) a software module, (b) a data module, or (c) a software and data module, (ii) obtain a particular processing identifier that is indicative of the processing capabilities of the at least one processor, the processing capabilities of the at least one processor being compatible with a second plurality of modules so that each one of the second plurality of modules is also associated with the particular processing identifier, each one of the second plurality of modules being either (a) a software module, (b) a data module, or (c) a software and data module, (iii) determine, using the particular identification information and the particular processing identifier, whether the processing capabilities of the processor are incompatible with the processing capabilities needed for proper execution of the given version of the software program, and (iv) in response to determining that the processing capabilities of the one or more units are incompatible with proper execution therein of the given version of the software program, partially modify the given version of the software program by replacing some of the modules associated with the particular identification information with some of the modules associated with the particular processing identifier to obtain a more suitable version of the software program, including:

providing a three-dimensional table having (i) a plurality of identification information arranged along a corresponding plurality of positions on a first axis of the table, the plurality of identification information being indicative of a corresponding plurality of software program versions each of which is formed of a corresponding portion of a plurality of available modules, the corresponding portion being also associated with the corresponding identification information, (ii) a plurality of processing identifiers individually arranged along a corresponding plurality of positions on a second axis of the table, the plurality of processing identifiers being indicative a corresponding plurality of processing capabilities each of which is compatible with a corresponding portion of the plurality of available modules, the corresponding portion being also associated with the corresponding processing identifier, (iii) the portion of the plurality of modules that is associated with a respective one of the plurality of identification information being arranged along one or more positions on a third axis of the table starting from the position on the first axis that corresponds to the respective software version, and (iv) the portion of the plurality of modules that is associated with a respective one of the plurality of processing capabilities being arranged along one or more positions on the third axis of the table starting from the position on the second axis that corresponds to the respective processing capabilities, wherein a location on the table having a coordinate along the second axis corresponding to a respective processing identifier and having a coordinate along the third axis corresponding to a particular module indicates whether that module is compatible with the processing capabilities indicated by that processing identifier;

accessing the table, using the particular identification information indicative of the particular version of the software program and the particular processing identifier, to locate a further version of the software program having modules wherein the processing capabilities needed for their proper execution are compatible with the processing capabilities indicated by the processing identifier; and using at least one of the modules of the further version of the software program to partially modify the version of the software program and obtain the more suitable version of the software program.

23. A system, comprising:

a plurality of processing devices each including:
  a plurality of sub-processing units each operable to perform processing tasks,
  a main processing unit operable to perform at least some management processing tasks over the sub-processing units, and
  a data bus operatively coupling the main processing unit and the sub-processing units;

a remotely located administrative entity; and a communications channel operable to provide a communication link between each of the plurality of processing devices and the administrative entity;

one or more units of the main processing unit and the sub-processing units of at least one of the plurality of processing devices being further operable to: (i) obtain particular identification information that is indicative of a given version of a software program, the given version of the software program being formed of a first plurality of modules so that each one of the first plurality of modules is also associated with the particular identification information, each one of the first plurality of modules being either (a) a software module, (b) a data module, or (c) a software and data module, (ii) obtain a particular processing identifier that is indicative of the processing capabilities of the at least one processor, the processing capabilities of the at least one processor being compatible with a second plurality of modules so that each one of the second plurality of modules is also associated with the particular processing identifier, each one of the second plurality of modules being either (a) a software module, (b) a data module, or (c) a software and data module, (iii) determine, using the particular identification information and the particular processing identifier, whether the processing capabilities of the processor are incompatible with the processing capabilities needed for proper execution of the given version of the software program, and (iv) in response to determining that the processing capabilities of the one or more units are incompatible with proper execution therein of the given version of the software program, transmit the particular identification information and the at least one processing identifier associated with that processing device to the administrative entity over the communications channel;

the administrative entity being operable to: (i) use the particular identification information and the at least one processing identifier to obtain at least some of the modules associated with the particular processing identifier that may be used to replace some of the modules associated with the particular identification information thereby partially modify the given version of the software program, and (ii) transmit the at least one module to the one or more units;

the one or more units being further operable to partially modify the given version of the software program to obtain a more suitable version of the software program that will execute properly, including:

providing a three-dimensional table having (i) a plurality of identification information arranged along a corresponding plurality of positions on a first axis of the table, the plurality of identification information being indicative of a corresponding plurality of software program versions each of which is formed of a corresponding portion of a plurality of available modules, the corresponding portion being also associated with the corresponding identification information, (ii) a plurality of processing identifiers individually arranged along a corresponding plurality of positions on a second axis of the table, the plurality of processing identifiers being indicative a corresponding plurality of processing capabilities each of which is compatible with a corresponding portion of the plurality of available modules, the corresponding portion being also associated with the corresponding processing identifier, (iii) the portion of the plurality of modules that is associated with a respective one of the plurality of identification information being arranged along one or more positions on a third axis of the table starting from the position on the first axis that corresponds to the respective software version, and (iv) the portion of the plurality of modules that is associated with a respective one of the plurality of processing capabilities being arranged along one or more positions on the third axis of the table starting from the position on the second axis that corresponds to the respective processing capabilities, wherein a location on the table having a coordinate along the second axis corresponding to a respective processing identifier and having a coordinate along the third axis corresponding to a particular module indicates whether that module is compatible with the processing capabilities indicated by that processing identifier;

accessing the table, using the particular identification information indicative of the particular version of the software program and the particular processing identifier, to locate a further version of the software program having modules wherein the processing capabilities needed for their proper execution are compatible with the processing capabilities indicated by the processing identifier; and using at least one of the modules of the further version of the software program to partially modify the version of the software program and obtain the more suitable version of the software program.

24. An apparatus for enabling execution of a software program, said apparatus comprising:

means for obtaining particular identification information that is indicative of a given version of the software program, the given version of the software program being formed of a first plurality of modules so that each one of the first plurality of modules is also associated with the particular identification information, each one of the first plurality of modules being either (a) a software module, (b) a data module, or (c) a software and data module;

means for obtaining a particular processing identifier that is indicative of the processing capabilities of at least one processor on which the software program is to be executed, the processing capabilities of the at least one processor being compatible with a second plurality of modules so that each one of the second plurality of modules is also associated with the particular processing identifier, each one of the second plurality of modules being either (a) a software module, (b) a data module, or (c) a software and data modul;

means for determining, using the particular identification information and the particular processing identifier, whether the processing capabilities of the at least one processor are incompatible with the processing capabilities needed for proper execution of the given version of the software program; and means for, in response to determining that the processing capabilities of the at least one processor are incompatible with proper execution of the given version of the software program, partially modifying the version of the software program by replacing some of the modules associated with the particular identification information with some of the modules associated with the particular processing identifier to obtain a more suitable version of the software program that will execute properly on the at least one processor, including:

providing a three-dimensional table having (i) a plurality of identification information arranged along a corresponding plurality of positions on a first axis of the table, the plurality of identification information being indicative of a corresponding plurality of software program versions each of which is formed of a corresponding portion of a plurality of available modules, the corresponding portion being also associated with the corresponding identification information, (ii) a plurality of processing identifiers individually arranged along a corresponding plurality of positions on a second axis of the table, the plurality of processing identifiers being indicative a corresponding plurality of processing capabilities each of which is compatible with a corresponding portion of the plurality of available modules, the corresponding portion being also associated with the corresponding processing identifier, (iii) the portion of the plurality of modules that is associated with a respective one of the plurality of identification information being arranged along one or more positions on a third axis of the table starting from the position on the first axis that corresponds to the respective software version, and (iv) the portion of the plurality of modules that is associated with a respective one of the plurality of processing capabilities being arranged along one or more positions on the third axis of the table starting from the position on the second axis that corresponds to the respective processing capabilities, wherein a location on the table having a coordinate along the second axis corresponding to a respective processing identifier and having a coordinate along the third axis corresponding to a particular module indicates whether that module is compatible with the processing capabilities indicated by that processing identifier;

accessing the table, using the particular identification information indicative of the particular version of the software program and the particular processing identifier, to locate a further version of the software program having modules wherein the processing capabilities needed for their proper execution are compatible with the processing capabilities indicated by the processing identifier; and using at least one of the modules of the further version of the software program to partially modify the version of the software program and obtain the more suitable version of the software program.

25. A non-transitory recording medium recorded with a first software program for performing a method of enabling execution of a second software program, said method comprising:

obtaining particular identification information that is indicative of a given version of the software program, the given version of the software program being formed of a first plurality of modules so that each one of the first plurality of modules is also associated with the particular identification information, each one of the first plurality of modules being either (a) a software module, (b) a data module, or (c) a software and data module;

obtaining a particular processing identifier that is indicative of the processing capabilities of at least one processor on which the software program is to be executed, the processing capabilities of the at least one processor being compatible with a second plurality of modules so that each one of the second plurality of modules is also associated with the particular processing identifier, each one of the second plurality of modules being either (a) a software module, (b) a data module, or (c) a software and data module;

determining, using the particular identification information and the particular processing identifier, whether the processing capabilities of the at least one processor are incompatible with the processing capabilities needed for proper execution of the given version of the second software program; and in response to determining that the processing capabilities of the at least one processor are incompatible with its proper execution of the version of the second software program, partially modifying the version of the second software program by replacing some of the modules associated with the particular identification information with some of the modules associated with the particular processing identifier to obtain a more suitable version of the second software program that will execute properly on the at least one processor, including:

providing a three-dimensional table having (i) a plurality of identification information arranged along a corresponding plurality of positions on a first axis of the table, the plurality of identification information being indicative of a corresponding plurality of software program versions each of which is formed of a corresponding portion of a plurality of available modules, the corresponding portion being also associated with the corresponding identification information, (ii) a plurality of processing identifiers individually arranged along a corresponding plurality of positions on a second axis of the table, the plurality of processing identifiers being indicative a corresponding plurality of processing capabilities each of which is compatible with a corresponding portion of the plurality of available modules, the corresponding portion being also associated with the corresponding processing identifier, (iii) the portion of the plurality of modules that is associated with a respective one of the plurality of identification information being arranged along one or more positions on a third axis of the table starting from the position on the first axis that corresponds to the respective software version, and (iv) the portion of the plurality of modules that is associated with a respective one of the plurality of processing capabilities being arranged along one or more positions on the third axis of the table starting from the position on the second axis that corresponds to the respective processing capabilities, wherein a location on the table having a coordinate along the second axis corresponding to a respective processing identifier and having a coordinate along the third axis corresponding to a particular module indicates whether that module is compatible with the processing capabilities indicated by that processing identifier;

accessing the table, using the particular identification information indicative of the particular version of the software program and the particular processing identifier, to locate a further version of the software program having modules wherein the processing capabilities needed for their proper execution are incompatible with the processing capabilities needed for proper execution of the given version of the software program; and in response to determining that the processing capabilities of the at least one processor are incompatible with proper execution of the given version of the software program, partially modifying the given version of the software program by replacing some of the modules associated with the particular identification information with some of the modules associated with the particular processing identifier to obtain a more suitable version of the software program that will execute properly on the at least one processor, and storing the more suitable version of the software program on the recording medium, including:

providing a three-dimensional table having (i) a plurality of identification information arranged along a corresponding plurality of positions on a first axis of the table, the plurality of identification information being indicative of a corresponding plurality of software program versions each of which is formed of a corresponding portion of a plurality of available modules, the corresponding portion being also associated with the corresponding identification information, (ii) a plurality of processing identifiers individually arranged along a corresponding plurality of positions on a second axis of the table, the plurality of processing identifiers being indicative a corresponding plurality of processing capabilities each of which is compatible with a corresponding portion of the plurality of available modules, the corresponding portion being also associated compatible with the processing capabilities indicated by the processing identifier; and using at least one of the modules of the further version of the software program to partially modify the version of the software program and obtain the more suitable version of the software program.

26. A non-transitory recording medium recorded with a software program modified by a method of enabling execution of the software program, said method comprising:

providing a given version of a software program;

obtaining particular identification information that is indicative of a given version of the software program, the given version of the software program being formed of a first plurality of modules so that each one of the first plurality of modules is also associated with the particular identification information, each one of the first plurality of modules being either (a) a software module, (b) a data module, or (c) a software and data module;

obtaining a particular processing identifier that is indicative of the processing capabilities of at least one processor on which the software program is to be executed, the processing capabilities of the at least one processor being compatible with a second plurality of modules so that each one of the second plurality of modules is also associated with the particular processing identifier, each one of the second plurality of modules being either (a) a software module, (b) a data module, or (c) a software and data module;

determining, using the particular identification information and the particular processing identifier, whether the processing capabilities of the at least one processor are with the corresponding processing identifier, (iii) the portion of the plurality of modules that is associated with a respective one of the plurality of identification information being arranged along one or more positions on a third axis of the table starting from the position on the first axis that corresponds to the respective software version, and (iv) the portion of the plurality of modules that is associated with a respective one of the plurality of processing capabilities being arranged along one or more positions on the third axis of the table starting from the position on the second axis that corresponds to the respective processing capabilities, wherein a location on the table having a coordinate along the second axis corresponding to a respective processing identifier and having a coordinate along the third axis corresponding to a particular module indicates whether that module is compatible with the processing capabilities indicated by that processing identifier;

accessing the table, using the particular identification information indicative of the particular version of the software program and the particular processing identifier, to locate a further version of the software program having modules wherein the processing capabilities needed for their proper execution are compatible with the processing capabilities indicated by the processing identifier; and using at least one of the modules of the further version of the software program to partially modify the version of the software program and obtain the more suitable version of the software program.

* * * * *

UNITED STATES PATENT AND TRADEMARK OFFICE
CERTIFICATE OF CORRECTION

PATENT NO. : 8,176,481 B2
APPLICATION NO. : 11/231131
DATED : May 8, 2012
INVENTOR(S) : Eiji Kasahara Page 1 of 3

It is certified that error appears in the above-identified patent and that said Letters Patent is hereby corrected as shown below:

In the Specification:

Column 1, line 21, "continues" should read --continue--.

Column 1, line 28, "media," should read --media--.

Column 1, line 35, "program" should read --programs--.

Column 2, line 22, after "have", insert --been--.

Column 3, line 43, "modifying" should read --modify--.

Column 4, line 29, "processors" should read --processor--.

Column 4, line 30, "are" should read --is--.

Column 4, line 46, "modifying" should read --modify--.

Column 4, line 51, "modifying" should read --modify--.

Column 9, line 5, "The" should read --the--.

Column 9, line 63, "ore" should read --or--.

Column 12, line 8, "on" should read --because--.

Column 13, line 11, "then" should read --than--.

Column 13, line 45, "is" should read --are--.

Column 13, line 46, "facilitates" should read --facilitate--.

Column 14, line 3, after "machine", delete ",".

Column 15, line 9, "are" should read --is--.

Column 15, line 12, "are" should read --is--.

Column 16, line 38, after "obtain", delete "a".

Column 16, line 57, "program" should read --programs--.

Column 27, line 19, after "encrypted", insert --by--.

Column 29, line 61, "was" should read --were--.

Signed and Sealed this
Twenty-second Day of July, 2014

Michelle K. Lee
*Deputy Director of the United States Patent and Trademark Office*

CERTIFICATE OF CORRECTION (continued)
U.S. Pat. No. 8,176,481 B2

In the Claims:

Claim 1, Column 36, line 39, after "indicative", insert --of--.

Claim 15, Column 38, line 27, after "one of", insert --a--.

Claim 19, Column 38, line 54, before "further", insert --the--.

Claim 20, Column 39, line 39, after "indicative", insert --of--.

Claim 21, Column 40, line 16, "is" should read --are--.

Claim 21, Column 40, line 57, after "indicative", insert --of--.

Claim 22, Column 41, line 36, "is" should read --are--.

Claim 22, Column 42, line 13, after "indicative", insert --of--.

Claim 23, Column 43, line 32, "modify" should read --modifying--.

Claim 23, Column 43, line 51, after "indicative", insert --of--.

Claim 24, Column 44, line 39, "modul;" should read --module;--.

Claim 24, Column 45, line 1, after "indicative", insert --of--.

Claim 25, Column 46, line 19, after "indicative", insert --of--.

Claim 25, Column 46, line 48, "incompatible" should read --compatible--.

Claim 25, Column 46, lines 51 through Column 47, lines 13 should be deleted.

Claim 26, Column 48, line 6, after "are", insert --incompatible with the processing capabilities needed for proper execution of the given version of the software program; and
in response to determining that the processing capabilities of the at least one processor are incompatible with proper execution of the given version of the software program, partially modifying the given version of the software program by replacing some of the modules associated with the particular identification information with some of the modules associated with the particular processing identifier to obtain a more suitable version of the software program that will execute properly on the at least one processor, and
storing the more suitable version of the software program on the recording medium, including:
providing a three-dimensional table having (i) a plurality of identification information arranged along a corresponding plurality of positions on a first axis of the table, the plurality of identification information being indicative of a corresponding plurality of software program versions each of which is formed of a corresponding portion of a plurality of available modules, the corresponding portion being also associated with the corresponding identification information, (ii) a plurality of processing identifiers individually arranged along a corresponding plurality of positions on a second axis of the table, the plurality of processing identifiers being indicative a corresponding plurality of processing capabilities each of which is compatible with a corresponding portion of the plurality of available modules, the corresponding portion being also associated--.